United States Patent
Obika et al.

(10) Patent No.: US 12,473,299 B2
(45) Date of Patent: Nov. 18, 2025

(54) CROSS-LINKED NUCLEOSIDE AND NUCLEOTIDE USING SAME

(71) Applicants: Osaka University, Osaka (JP); Japan as Represented by Director General of National Institute of Health Sciences, Kawasaki (JP)

(72) Inventors: Satoshi Obika, Osaka (JP); Takao Yamaguchi, Osaka (JP); Yota Sakurai, Osaka (JP); Chika Yamamoto, Osaka (JP); Kei Sugita, Osaka (JP); Takao Inoue, Kawasaki (JP); Tokuyuki Yoshida, Kawasaki (JP)

(73) Assignees: Osaka University, Osaka (JP); Japan as Represented by Director General of National Institute of Health Sciences, Kanagawa (JP)

( * ) Notice: Subject to any disclaimer, the term of this patent is extended or adjusted under 35 U.S.C. 154(b) by 688 days.

(21) Appl. No.: 17/800,339

(22) PCT Filed: Feb. 17, 2021

(86) PCT No.: PCT/JP2021/006017
§ 371 (c)(1),
(2) Date: Aug. 17, 2022

(87) PCT Pub. No.: WO2021/166981
PCT Pub. Date: Aug. 26, 2021

(65) Prior Publication Data
US 2023/0124641 A1  Apr. 20, 2023

(30) Foreign Application Priority Data
Feb. 18, 2020 (JP) .................. 2020-025726

(51) Int. Cl.
*C07H 21/04* (2006.01)
*C07D 239/10* (2006.01)
*C07D 493/08* (2006.01)

(52) U.S. Cl.
CPC ......... *C07D 493/08* (2013.01); *C07D 239/10* (2013.01); *C07H 21/04* (2013.01)

(58) Field of Classification Search
None
See application file for complete search history.

(56) References Cited

U.S. PATENT DOCUMENTS

2011/0077390 A1* 3/2011 Seth .................. C07H 21/00
536/28.8

OTHER PUBLICATIONS

PCT/JP2021/006017; PCT International Search Report of the International Searching Authority dated Mar. 3, 2021 and its English translation.
S. Obika et al., Tetrahedron Letters, 1997, vol. 38, pp. 8735-8738.
S. Singh et al., Chem. Commun., 1998, pp. 455-456.
E. Swayze et al., Nucleic Acids Research., 2007, vol. 35, No. 2, pp. 687-700.
A. Aerschot et al., Angew. Chem. Int. Ed., 1995, vol. 34, No. 12, pp. 1338-1339.
P. Herdewijn, Chemistry & Biodiversity, 2010, vol. 7, pp. 1-59.
M. Egli et al., J. Am. Chem. Soc., 2011, 133, pp. 16642-16649.
B. T. Le et al., Chem. Commun., 2016, 52, pp. 13467-13470.
M. Kuwahara et al., Nucleic Acids Research, 2008, vol. 36, No. 13, pp. 4257-4265.
Mallikharjuna R. Lambu et al., J. Med. Chem., 2013, 56, pp. 6122-6135.

* cited by examiner

*Primary Examiner* — Traviss C McIntosh, III
(74) *Attorney, Agent, or Firm* — Renner, Otto, Boisselle & Sklar, LLP

(57) ABSTRACT

A cross-linked nucleoside of the present invention is a compound represented by the formula (I) below. The cross-linked nucleoside of the present invention is usable as a substitute for a phosphorothioate-modified nucleic acid, which has a risk of, for example, accumulation in a specific organ. The cross-linked nucleoside also has excellent industrial productivity.

[Chemical Formula 1]

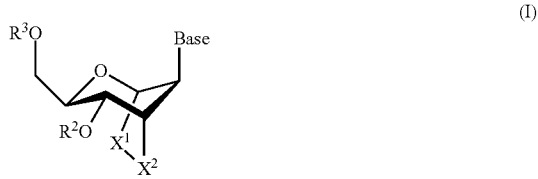

(I)

19 Claims, 4 Drawing Sheets

Specification includes a Sequence Listing.

[FIG.1]
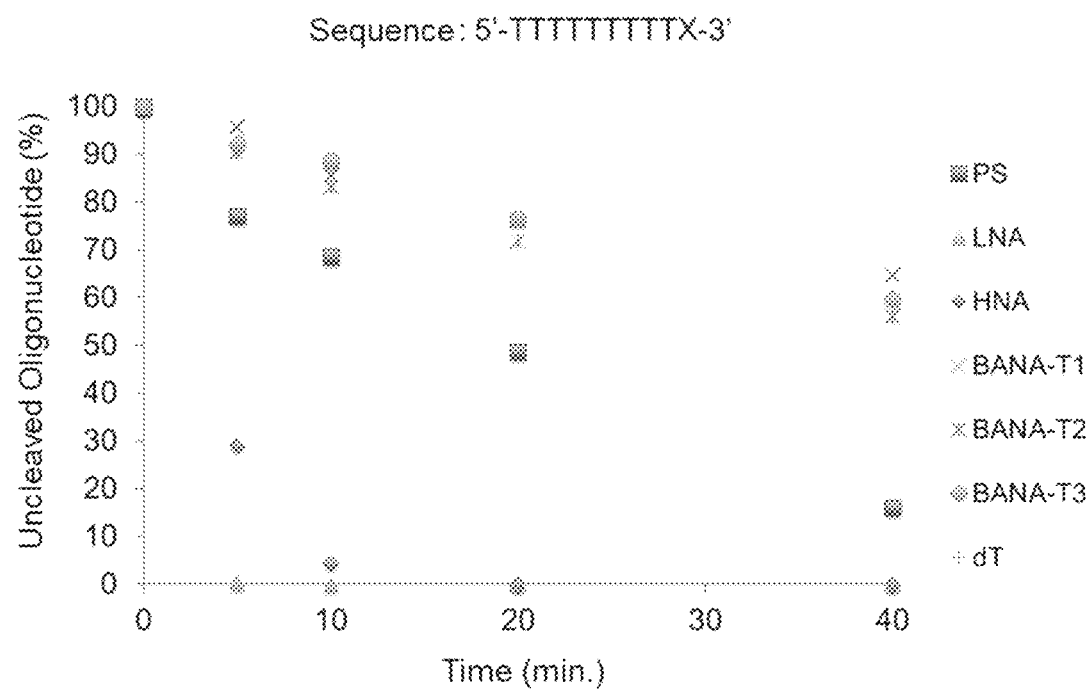

[FIG.2]
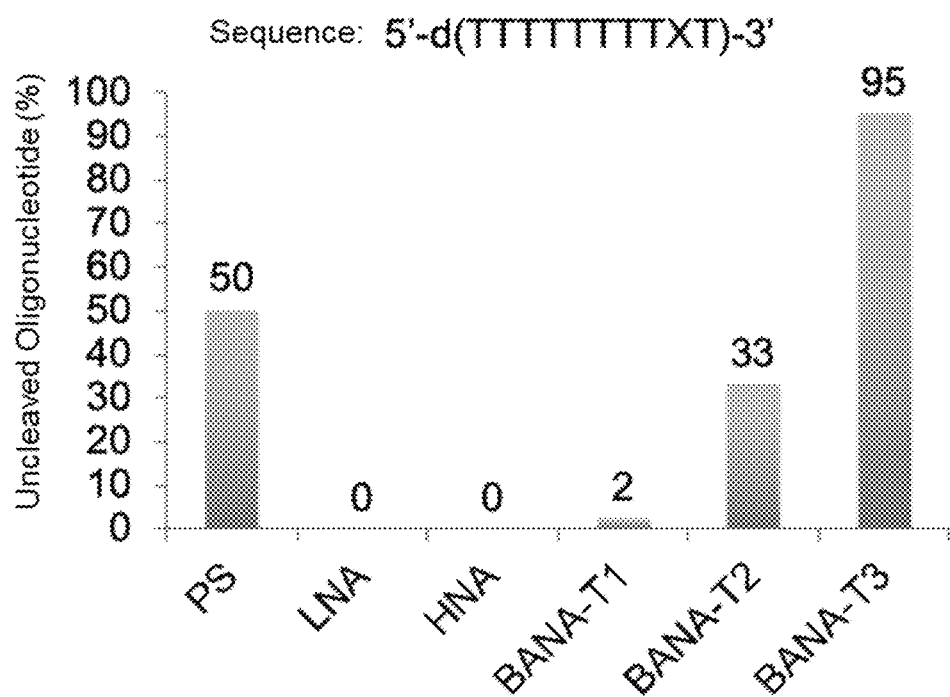

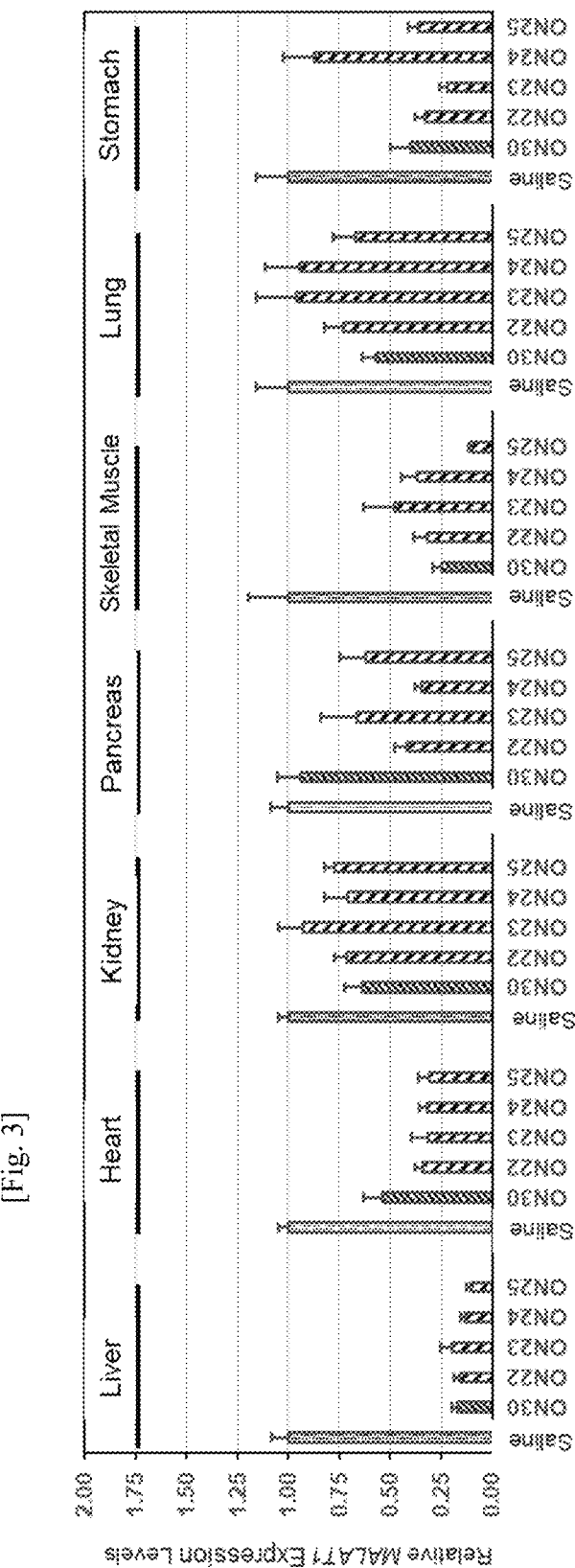
[Fig. 3]

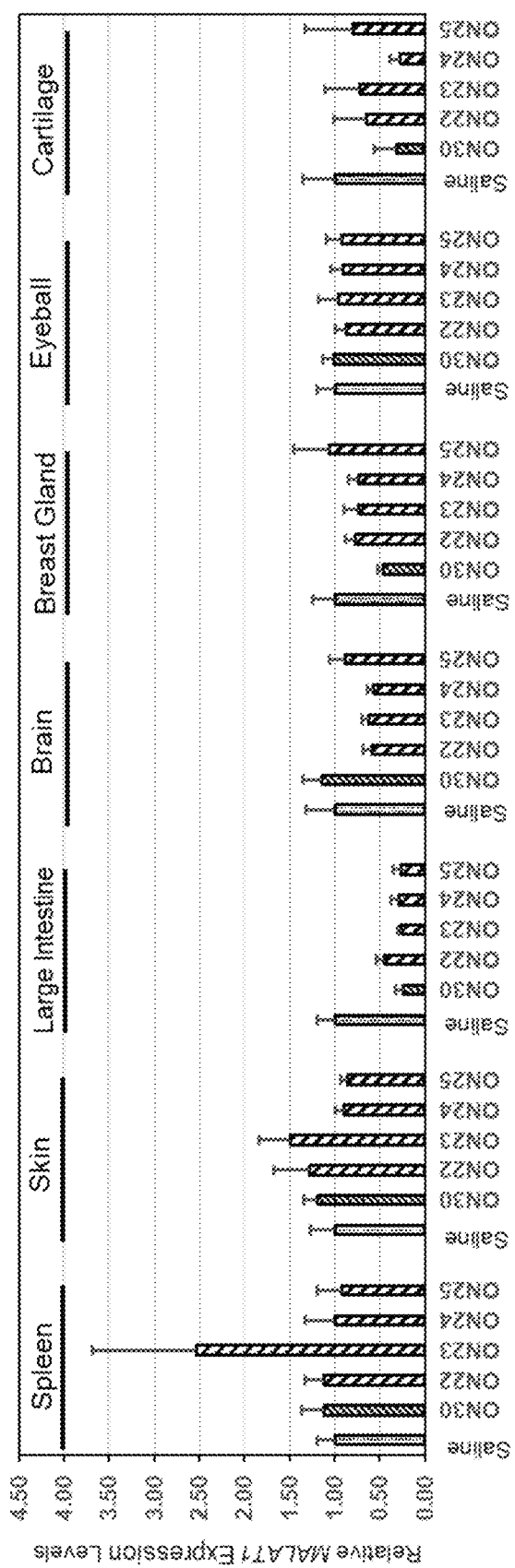
[Fig. 4]

CROSS-LINKED NUCLEOSIDE AND NUCLEOTIDE USING SAME

CROSS-REFERENCE TO RELATED APPLICATIONS

This application is a national phase of International Application No. PCT/JP2021/006017, filed 17 Feb. 2021, which claims priority to Japan Application No. 2020-25726, filed 18 Feb. 2020, each of which is hereby incorporated herein by reference in its entirety.

TECHNICAL FIELD

The present invention relates to a cross-linked nucleoside and a nucleotide using the same. More specifically, the invention relates to a cross-linked nucleoside that has good nuclease resistance, and a nucleotide using the same.

BACKGROUND ART

Various artificial nucleic acids having high binding affinity for DNA or RNA are applicable to gene diagnosis and oligonucleotide therapeutics, and various types of artificial nucleic acids have been developed. In particular, 2',4'-BNA (2',4'-bridged nucleic acid, also known as LNA) in which the conformation of the sugar moiety in the nucleic acid is immobilized on the N-conformation through cross-linking has high binding affinity for a single-stranded RNA (ssRNA) and is expected as oligonucleotide therapeutics that can be used in various applications such as the antisense therapies (Non-Patent Documents 1 and 2). However, 2',4'-BNA has the problems of having low enzyme resistance and being likely to induce hepatotoxicity (Non-Patent Document 3).

On the other hand, hexitol nucleic acid (HNA) in which the sugar moiety in the nucleic acid is substituted by a pyranose ring has a structure that mimics the N-conformation of natural nucleic acids, and is known to improve the binding affinity for a single-stranded RNA (ssRNA) (Non-Patent Documents 4 and 5). Therefore, in recent years, studies on the application of HNA and its analogues to antisense therapeutics have been reported, with findings that suggest higher activity and reduced toxicity (Non-Patent Documents 6 and 7).

As described above, artificial nucleic acids having an HNA backbone have attractive properties for therapeutic applications and are drawing attention as possible remedies for the problems faced by 2',4'-BNA.

RELATED ART DOCUMENTS

Non-Patent Documents

Non-Patent Document 1: S. Obika et al., T. Tetrahedron Lett., 1997, 38, 8735-8738
Non-Patent Document 2: S. Singh et al., J. Chem. Commun., 1998, 455-456
Non-Patent Document 3: E. Swayze et al., Nucleic Acids Res., 2007, 35, 687-700
Non-Patent Document 4: A Aerschot et al., Angew. Chem. Int. Ed., 1995, 34, 1338-1339
Non-Patent Document 5: P. Herdewijn, P. Chem. Biodiversity, 2010, 7, 1-59
Non-Patent Document 6: M. Egli et al., J. Am. Chem. Soc., 2011, 133, 16642-16649
Non-Patent Document 7: B. T. Le et al., Chem. Commun., 2016, 52, 13467-13470

SUMMARY OF INVENTION

Problem to be Solved by the Invention

The present invention was made to address the above-described problems, and it is an object thereof to provide a cross-linked nucleoside that has good nuclease resistance and has an HNA backbone, and a nucleotide using the same.

Means for Solving the Problem

The present invention is a compound represented by a formula (I) below or a salt thereof:

[Chemical Formula 1]

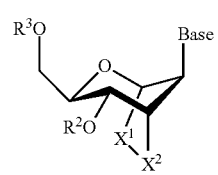

(I)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or —$P(R^4)R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or $-Y^1-(CH_2)_n-$, $-(CH_2)-Y^1-$ or $-(CH_2)_l-Y^1-(CH_2)_m-$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $-NH-$, or a methylene group.

In one embodiment, wherein the above formula (I) is represented by any one of formulae (I-1) to (I-3) below:

[Chemical Formula 2]

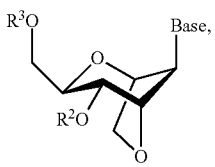
(I-1)

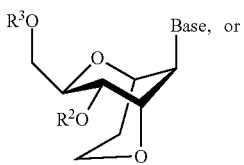
(I-2)

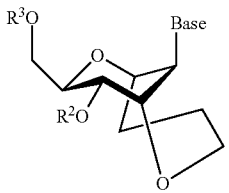
(I-3)

In one embodiment, the above Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, or a 4-amino-5-methyl-2-oxo-1,2-dihydropyrimidin-1-yl group.

In one embodiment, the above Base is a group represented by a formula below:

[Chemical Formula 3]

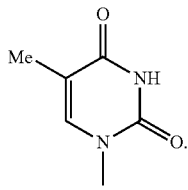

The present invention is also an oligonucleotide containing at least one nucleoside structure represented by a formula (II) below or a pharmacologically acceptable salt thereof:

[Chemical Formula 4]

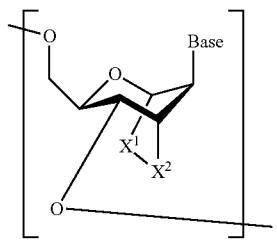
(II)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$X^1$ is an alkylene group having 1 to 5 carbon atoms, an alkenylene group having 2 to 5 carbon atoms, or $-Y^1-(CH_2)_n-$, $-(CH_2)_n-Y^1-$ or $-(CH_2)_l-Y^1-(CH_2)_m-$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $-NH-$, or a methylene group.

In one embodiment, the above formula (II) is represented by any one of formulae (II-1) to (II-3) below:

[Chemcial Formula 5]

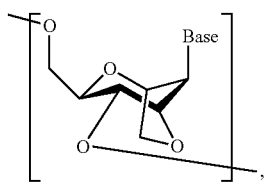
(II-1)

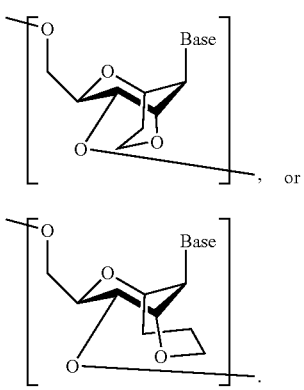

In one embodiment, the above Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, or a 4-amino-5-methyl-2-oxo-1,2-dihydropyrimidin-1-yl group.

In one embodiment, the above Base is a group represented by a formula below:

[Chemical Formula 6]

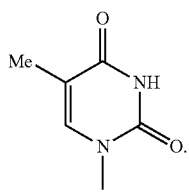

The present invention is also a method for producing the above oligonucleotide or pharmacologically acceptable salt thereof, the method comprising the step of:
synthesizing an oligonucleotide using a compound represented by a formula (I) below or a pharmacologically acceptable salt thereof:

[Chemical Formula 7]

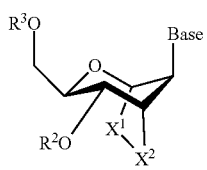

(I)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or —P($R^4$)$R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or —$Y^1$—$(CH_2)_n$—, —$(CH_2)_n$—$Y^1$— or —$(CH_2)_l$—$Y^1$—$(CH_2)_m$—, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, —NH—, or a methylene group.

Effects of the Invention

According to the present invention, a nucleotide using a novel cross-linked nucleoside having an HNA backbone is provided. The cross-linked nucleoside of the present invention is also usable as a substitute for a phosphorothioate-modified nucleic acid, which has a risk of, for example, accumulation in a specific organ.

BRIEF DESCRIPTION OF DRAWINGS

FIG. 1 is a graph showing changes in the percentage of uncleaved oligonucleotides over time when different types of oligonucleotides having the sequence of 5'-TTTTTTTTTX-3' were treated with 3'-exonuclease.

FIG. 2 is a graph showing the percentage of uncleaved oligonucleotides at 20 minutes after treatment of oligonucleotides having the sequence of 5'-TTTTTTTTXT-3' with 3'-exonuclease.

FIG. 3 is a graph showing relative MALAT1 expression levels in various tissues of mice in administration of various oligonucleotides.

FIG. 4 is a graph showing relative MALAT1 expression levels in various tissues of mice in administration of various oligonucleotides.

DESCRIPTION OF EMBODIMENTS

The following definitions shall apply throughout the specification.

The term "linear alkyl group having 1 to 6 carbon atoms" as used herein refers to any linear alkyl group having 1 to 6 carbon atoms, and specifically to a methyl group, an ethyl group, an n-propyl group, an n-butyl group, an n-pentyl group, or an n-hexyl group. On the other hand, the term "alkyl group having 1 to 6 carbon atoms" refers to any linear, branched, or cyclic alkyl group having 1 to 6 carbon atoms.

The term "linear alkoxy group having 1 to 6 carbon atoms" as used herein encompasses alkoxy groups including any linear alkyl groups having 1 to 6 carbon atoms. Examples thereof include a methoxy group, an ethoxy group, and an n-propoxy group. On the other hand, the term "alkoxy group having 1 to 6 carbon atoms" refers to any linear, branched, or cyclic alkoxy group having 1 to 6 carbon atoms.

The term "cyanoalkoxy group having 1 to 6 carbon atoms" as used herein refers to a group obtained by substituting at least one hydrogen atom included in any linear, branched, or cyclic alkoxy group having 1 to 6 carbon atoms with a cyano group.

The term "linear alkylthio group having 1 to 6 carbon atoms" as used herein encompasses alkylthio groups including any linear alkyl groups having 1 to 6 carbon atoms. Examples thereof include a methylthio group, an ethylthio group, and an n-propylthio group. On the other hand, the term "alkylthio group having 1 to 6 carbon atoms" refers to any linear, branched, or cyclic alkylthio group having 1 to 6 carbon atoms.

The term "linear alkylamino group having 1 to 6 carbon atoms" as used herein encompasses alkylamino groups including one or two alkylamino groups with any linear alkyl group having 1 to 6 carbon atoms. Examples thereof include a methylamino group, a dimethylamino group, an ethylamino group, a methylethylamino group, and a diethylamino group.

The term "alkyl group having 1 to 7 carbon atoms that may form a branch or a ring" as used herein encompasses any linear alkyl groups having 1 to 7 carbon atoms, any branched alkyl groups having 3 to 7 carbon atoms, and any cyclic alkyl groups having 3 to 7 carbon atoms. Such groups may also be referred to merely as "lower alkyl groups". Examples of any linear alkyl groups having 1 to 7 carbon atoms include a methyl group, an ethyl group, an n-propyl group, an n-butyl group, an n-pentyl group, an n-hexyl group, and an n-heptyl group; examples of any branched alkyl groups having 3 to 7 carbon atoms include an isopropyl group, an isobutyl group, a tert-butyl group, and an isopentyl group; and examples of any cyclic alkyl groups having 3 to 7 carbon atoms include a cyclobutyl group, a cyclopentyl group, and a cyclohexyl group.

The term "alkenyl group having 2 to 7 carbon atoms that may form a branch or a ring" as used herein encompasses any linear alkenyl groups having 2 to 7 carbon atoms, any branched alkenyl groups having 3 to 7 carbon atoms, and any cyclic alkenyl groups having 3 to 7 carbon atoms. Such groups may also be referred to merely as "lower alkenyl groups". Examples of any linear alkenyl groups having 2 to 7 carbon atoms include an ethenyl group, a 1-propenyl group, a 2-propenyl group, a 1-butenyl group, a 2-butenyl group, a 1-pentenyl group, a 2-pentenyl group, a 3-pentenyl group, a 4-pentenyl group, and a 1-hexenyl group; examples of any branched alkenyl groups having 3 to 7 carbon atoms include an isopropenyl group, a 1-methyl-1-propenyl group, a 1-methyl-2-propenyl group, a 2-methyl-1-propenyl group, a 2-methyl-2-propenyl group, and a 1-methyl-2-butenyl group; and examples of any cyclic alkenyl groups having 3 to 7 carbon atoms include a cyclobutenyl group, a cyclopentenyl group, and a cyclohexenyl group.

The term "aryl group having 3 to 10 carbon atoms that may have a heteroatom" as used herein encompasses any aryl groups having 6 to 10 carbon atoms that are constituted by only a hydrocarbon, and any heteroaryl groups having 3 to 12 carbon atoms obtained by substituting at least one carbon atom included in the ring structure of the above-mentioned aryl groups with a heteroatom (e.g., a nitrogen atom, an oxygen atom, or a sulfur atom, or a combination thereof). Examples of the aryl groups having 6 to 10 carbon atoms include a phenyl group, a naphthyl group, an indenyl group, and an azulenyl group; and examples of any heteroaryl groups having 3 to 12 carbon atoms include a pyridyl group, a pyrrolyl group, a quinolyl group, an indolyl group, an imidazolyl group, a furyl group, and a thienyl group.

Examples of the term "aralkyl group with an aryl moiety having 3 to 12 carbon atoms that may have a heteroatom" as used herein include a benzyl group, a phenethyl group, a naphthylmethyl group, a 3-phenylpropyl group, a 2-phenylpropyl group, a 4-phenylbutyl group, a 2-phenylbutyl group, a pyridylmethyl group, an indolylmethyl group, a furylmethyl group, a thienylmethyl group, a pyrrolylmethyl group, a 2-pyridylethyl group, a 1-pyridylethyl group, and a 3-thienylpropyl group.

Examples of the term "acyl group" as used herein include aliphatic acyl groups and aromatic acyl groups. Specifically, examples of the aliphatic acyl groups include alkylcarbonyl groups such as a formyl group, an acetyl group, a propionyl group, a butyryl group, an isobutyryl group, a pentanoyl group, a pivaloyl group, a valeryl group, an isovaleryl group, an octanoyl group, a nonanoyl group, a decanoyl group, a 3-methylnonanoyl group, a 8-methylnonanoyl group, a 3-ethyloctanoyl group, a 3,7-dimethyloctanoyl group, an undecanoyl group, a dodecanoyl group, a tridecanoyl group, a tetradecanoyl group, a pentadecanoyl group, a hexadecanoyl group, a 1-methylpentadecanoyl group, a 14-methylpentadecanoyl group, a 13,13-dimethyltetradecanoyl group, a heptadecanoyl group, a 15-methylhexadecanoyl group, an octadecanoyl group, a 1-methylheptadecanoyl group, a nonadecanoyl group, an eicosanoyl group, and a heneicosanoyl group; carboxylated alkylcarbonyl groups such as a succinoyl group, a glutaroyl group, and an adipoyl group; halogeno lower-alkyl-carbonyl groups such as a chloroacetyl group, a dichloroacetyl group, a trichloroacetyl group, and a trifluoroacetyl group; lower-alkoxy-lower-alkyl-carbonyl groups such as a methoxyacetyl group; and unsaturated alkylcarbonyl groups such as an (E)-2-methyl-2-butenoyl group. Examples of the aromatic acyl groups include arylcarbonyl groups such as a benzoyl group, an α-naphthoyl group, and a 8-naphthoyl group; halogeno arylcarbonyl groups such as a 2-bromobenzoyl group and a 4-chlorobenzoyl group; low-alkylated arylcarbonyl groups such as a 2,4,6-trimethylbenzoyl group and a 4-toluoyl group; low-alkoxylated arylcarbonyl groups such as a 4-anisoyl group; carboxylated arylcarbonyl groups such as a 2-carboxybenzoyl group, a 3-carboxybenzoyl group, and a 4-carboxybenzoyl group; nitrated arylcarbonyl groups such as a 4-nitrobenzoyl group and a 2-nitrobenzoyl group; low-alkoxycarbonylated arylcarbonyl groups such as a 2-(methoxycarbonyl)benzoyl group; and arylated arylcarbonyl groups such as a 4-phenylbenzoyl group. A formyl group, an acetyl group, a propionyl group, a butyryl group, an isobutyryl group, a pentanoyl group, a pivaloyl group, and a benzoyl group are preferable.

Examples of the term "silyl group" as used herein include tri-lower-alkyl-silyl groups such as a trimethylsilyl group, a triethylsilyl group, an isopropyldimethylsilyl group, a t-butyldimethylsilyl group, a methyldiisopropylsilyl group, a methyldi-t-butylsilyl group, and a triisopropylsilyl group; and tri-lower-alkyl-silyl groups that have undergone substitution by one or two aryl groups, such as a diphenylmethylsilyl group, a butyldiphenylbutylsilyl group, a diphenylisopropylsilyl group, and a phenyldiisopropylsilyl group. A trimethylsilyl group, a triethylsilyl group, a triisopropylsilyl group, a t-butyldimethylsilyl group, and a t-butyldiphenylsilyl group are preferable, and a trimethylsilyl group is more preferable.

Examples of the term "halogen atom" as used herein include a fluorine atom, a chlorine atom, a bromine atom, and an iodine atom. A fluorine atom or a chlorine atom is preferable.

"Protecting groups" in the terms "amino group protecting group for nucleic acid synthesis", "hydroxy group protecting group for nucleic acid synthesis", "hydroxy group protected by a protecting group for nucleic acid synthesis", "phosphate group protected by a protecting group for nucleic acid synthesis", and "mercapto group protected by a protecting group for nucleic acid synthesis" as used herein are not particularly limited as long as they can stably protect an amino group, a hydroxy group, a phosphate group, or a mercapto group during nucleic acid synthesis. Specifically, the protecting groups are stable under an acidic or neutral condition and can be cleaved using chemical techniques such as hydrogenolysis, hydrolysis, electrolysis, and photolysis. Examples of such protecting groups include lower alkyl groups, lower alkenyl groups, acyl groups, tetrahydropyranyl or tetrahydrothiopyranyl groups, tetrahydrofuranyl or tetrahydrothiofuranyl groups, silyl groups, lower-alkoxy-methyl groups, low-alkoxylated lower-alkoxy-methyl groups, halogeno lower-alkoxy-methyl groups, low-alkoxylated ethyl groups, halogenated ethyl groups, methyl groups that have undergone substitution by 1 to 3 aryl groups, "methyl groups that have undergone substitution by 1 to 3 aryl groups in which an aryl ring has undergone substitution by a lower alkyl group, lower alkoxy group, halogen atom, or cyano group", lower-alkoxy-carbonyl groups, "aryl groups that have undergone substitution by a halogen atom, lower alkoxy group, or nitro group", "lower-alkoxy-carbonyl groups that have undergone substitution by a halogen atom or tri-lower-alkyl-silyl group", alkenyloxycarbonyl groups, and "aralkyloxycarbonyl groups in which an aryl ring may have undergone substitution by a lower alkoxy group or nitro group".

More specific examples of the tetrahydropyranyl or tetrahydrothiopyranyl groups include a tetrahydropyran-2-yl group, a 3-bromotetrahydropyran-2-yl group, a 4-methoxytetrahydropyran-4-yl group, a tetrahydrothiopyran-4-yl group, and a 4-methoxytetrahydrothiopyran-4-yl group. Examples of the tetrahydrofuranyl or tetrahydrothiofuranyl groups include a tetrahydrofuran-2-yl group and a tetrahydrothiofuran-2-yl group. Examples of the lower-alkoxy-methyl groups include a methoxymethyl group, a 1,1-dimethyl-1-methoxymethyl group, an ethoxymethyl group, a propoxymethyl group, an isopropoxymethyl group, a butoxymethyl group, and a t-butoxymethyl group. An example of the low-alkoxylated lower-alkoxy-methyl groups is a 2-methoxyethoxymethyl group. Examples of the halogeno lower-alkoxy-methyl groups include a 2,2,2-trichloroethoxymethyl group and a bis(2-chloroethoxy)methyl group. Examples of the low-alkoxylated ethyl groups include a 1-ethoxyethyl group and a 1-(isopropoxy)ethyl group. An example of the halogenated ethyl groups is a 2,2,2-trichloroethyl group. Examples of the methyl groups that have undergone substitution by 1 to 3 aryl groups include a benzyl group, an α-naphthylmethyl group, a β-naphthylmethyl group, a diphenylmethyl group, a triphenylmethyl group, an α-naphthyldiphenylmethyl group, and a 9-anthrylmethyl group. Examples of the "methyl groups that have undergone substitution by 1 to 3 aryl groups in which an aryl ring has undergone substitution by a lower alkyl group, lower alkoxy group, halogen atom, or cyano group" include a 4-methylbenzyl group, a 2,4,6-trimethylbenzyl group, a 3,4,5-trimethylbenzyl group, a 4-methoxybenzyl group, a 4-methoxyphenyldiphenylmethyl group, a 4,4'-dimethoxytriphenylmethyl group, a 2-nitrobenzyl group, a 4-nitrobenzyl group, a 4-chlorobenzyl group, a 4-bromobenzyl group, and a 4-cyanobenzyl group. Examples of the lower-alkoxy-carbonyl groups include a methoxycarbonyl group, an ethoxycarbonyl group, a t-butoxycarbonyl group, and an isobutoxycarbonyl group. Examples of the "aryl groups that have undergone substitution by a halogen atom, lower alkoxy group, or nitro group" include a 4-chlorophenyl group, a 2-fluorophenyl group, a 4-methoxyphenyl group, a 4-nitrophenyl group, and a 2,4-dinitrophenyl group. Examples of the "lower-alkoxy-carbonyl groups that have undergone substitution by a halogen atom or tri-lower-alkyl-silyl group" include a 2,2,2-trichloroethoxycarbonyl group and 2-trimethylsilylethoxycarbonyl group. Examples of the alkenyloxycarbonyl groups include a vinyloxycarbonyl group and an aryloxycarbonyl group. Examples of the "aralkyloxycarbonyl groups in which an aryl ring may have undergone substitution by a lower alkoxy group or nitro group" include a benzyloxycarbonyl group, a 4-methoxybenzyloxycarbonyl group, a 3,4-dimethoxybenzyloxycarbonyl group, a 2-nitrobenzyloxycarbonyl group, and a 4-nitrobenzyloxycarbonyl group.

In one embodiment, examples of the "hydroxy group protecting group for nucleic acid synthesis" include aliphatic acyl groups, aromatic acyl groups, methyl groups that have undergone substitution by 1 to 3 aryl groups, "methyl groups that have undergone substitution by 1 to 3 aryl groups in which an aryl ring has undergone substitution by a lower alkyl, lower alkoxy, halogen, or cyano group", and silyl groups. Alternatively, in one embodiment, examples of the "hydroxy group protecting group for nucleic acid synthesis" include an acetyl group, a benzoyl group, a benzyl group, a p-methoxybenzoyl group, a dimethoxytrityl group, a monomethoxytrityl group, a tert-butyldiphenylsilyl group, a tert-butyldimethylsilyl (TBDMS) group, a [(triisopropylsilyl)oxy]methyl (TOM) group, a [(2-nitrobenzyl)oxy]methyl (NBOM) group, a bis(acetoxyethoxy)methyl ether (ACE) group, a tetrahydro-4-methoxy-2H-pyran-2-yl (Mthp) group, a 1-(2-cyanoethoxy)ethyl (CEE) group, a 2-cyanoethoxymethyl (CEM) group, a tert-butyldithiomethyl (DTM) group, a 2-(4-tolylsulfonyl)ethoxymethyl (TEM) group, and a 4-(N-dichloroacetyl-N-methylamino)benzyloxymethyl (4-MABOM) group.

In one embodiment, examples of the protecting group used for the "hydroxy group protected by a protecting group for nucleic acid synthesis" include aliphatic acyl groups, aromatic acyl groups, "methyl groups that have undergone substitution by 1 to 3 aryl groups", "aryl groups that have undergone substitution by a halogen atom, lower alkoxy group, or nitro group", lower alkyl groups, and lower alkenyl groups. Alternatively, in one embodiment, examples of the protecting group used for the "hydroxy group protected by a protecting group for nucleic acid synthesis" include a benzoyl group, a benzyl group, a 2-chlorophenyl group, a 4-chlorophenyl group, and a 2-propenyl group.

In one embodiment, examples of the "amino group protecting group for nucleic acid synthesis" include acyl groups, and a benzoyl group is preferable.

In one embodiment, examples of the "protecting group" used for the "phosphate group protected by a protecting group for nucleic acid synthesis" include lower alkyl groups, lower alkyl groups that have undergone substitution by a cyano group, aralkyl groups, "aralkyl groups in which an aryl ring has undergone substitution by a nitro group or halogen atom", and "aryl groups that have undergone substitution by a lower alkyl group, halogen atom, or nitro group". Alternatively, in one embodiment, examples of the "protecting group" used for the "phosphate group protected by a protecting group for nucleic acid synthesis" include a 2-cyanoethyl group, a 2,2,2-trichloroethyl group, a benzyl group, a 2-chlorophenyl group, and a 4-chlorophenyl group.

In one embodiment, examples of the "protecting group" used for the "mercapto group protected by a protecting group for nucleic acid synthesis" include aliphatic acyl groups and aromatic acyl groups, and a benzoyl group is preferable.

In this specification, among groups represented by —P($R^4$)$R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms, a group in which $R^4$ is $OR^{4a}$ and $R^5$ is $NR^{5a}$ is referred to as a "phosphoramidite group", where an example of $R^{4a}$ is a cyanoalkoxy group having 1 to 6 carbon atoms, and an example of $R^{5a}$ is an alkyl group having 1 to 6 carbon atoms. Preferable examples of the phosphoramidite group include a group represented by a formula —P(OC$_2$H$_4$CN)(N(iPr)$_2$) and a group represented by a formula —P(OCH$_3$)(N(iPr)$_2$). In these formulae, iPr represents an isopropyl group.

The term "alkylene group having 1 to 5 carbon atoms" as used herein refers to groups represented by —(CH$_2$)$_n$—, where n is an integer of 1 to 5, that is, a methylene group (—CH$_2$—) and divalent alkylene groups (ethylene, trimethylene, tetramethylene, and pentamethylene groups) constituted by 2 to 5 methylene groups.

The term "alkenylene group having 2 to 5 carbon atoms" as used herein refers to divalent groups constituted by a linear chain with 2 to 5 carbon atoms containing one double bond, and specific examples thereof include —CH=CH—, —CH$_2$—CH=CH—, —CH=CH—CH$_2$—, —CH$_2$—CH$_2$—CH=CH—, —CH$_2$—CH=CH—CH$_2$—, —CH=CH—CH$_2$—CH$_2$—, —CH$_2$—CH$_2$—CH$_2$—CH=CH—, —CH$_2$—CH$_2$—CH=CH—CH$_2$—, —CH$_2$—CH=CH—CH$_2$—CH$_2$—, and —CH=CH—CH$_2$—CH$_2$—CH$_2$—.

The terms "nucleoside" and "nucleoside analogue" as used herein refer to non-natural nucleosides of "nucleosides" in which a purine base or a pyrimidine base binds to sugar, as well as those in which a heteroaromatic ring or an aromatic hydrocarbon ring other than purine and pyrimidine that can serve as a substitute for a purine or pyrimidine base binds to sugar.

The terms "artificial oligonucleotide" and "oligonucleotide analogue" as used herein refer to non-natural derivatives of "oligonucleotides" in which, for example, two to fifty of the same or different "nucleosides" or "nucleoside analogues" are bound via phosphodiester bonds. Preferable examples of such analogues include sugar derivatives with sugar moieties modified; thioated derivatives with phosphodiester moieties thioated; esters with terminal phosphate moieties esterificated; and amides in which amino groups on purine bases are amidated.

The term "salt thereof" as used herein refers to a salt of a compound represented by the formula (I) of the present invention. Examples of such salt include metal salts including alkali metal salts such as sodium salts, potassium salts, and lithium salts, alkali earth metal salts such as calcium salts and magnesium salts, and aluminum salts, iron salts, zinc salts, copper salts, nickel salts, and cobalt salts; amine salts including inorganic salts such as ammonium salts, and organic salts such as t-octylamine salts, dibenzylamine salts, morpholine salts, glucosamine salts, phenylglycine alkylester salts, ethylenediamine salts, N-methylglucamine salts, guanidine salts, diethylamine salts, triethylamine salts, dicyclohexylamine salts, N,N'-dibenzylethylenediamine salts, chloroprocaine salts, procaine salts, diethanolamine salts, N-benzyl-phenethylamine salts, piperazine salts, tetramethylammonium salts, and tris(hydroxymethyl)aminomethane salts; inorganic acid salts including halide hydroacid salts such as hydrofluoric acid salts, hydrochloric acid salt, hydrobromic acid salts, and hydroiodic acid salts, nitrates, perchlorates, sulfates, and phosphates; organic acid salts including lower-alkane-sulfonates such as methanesulfonates, trifluoromethanesulfonates, and ethanesulfonates, arylsulfonates such as benzenesulfonates and p-toluenesulfonates, acetates, malates, fumarates, succinates, citrates, tartrates, oxalates and maleates; and amino acid salts such as glycine salts, lysine salts, arginine salts, ornithine salts, glutamates, and aspartates.

The term "pharmacologically acceptable salt thereof" as used herein refers to a salt of an oligonucleotide analogue containing at least one nucleoside structure represented by the formula (II) of the present invention. Examples of such salts include metal salts including alkali metal salts such as sodium salts, potassium salts, and lithium salts, alkali earth metal salts such as calcium salts and magnesium salts, and aluminum salts, iron salts, zinc salts, copper salts, nickel salts, and cobalt salts; amine salts including inorganic salts such as ammonium salts, and organic salts such as t-octylamine salts, dibenzylamine salts, morpholine salts, glucosamine salts, phenylglycine alkylester salts, ethylenediamine salts, N-methylglucamine salts, guanidine salts, diethylamine salts, triethylamine salts, dicyclohexylamine salts, N,N'-dibenzylethylenediamine salts, chloroprocaine salts, procaine salts, diethanolamine salts, N-benzyl-phenethylamine salts, piperazine salts, tetramethylammonium salts, and tris(hydroxymethyl)aminomethane salts; inorganic acid salts including halide hydroacid salts such as hydrofluoric acid salts, hydrochloric acid salt, hydrobromic acid salts, and hydroiodic acid salts, nitrates, perchlorates, sulfates, and phosphates; organic acid salts including lower-alkane-sulfonates such as methanesulfonates, trifluoromethanesulfonates, and ethanesulfonates, arylsulfonates such as benzenesulfonates and p-toluenesulfonates, acetates, malates, fumarates, succinates, citrates, tartrates, oxalates and maleates; and amino acid salts such as glycine salts, lysine salts, arginine salts, ornithine salts, glutamates, and aspartates.

Hereinafter, the present invention will be described in detail.

(Cross-Linked Nucleoside)

A cross-linked nucleoside according to the present invention is a compound represented by a formula (I) below or a salt thereof:

[Chemical Formula 8]

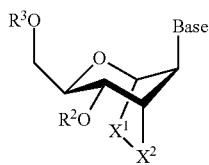

(I)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or $-P(R^4)R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or $-Y^1-(CH_2)_n-$, $-(CH_2)_n-Y^1-$ or $-(CH_2)_l-Y^1-(CH_2)_m-$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $-NH-$, or a methylene group.

In the formula (I) above, "Base" is a purine base (i.e., a purin-9-yl group) or a pyrimidine base (i.e., a 2-oxo-1,2-dihydropyrimidin-1-yl group), for example. These bases may have any one or more substituents selected from the α group consisting of a hydroxy group, linear alkyl groups having 1 to 6 carbon atoms, linear alkoxy groups having 1 to 6 carbon atoms, a mercapto group, linear alkylthio groups having 1 to 6 carbon atoms, an amino group, linear alkylamino groups having 1 to 6 carbon atoms, and halogen atoms.

Specific examples of the "Base" above include an adeninyl group, a guaninyl group, a cytosinyl group, an uracinyl group, a thyminyl group, a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, and a 4-amino-5-methyl-2-oxo-1,2-dihydropyrimidin-1-yl group.

Alternatively, from the viewpoint of introducing "Bases" into an oligonucleotide therapeutic, the "Bases" are preferably groups represented by structural formulae below:

[Chemcial Formula 9]

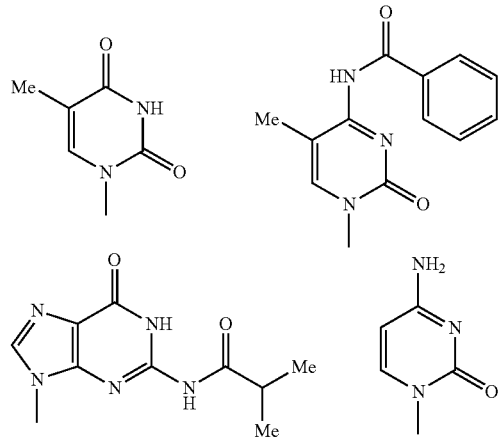

-continued

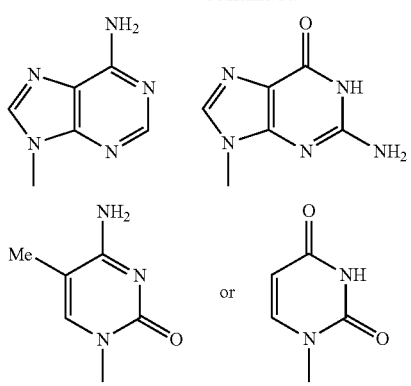

as well as a 2-oxo-4-hydroxy-5-methyl-1,2-dihydropyrimidin-1-yl group, a 2-oxo-4-amino-1,2-dihydropyrimidin-1-yl group, a 6-aminopurin-9-yl group, a 2-amino-6-hydroxypurin-9-yl group, a 4-amino-5-methyl-2-oxo-1,2-dihydropyrimidin-1-yl group, and a 2-oxo-4-hydroxy-1,2-dihydropyrimidin-1-yl group are preferable. It is preferable that a hydroxy group and an amino group included in the above-mentioned groups serving as "Bases" are protected by a protecting group during oligonucleotide synthesis.

As shown in the formula (I), the cross-linked nucleotide of the present invention has a hexitol nucleic acid (HNA) backbone in which the sugar moiety in the nucleic acid is composed of a pyranose ring, and a cross-linked structure ($-X^1-X^2-$) is introduced between the 1' and 3' positions of the HNA backbone.

Turning now to this cross-linked structure, in one embodiment, examples of the compound represented by the formula (I) include compounds represented by formulae (I-a) to (I-d) below:

[Chemical Formula 10]

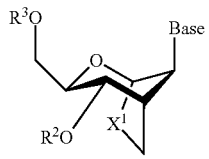

(I-a)

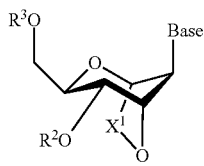

(I-b)

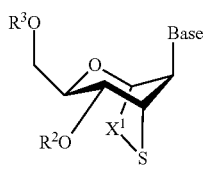

(I-c)

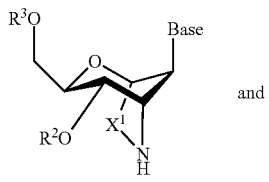

and

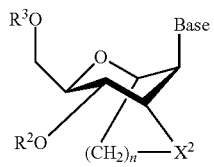

(I-d)

In the formulae (I-a) to (I-d), Base, $R^2$, $R^3$, and $X^1$ are as defined for the formula (I) above.

Alternatively, in one embodiment, other examples of the compound represented by the formula (I) include compounds represented by formulae (I-e) to (I-h) below:

[Chemical Formula 11]

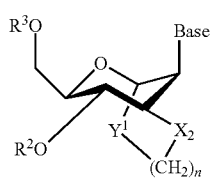

(I-e)

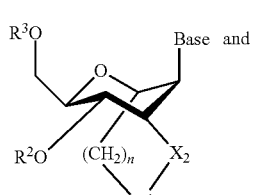

(I-f)

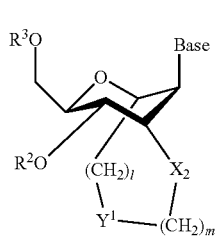

(I-g)

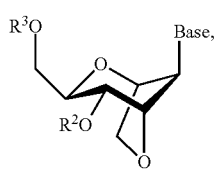

(I-h)

In the formulae (I-e) to (I-g), Base, $R^2$, $R^3$, $X^2$, $Y^1$, l, m, and n are as defined for the formula (I) above.

Specific examples of such compounds represented by the formula (I) include, but are not necessarily limited to, compounds represented by formulae (I-1) to (I-3) below:

[Chemical Formula 12]

(I-1)

-continued

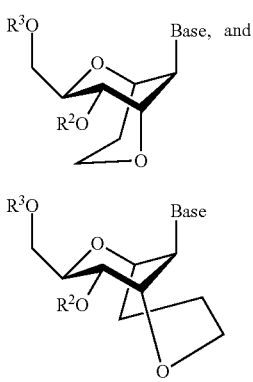

(I-2)

(I-3)

In the formulae (I-1) to (I-3), Base, $R^2$, and $R^3$ are as defined for the formula (I) above.

As is clear from the formula (I) above, the cross-linked nucleoside of the present invention has an HNA backbone similar to the N-conformation of natural nucleic acids. Thus, oligonucleotides that will be described later have high binding affinity for a single-stranded RNA (ssRNA).

(Oligonucleotide)

In the present invention, an oligonucleotide can be easily produced by using such a cross-linked nucleoside represented by the formula (I), and using, for example, an amidite method that is well known in the art, or triphosphorylation such as that describedin M. Kuwahara et al., Nucleic Acids Res., 2008, Vol. 36, No. 13, pp. 4257-4265.

An oligonucleotide of the present invention or a pharmacologically acceptable salt thereof (these may be collectively referred to as "oligonucleotides of the present invention" hereinafter) contains at least one nucleoside structure represented by a formula (II) below:

[Chemical Formula 13]

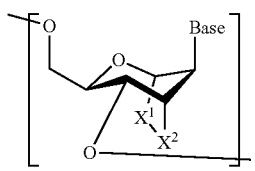

(II)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$X^1$ is an alkylene group having 1 to 5 carbon atoms, an alkenylene group having 2 to 5 carbon atoms, or $-Y^1-(CH_2)_n-$, $-(CH_2)_n-Y^1-$ or $-(CH_2)_l-$ $Y^1-(CH_2)_m-$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $-NH-$, or a methylene group.

In one embodiment, examples of the nucleoside structure represented by the formula (II) contained in the oligonucleotides of the present invention include structures represented by formulae (II-a) to (II-d) below:

[Chemical Formula 14]

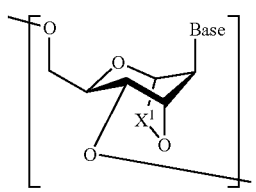

(II-a)

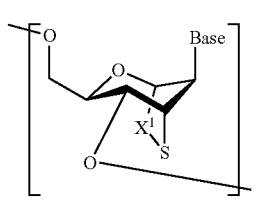

(II-b)

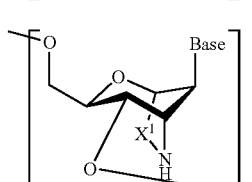

(II-c)

and

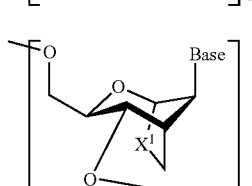

(II-d)

In the formulae (II-a) to (I-d), Base and $X^1$ are as defined for the formula (II) above.

Alternatively, in one embodiment, other examples of the nucleoside structure represented by the formula (II) contained in the oligonucleotides of the present invention include structures represented by formulae (II-e) to (I-h) below:

[Chemical Formula 15]

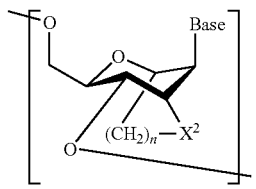

(II-e)

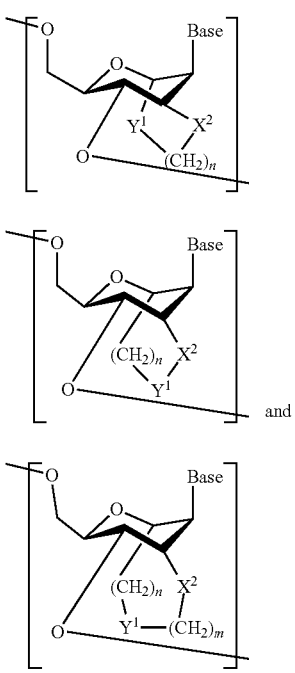

In the formulae (II-e) to (II-g), Base, $X^2$, $Y^1$, l, m, and n are as defined for the formula (II) above.

Specific examples of such nucleoside structures represented by the formula (II) contained in the oligonucleotide of the present invention include, but are not necessarily limited to, structures represented by formulae (II-1) to (II-3) below:

[Chemical Formula 16]

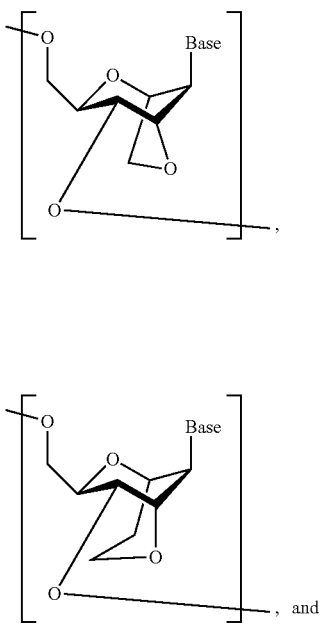

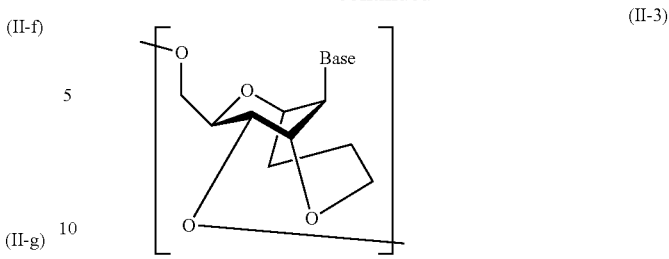

In the formulae (II-1) to (II-3), Base is as defined for the formula (I) above.

The oligonucleotide of the present invention has at least one nucleoside structure at any position. There is no particular limitation on the positions and number of the nucleoside structures, and the oligonucleotide can be designed as appropriate depending on the purpose.

An oligonucleotide (antisense molecule) containing such a nucleoside structure has significantly improved nuclease resistance when compared with the cases where conventional 2',4'-BNA/LNA is used, and also has good binding affinity for ssRNA comparable to that of known 2',4'-BNA/LNA Moreover, the oligonucleotide of the present invention has superior enzyme resistance to that of phosphorothioate-modified nucleic acids (hereinafter also referred to as PS-modified nucleic acids), which are contained in many currently commercially-available oligonucleotide therapeutics.

With all these facts, an oligonucleotide synthesized using the cross-linked nucleoside of the present invention is expected to be useful as a pharmaceutical agent (antisense molecule), such as antitumor agents and antiviral drugs, inhibiting or restoring the functions of specific genes to treat a disease.

In particular, for antisense therapies, the binding affinity for complementary sense strand RNAs and the resistance to in vivo DNA-degrading enzymes are both required. Generally, a nucleic acid in the form of a single strand is known to constantly have a structural fluctuation of a sugar moiety between the form close to a sugar moiety in a double-stranded DNA and the form close to a sugar moiety in a double-stranded DNA-RNA or a double-stranded RNA. Therefore, the binding affinity for target ssRNA can be significantly improved by chemically modifying the conformation of the sugar moiety in the nucleic acid in a predetermined manner in advance as in the present invention. In addition, although nucleolytic enzymes cleave the phosphodiester moiety of oligonucleic acids, since a bulky substituent is present on the sugar moiety of the cross-linked nucleoside of the present invention, degradation of the oligonucleic acid can be suppressed by steric hindrance. Furthermore, in the cross-linked nucleoside of the present invention, the cross-linked structure ($-X^1-X^2-$) is introduced between the 1' and 3' positions of the HNA backbone as described above. The HNA backbone and the cross-linked structure improve both the binding affinity for target ssRNA and the enzyme resistance of the cross-linked nucleoside of the present invention.

Additives typically used in the art of pharmaceuticals such as excipients, binders, preservatives, oxidation stabilizers, disintegrants, lubricants, and flavoring substances can be added to the oligonucleotide of the present invention to prepare parenteral formulations or liposomal formulations. Also, for example, topical formulations such as liquids, creams, and ointments may be prepared by adding pharmaceutical carriers typically used in the art.
EXAMPLES
Hereinafter, the present invention will be described in greater detail using examples. However, the present invention is not limited to the examples below.
Example 1: Synthesis of Cross-Linked Nucleoside (1)
[Chemial Formula 17]
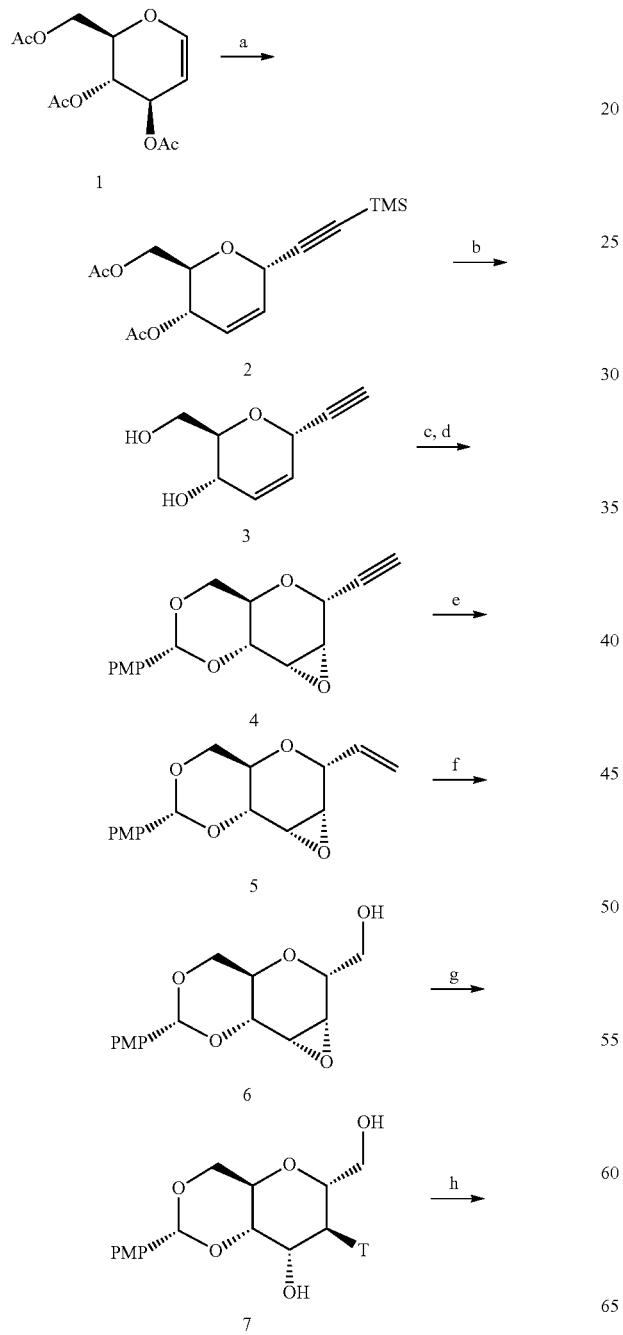
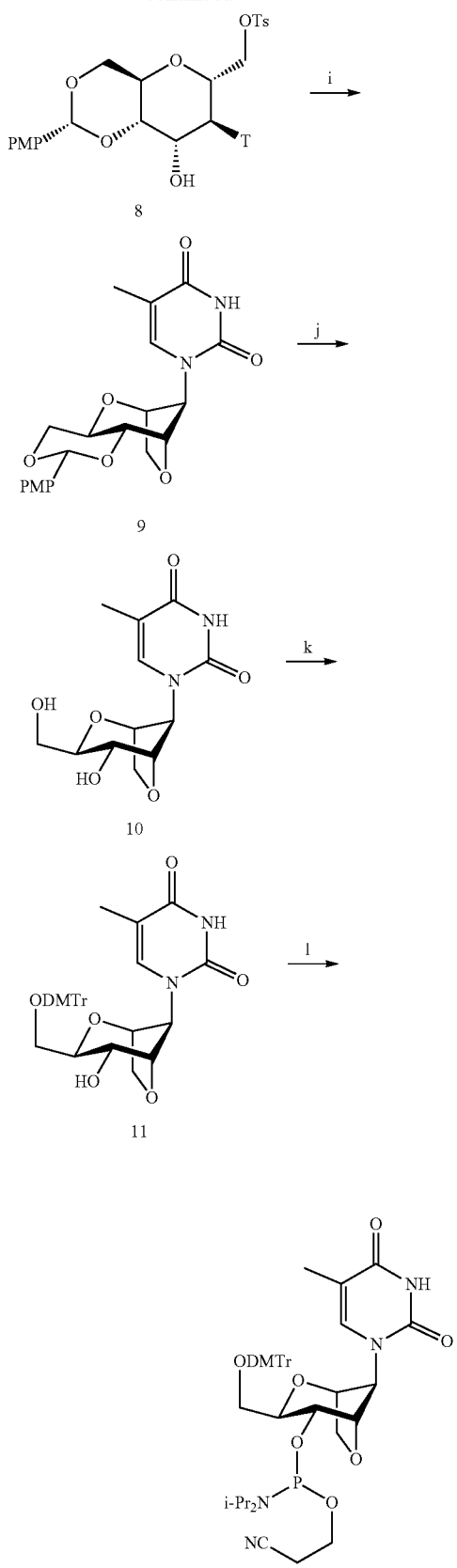

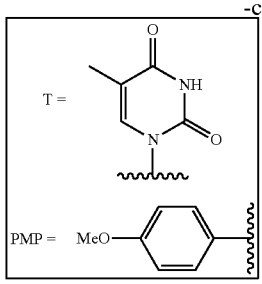

Reagents and Conditions for Each Step:
(a) Bis(trimethylsilyl)acetylene, SnCl₄, DCM, -20° C. 0.5 h;
(b) NaOMe, MeOH, rt, 1 h 94% (2 step)s;
(c) MCPBA, DCM, rt, 24 h;
(d) p-anisaldehyde dimethylacetal, CSA, MeCN, reflux, 1.5 h, 62% (2 steps);
(e) Pd/PEI, H₂, MeOH/1,4-dioxane, rt, 1.5 h;
(f) O₃, DCM/MeOH, -78° C., 1 h; NaBH₄, rt, 1 h, 82% (2 steps);
(g) thymine, DBU, MeCN, 85° C. (MW), 48 h,
(h) TsCl, TEA, DMAP, DCM, rt, 2.5 h, 52% (2 steps);
(i) NaH, DMF, rt 1 h, 97%;
(j) Pd(OH)₂/C, H₂, MeOH, rt, 1 h;
(k) DMTrCl, pyridine, rt, 3 h, 75% (2 steps);
(l) 2-cyanoethyl N,N-diisopropylchlorophosphoramidite, DIPEA, NMI, MeCN, rt, 1 h, 79%.

(1-1) Synthesis of Compound 2

[Chemial Formula 18]

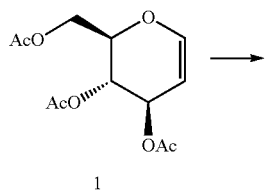

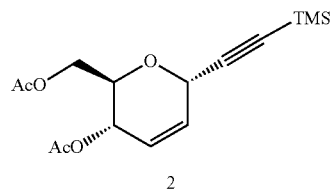

Under nitrogen stream, a 1.0 M dichloromethane solution (16.53 mL, 16.53 mmol) of SnCl₄ was added at −20° C. to an anhydrous dichloromethane solution (50 mL) of a compound 1 (3.00 g, 11.02 mmol) and bis(trimethylsilyl)acetylene (3.76 g, 22.04 mmol), and the resulting mixture was stirred at the same temperature for 0.5 hours. After completion of the reaction, the reaction solution was added to saturated aqueous sodium bicarbonate/saturated aqueous Rochelle salt solution (=1:1 (volume ratio), 200 mL), and the resulting mixture was stirred at 0° C. for 30 minutes. The mixture was then extracted using dichloromethane, the extraction fraction was washed with water and saturated saline and then dried over anhydrous sodium sulfate, and the solvent was distilled away under reduced pressure. Thus, a compound 2 was obtained as a crude product. The compound 2 was directly used for the next reaction without purification.

(1-2) Synthesis of Compound 3

[Chemial Formula 19]

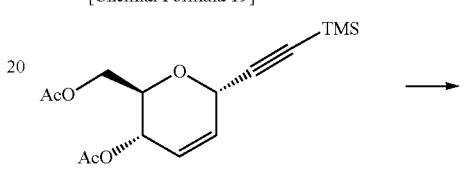

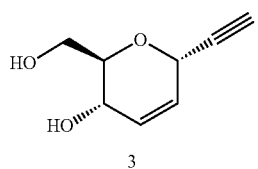

To a methanol solution (50 mL) of the compound 2 obtained above was added, under ice-cooling, a 5 M methanol solution (2.20 mL, 11.02 mmol) of sodium methoxide, and the resulting mixture was stirred at room temperature under nitrogen stream for 1 hour. After completion of the reaction, a strong acid cation exchange resin (DOWEX 50×8 200-400 Mesh, available from FUJIFILM Wako Pure Chemical Corporation) was added to the reaction solution, and the resulting mixture was stirred for 30 minutes for neutralization. Then, the mixture was filtered, and the filtrate was concentrated. The obtained residue was purified by silica gel column chromatography (SiO₂, methanol/CHCl₃=5%) to obtain a compound 3 (1.60 g, 94%, two steps from the compound 1) as a colorless oily substance.

Table 1 shows data on the properties of the obtained compound 3.

TABLE 1

Physical property data of the obtained compound 3

$^1$H-NMR (300 MHz, CDCl₃) δ: 2.52 (1H, d, J = 2.4 Hz), 2.67 (1H, brs), 2.90 (1H, brs), 3.72 (1H, ddd, J = 8.8, 8.6, 4.1 Hz), 3.82 (1H, dd, J = 11.9, 4.6 Hz), 3.90 (1H, dd, J = 11.7, 3.8 Hz), 4.19 (1H, ddd, J = 8.6, 4.4, 1.7 Hz), 4.88-4.91 (1H, m), 5.77 (1H, ddd, J = 10.1, 3.1, 1.7 Hz), 5.85 (1H, ddd, J = 10.0, 1.7, 1.7 Hz); $^{13}$C-NMR (75 MHz, CDCl₃) δ: 62.3, 63.0, 63.5, 74.7, 75.0, 80.6, 126.9, 130.2; HRMS (MALDI): Calculated for C₈H₁₀O₃Na [M + Na]⁺: 177.0522, Found: 177.0523.

(1-3) Synthesis of Compound 4

[Chemial Formula 20]

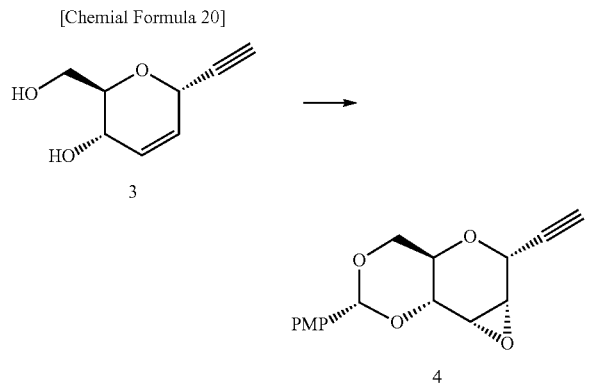

To a dichloromethane solution (150 mL) of the compound 3 obtained above (5.36 g, 34.8 mmol) was added, under ice-cooling, meta-chlorobenzoic acid (mCPBA) (purity: 70%, 17.1 g, 69.5 mmol), and the resulting mixture was stirred at room temperature for 24 hours. After completion of the reaction, the reaction solution was directly loaded on silica gel column chromatography and simply purified (SiO$_2$, hexane/ethyl acetate=1:1 to 0/1) to obtain a mixture (5.62 g) of stereoisomers of epoxydiol as a colorless oily substance. Then, under nitrogen stream, an anhydrous acetonitrile solution (150 mL) of this epoxydiol (5.62 g), p-anisaldehyde dimethyl acetal (11.8 mL, 69.5 mmol), and (±)-camphorsulfonic acid (807.6 mg, 3.48 mmol) was heated under reflux for 1.5 hours. After completion of the reaction, the reaction solution was neutralized with triethylamine (1 mL) and slowly cooled on ice. The resulting white solid was collected by filtration, and the filtrate was distilled away under reduced pressure, followed by washing with methanol. The resulting white solid was again collected by filtration and combined with the previously obtained white solid to obtain a compound 4 (6.23 g, 62%, two steps from the compound 3).

Table 2 shows data on the properties of the obtained compound 4.

TABLE 2

Physical property data of the obtained compound 4

$^1$H-NMR (300 MHz, dmso-d6) δ: 3.59-3.77 (5H, m), 3.75 (3H, s), 4.05 (1H, d, J = 4.5 Hz), 4.08 (1H, d, J = 4.5 Hz), 5.03 (1H, dd, J = 1.0, 2.4 Hz), 5.64 (1H, s), 6.92 (2H, d, J = 8.6 Hz), 7.34 (2H, d, J = 8.6 Hz); $^{13}$C-NMR (75 MHz, dmso-d6) δ: 52.2, 55.1, 55.6, 62.4, 62.6, 68.2, 77.0, 77.9, 80.1, 102.0, 113.9, 128.1, 130.4, 160.1; HRMS (MALDI): Calculated for C$_{16}$H$_{17}$O$_5$ [M + H]$^+$: 289.1071, Found: 289.1066.

(1-4) Synthesis of Compound 5

[Chemial Formula 21]

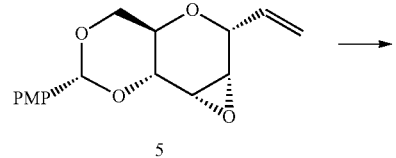

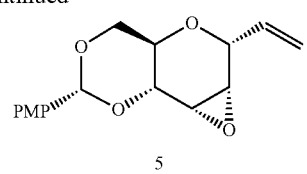

To a methanol/1,4-dioxane mixed solution (10 mL, methanol/1,4-dioxane=1:4 (volume ratio)) of the compound 4 obtained above (300 mg, 1.04 mmol) was added palladium-polyethyleneimine (Pd/PEI) (30 mg, 10% by weight), and the resulting mixture was stirred at room temperature under hydrogen stream for 1.5 hours. After completion of the reaction, the mixture was loaded on short silica gel column chromatography and washed (CHCl$_3$/methanol=14/1). Thus, a compound 5 was obtained as a crude product. For this crude product (compound 5), the separation of the excessively reduced 1-ethyl analogue was difficult, and therefore, the crude product (compound 5) was directly used for the next reaction without further purification.

(1-5) Synthesis of Compound 6

[Chemial Formula 22]

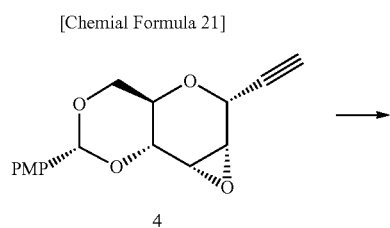

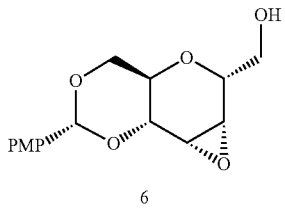

A methanol/dichloromethane mixed solution (10 mL, DCM/MeOH=4:1 (volume ratio)) of the compound 5 obtained above (298 mg) was reacted with ozone at −78° C.

After 1 hour, sodium borohydride (157 mg, 4.16 mmol) was added at the same temperature, and the resulting mixture was slowly warmed to room temperature. After stirring for 1 hour, a saturated aqueous ammonium chloride solution and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, acetone/CHCl$_3$=20% to 27%) to obtain a compound 6 (250 mg, 82%, two steps from the compound 4) as a white solid.

Table 3 shows data on the properties of the obtained compound 6.

TABLE 3

Physical property data of the obtained compound 6

$^1$H-NMR (300 MHz, CDCl$_3$) δ: 1.91 (1H, dd, J = 3.1, 8.6 Hz), 3.45 (1H, dd, J = 3.1, 4.8 Hz), 3.56 (1H, d, J = 4.5 Hz), 3.65 (1H, dd, J = 10.3, 10.3 Hz), 3.74-3.82 (1H, m), 3.79 (3H, s), 3.85-3.98 (2H, m), 4.02 (1H, dd, J = 1.0, 8.9 Hz), 4.16-4.22 (2H, m), 5.52 (1H, s), 6.88 (2H, d, J = 8.9 Hz), 7.42 (2H, d, J = 8.6 Hz); $^{13}$C-NMR (75 MHz, CDCl$_3$) δ: 50.7, 53.3, 55.4, 60.9, 61.7, 69.1, 71.8, 77.9, 102.7, 113.8, 127.7, 129.6, 160.3; HRMS (MALDI): Calculated for C$_{15}$H$_{19}$O$_6$ [M + H]$^+$: 295.1176, Found: 295.1174.

(1-6) Synthesis of Compound 7

[Chemial Formula 23]

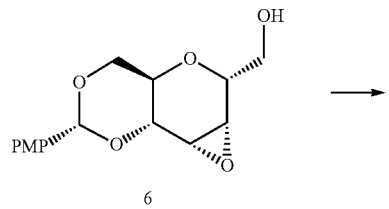

6

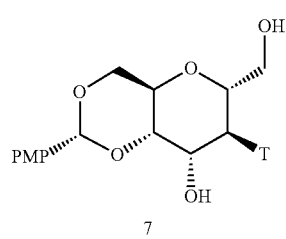

7

An anhydrous acetonitrile solution (12 mL) of the compound 6 obtained above (353.1 mg, 1.20 mmol), thymine (302.6 mg, 2.40 mmol), and diazabicycloundecene (DBU) (717.7 μL, 4.80 mmol) was heated at 85° C. under microwave irradiation for 48 hours. After completion of the reaction, the resulting white solid was collected by filtration, and thus, a compound 7 was obtained as a crude product. The compound 7 was directly used for the next reaction without purification.

(1-7) Synthesis of Compound 8

[Chemical Formula 24]

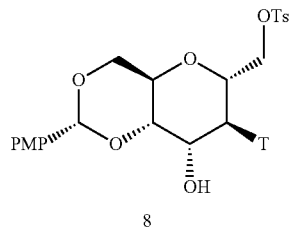

7

-continued

8

To an anhydrous dichloromethane solution (12 mL) of the compound 7 obtained above (516.5 mg), triethylamine (334.5 μL, 2.40 mmol), and 4,4-dimethylaminopyridine (14.7 mg, 0.120 mmol) was added, under ice-cooling, p-toluenesulfonyl chloride (TsCl) (274.5 mg, 1.44 mmol), and the resulting mixture was stirred at room temperature under nitrogen stream for 2.5 hours. After completion of the reaction, the reaction solution was added to saturated aqueous sodium bicarbonate, and extraction was performed using dichloromethane. The organic layer was washed with a saturated saline solution and then dried over anhydrous sodium sulfate, and the solvent was distilled away under reduced pressure. The obtained residue was purified by silica gel column chromatography (SiO$_2$, ethyl acetate/CHCl$_3$=30% to 80%) to obtain a compound 8 (360 mg, 52%, two steps from the compound 6) as a white solid.

Table 4 shows data on the properties of the obtained compound 8.

TABLE 4

Physical property data of the obtained compound 8

$^1$H-NMR (300 MHz, CDCl$_3$) δ: 1.95 (3H, s), 2.45 (3H, s), 2.52 (1H, d, J = 2.1 Hz), 3.65-3.70 (1H, m), 3.71 (1H, dd, J = 10.0, 10.3 Hz), 3.79 (3H, s), 4.01 (1H, dd, J = 52, 9.8 Hz), 4.13-4.18 (2H, m), 4.29 (1H, dd, J = 52, 10.2 Hz), 4.35 (1H, dd, J = 52, 8.6 Hz), 4.48 (1H, m), 4.81 (1H, dd, J = 8.6, 11.2 Hz), 5.56 (1H, s), 6.88 (2H, d, J = 8.6 Hz), 7.33-7.38 (4H, m), 7.59 (1H, s), 7.81 (2H, d, J = 8.3 Hz), 8.01 (1H, s); $^{13}$C-NMR (75 MHz, dmso-d6) δ: 13.1, 21.6, 55.6, 56.1, 60.3, 65.4, 67.8, 68.8, 72.1, 75.6, 101.4, 110.0, 113.8, 128.2, 130.5, 130.8, 132.6, 138.0, 145.8, 151.2, 160.0, 164.4; HRMS (MALDI): Calculated for C$_{27}$H$_{30}$ N$_2$O$_{10}$NaS [M + Na]$^+$: 597.1513, Found: 597.1515.

(1-8) Synthesis of Compound 9

[Chemical Formula 25]

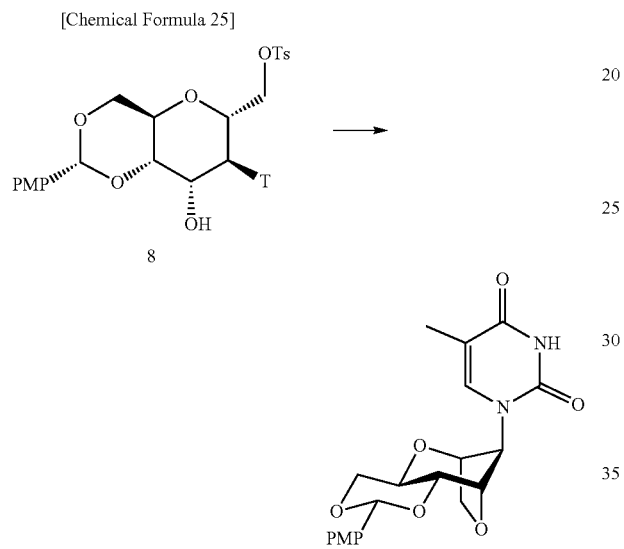

To an anhydrous DMF solution (6.0 mL) of the compound 8 obtained above (360 mg, 0.626 mmol) was added 60% oily sodium hydride (62.7 mg, 1.57 mmol), and the resulting mixture was stirred at room temperature under nitrogen stream for 1 hour. After completion of the reaction, a saturated aqueous ammonium chloride solution and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=60% to 90%) to obtain a compound 9 (244.6 mg, 97%) as a white solid.

Table 5 shows data on the properties of the obtained compound 9.

(1-9) Synthesis of Compound 10

[Chemial Formula 26]

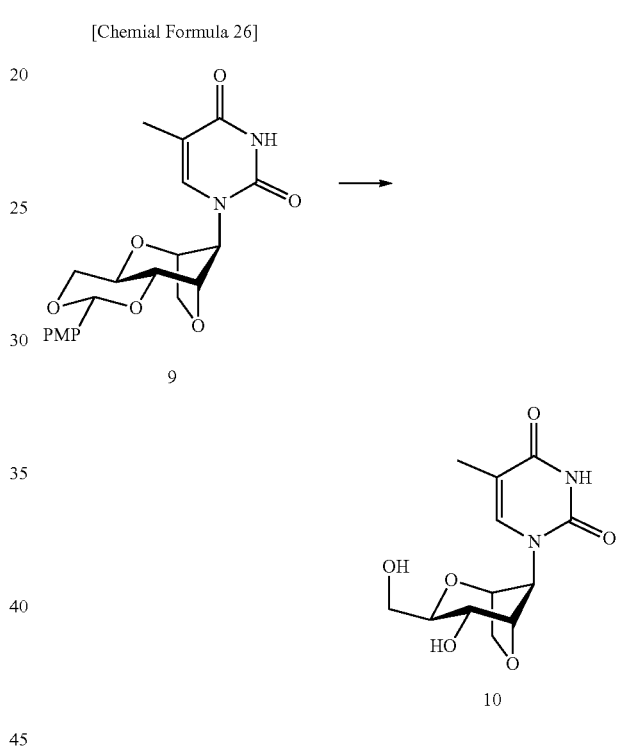

To a methanol solution (1.0 mL) of the compound 9 obtained above (28.7 mg, 0.0713 mmol) was added Pd(OH)$_2$/C (7.1 mg), and the resulting mixture was stirred at room temperature under hydrogen stream for 1 hour. After completion of the reaction, the mixture was filtered and washed with methanol, and then, the filtrate was distilled away under reduced pressure to obtain a compound 10 as a crude product. The compound 10 was directly used for the next reaction without purification.

TABLE 5

Physical property data of the obtained compound 9

$^1$H-NMR (300 MHz, CDCl$_3$) δ: 1.97 (3H, s), 3.50 (1H, d, J = 8.9 Hz), 3.72-3.78 (1H, m), 3.78 (3H, s), 4.11-4.24 (2H, m), 4.28-4.41 (3H, m), 4.70-4.80 (1H, m), 5.12 (1H, d, J = 5.9 Hz), 5.46 (1H, s), 6.85 (2H, d, J = 8.9 Hz), 7.38 (2H, d, J = 8.6 Hz), 7.69 (1H, s), 9.74 (1H, brs); $^{13}$C-NMR (75 MHz, CDCl$_3$) δ 12.8, 55.4, 60.3, 68.4, 69.0, 70.0, 74.35, 74.44, 102.9, 11.0, 113.7, 127.2, 127.7, 129.5, 138.7, 151.6, 160.3, 164.0; HRMS (MALDI): Calculated for C$_{20}$H$_{23}$N$_2$O$_7$ [M + H]$^+$: 403.1500, Found: 403.1495.

(1-10) Synthesis of Compound 11

(1-11) Synthesis of Compound 12

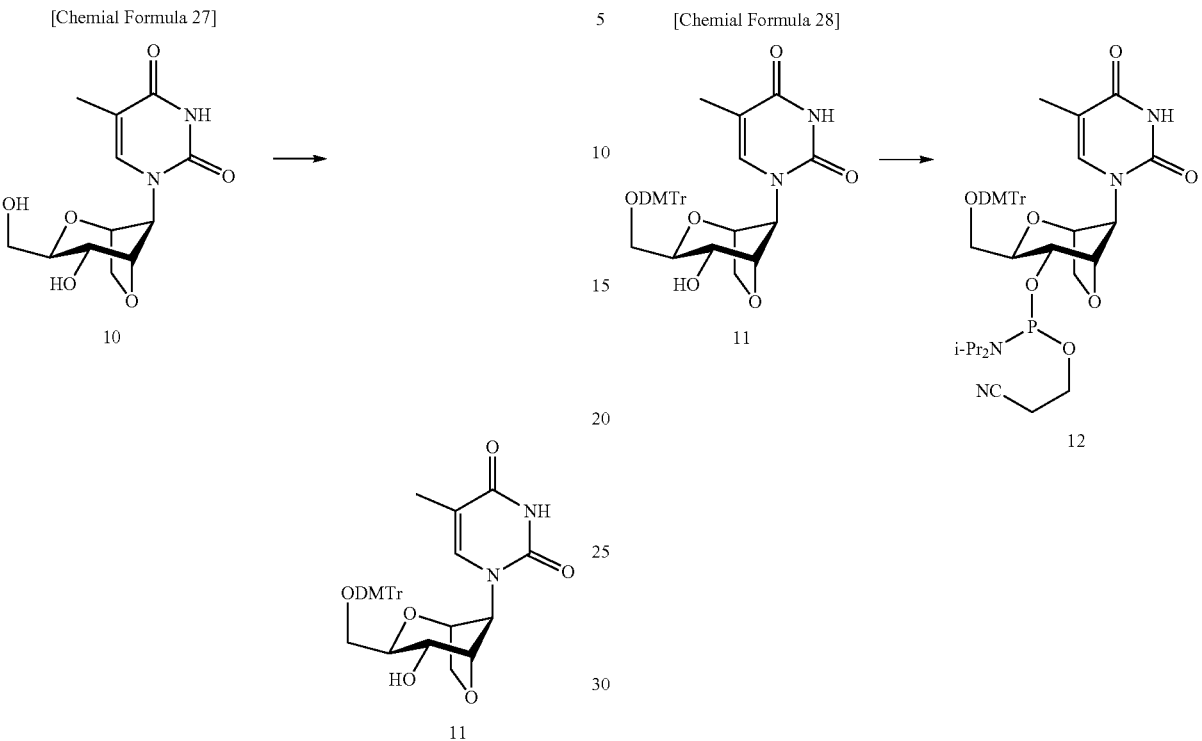

[Chemial Formula 27]

10

[Chemial Formula 28]

11

12

To an anhydrous pyridine solution (1.0 mL) of the compound 10 obtained above was added 4,4'-dimethoxytrityl chloride (36.2 mg, 0.107 mmol), and the resulting mixture was stirred at room temperature under nitrogen stream for 3 hours. After completion of the reaction, methanol was added to the reaction solution, and the solvent was distilled away under reduced pressure. Ethyl acetate and saturated aqueous sodium bicarbonate were added to the obtained residue, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=70% to 100%) to obtain a compound 11(31.2 mg, 75%, two steps from the compound 9) as a white solid.

Table 6 shows data on the properties of the obtained compound 11.

To an anhydrous acetonitrile solution (5.5 mL) of the compound 11 obtained above (321.9 mg, 0.549 mmol), N,N-diisopropylethylamine (286.7 µL, 1.65 mmol), and 1-methylimidazole (13.2 µL, 0.165 mmol) was added, under ice-cooling, 2-cyanoethyl-N,N-diisopropyl phosphorochloridate (183.6 µL, 0.823 mmol), and the resulting mixture was stirred at room temperature under nitrogen stream for 1 hour. After completion of the reaction, saturated aqueous sodium bicarbonate and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=65% to 95%) to obtain a compound 12 (341.4 mg, 79%) as a white solid.

Table 7 shows data on the properties of the obtained compound 12.

TABLE 6

Physical property data of the obtained compound 11

$^1$H-NMR (300 MHz, CDCl$_3$) δ: 1.57 (3H, d, J = 1.0 Hz), 2.03 (1H, d, J = 8.3 Hz), 3.28-3.40 (2H, m), 3.72-3.78 (1H, m), 3.77-3.87 (2H, m), 3.79 (3H, s), 3.79 (3H, s), 4.13 (1H, dd, J = 2.4, 10.5 Hz), 4.23 (1H, d, J = 10.7 Hz), 4.27 (1H, dd, J = 2.4, 5.9 Hz), 4.76 (1H, dd, J = 2.4, 2.4 Hz), 5.04 (1H, d, J = 5.9 Hz), 6.78-6.83 (4H, m), 7.20-7.28 (7H, m), 7.34-7.37 (2H, m), 7.74 (1H, d, J = 1.4 Hz), 8.45 (1H, brs); $^{13}$C-NMR (75 MHz, CDCl$_3$) δ: 12.6, 55.3, 59.5, 62.7, 64.5, 69.3, 72.8, 76.2, 86.2, 110.9, 113.2, 127.0, 128.0, 130.0, 135.8, 139.6, 144.7, 152.2, 158.5, 164.0; HRMS (MALDI): Calculated for C$_{33}$H$_{34}$N$_2$O$_8$Na [M + Na]$^+$: 609.2207, Found: 609.2215.

TABLE 7
Physical property data of the obtained compound 12
$^1$H-NMR (300 MHz, CDCl$_3$) δ: 0.86 (2H, d, J = 6.5 Hz), 1.06 (2H, d, J = 6.5 Hz), 1.12-1.40 (10H, m), 2.18-2.35 (7/5H, m), 2.62-2.68 (1H, m), 2.98-3.08 (3/5H, m), 3.15-3.29 (2H, m), 3.40-3.67 (4H, m), 3.74-3.81 (6H, m), 3.94-4.03 (1H, m), 4.11-4.31 (4H, m), 4.81-4.82 (1H, m), 5.09 (3/5H, d, J = 5.9 Hz), 5.20 (2/5H, d, J = 5.9 Hz), 6.77-6.83 (4H, m), 7.21-7.38 (9H, m), 7.80 (2/5H, s), 7.85 (3/5H, s), 8.57 (3/5H, brs), 8.86 (2/5H, brs); $^{31}$P-NMR (121 MHz, CDCl$_3$) δ: 149.8, 149.9; HRMS (MALDI): Calculated for C$_{42}$H$_{51}$N$_4$O$_9$NaP [M + Na]$^+$: 809.3286, Found: 809.3291.
Example 2: Synthesis of Cross-Linked Nucleoside (2)
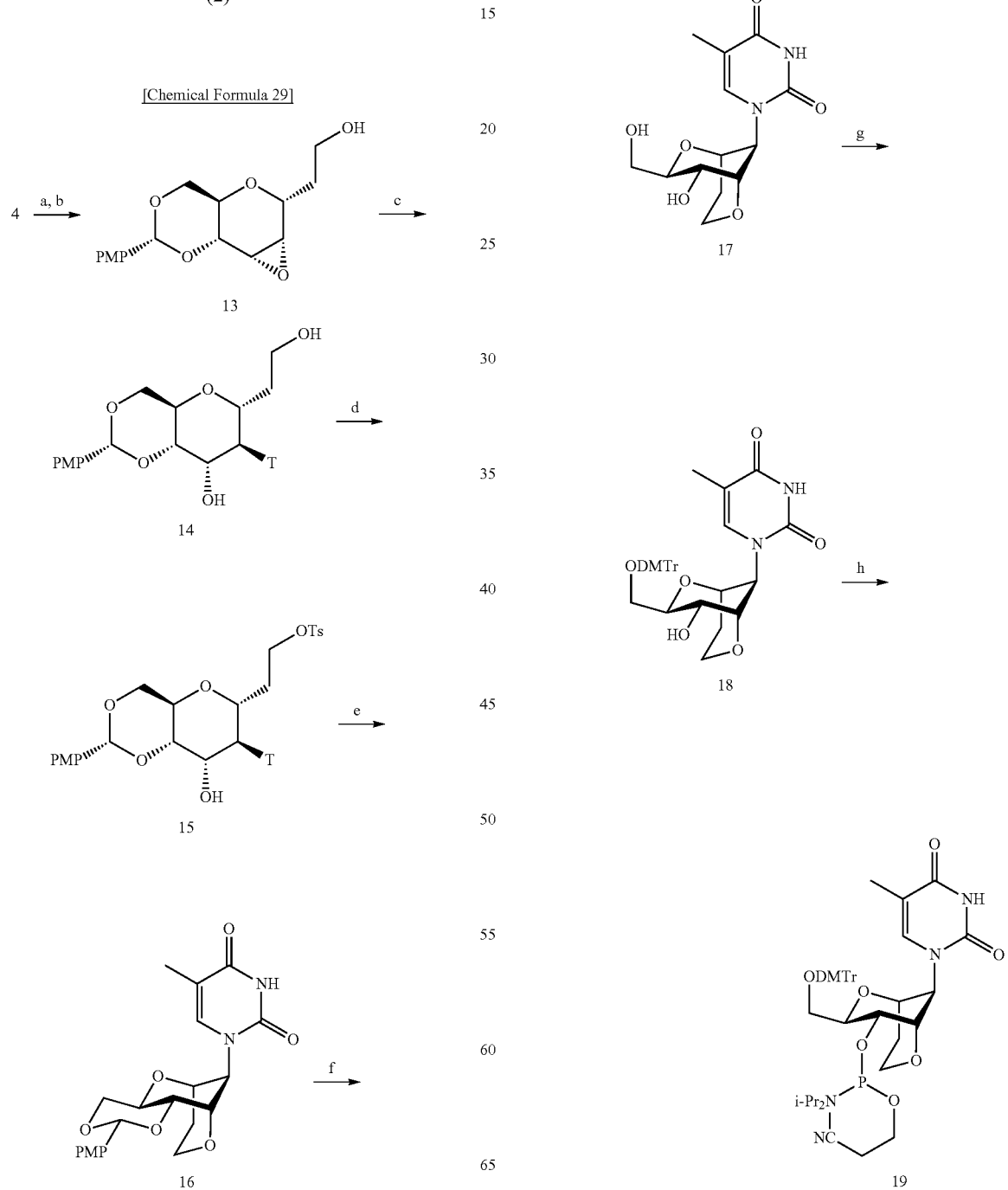

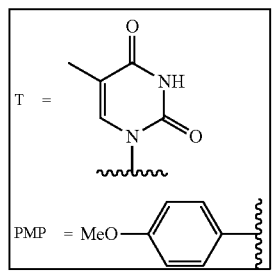

Reagents and Conditions for Each Step:
(a) Pd/PEI, H$_2$, MeOH/1,4-dioxane, rt, 1.5 h;
(b) 9-BBN, THF, rt, 1 h; NaBO$_3$·4H$_2$O, H$_2$O, rt, 1 h, 85% (2 steps);
(c) thymine, DBU, MeCN, 100° C. (MW), 24 h;
(d) TsCl, TEA, DMAP, DCM, rt, 6 h, 51% (2 steps);
(e) NaH, DMF, 90° C., 48 h, 63%;
(f) Pd/(OH)$_2$/C, H$_2$, MeOH, rt, 1.5 h;
(g) DMTrCL, pyridine, rt, 3 h, 61% (2 steps);
(h) 2-cyanoethyl N,N-diisopropylchorophosphoramidite, DIPEA, NMI, MeCN, rt, 1 h 84%.

First, the compound 5 was obtained from the compound 4 in a manner similar to that of Example 1. Then, to an anhydrous tetrahydrofuran solution (6.0 mL) of the obtained compound 5 (1.03 g) was added a 0.5 M tetrahydrofuran solution (13.9 mL, 6.94 mmol) of 9-borabicyclo[3.3.1] nonane (9-BBN), and the resulting mixture was stirred at room temperature under nitrogen stream for 1 hour. After disappearance of the starting material, water (20 mL) and sodium perborate tetrahydrate (5.33 g, 34.7 mmol) were added to the reaction solution under ice-cooling, and the resulting mixture was stirred at room temperature for additional 1 hour. Then, the mixture was filtered, and the filtrate was extracted using ethyl acetate. The organic layer was washed with a saturated saline solution and then dried over anhydrous sodium sulfate, and the solvent was distilled away under reduced pressure. The obtained residue was purified by silica gel column chromatography (SiO$_2$, methanol/CHCl$_3$=2% to 5%) to obtain a compound 13 (910 mg, 85%, two steps from the compound 4) as a white solid.

Table 8 shows data on the properties of the obtained compound 13.

TABLE 8

Physical property data of the obtained compound 13

$^1$H-NMR (300 MHz, CDCl$_3$) δ: 1.79-1.89 (1H, m), 1.95 (1H, brs), 2.05-2.17 (1H, m), 3.40 (1H, dd, J = 3.2, 4.6 Hz), 3.56 (1H, d, J = 4.6 Hz), 3.61 (1H, dd, J = 10.1, 10.6 Hz), 3.77-3.85 (3H, m), 3.78 (3H, s), 3.98 (2H, dd, J = 0.9, 7.8 Hz), 4.13 (1H, dd, J = 5.1, 10.1 Hz), 4.31 (1H, ddd, J = 3.7, 3.7, 9.6 Hz), 5.51 (1H, s), 6.89 (2H, d, J = 8.7 Hz), 7.40 (2H, d, J = 8.7 Hz); $^{13}$C-NMR (75 MHz, CDCl$_3$) δ: 32.1, 51.9, 55.4, 55.8, 69.2, 78.1, 102.7, 113.8, 127.7, 129.7, 160.3; HRMS (MALDI): Calculated for C$_{16}$H$_{20}$O$_6$Na [M + Na]$^+$: 331.1152, Found: 331.1150.

(2-1) Synthesis of Compound 13

(2-2) Synthesis of Compound 14

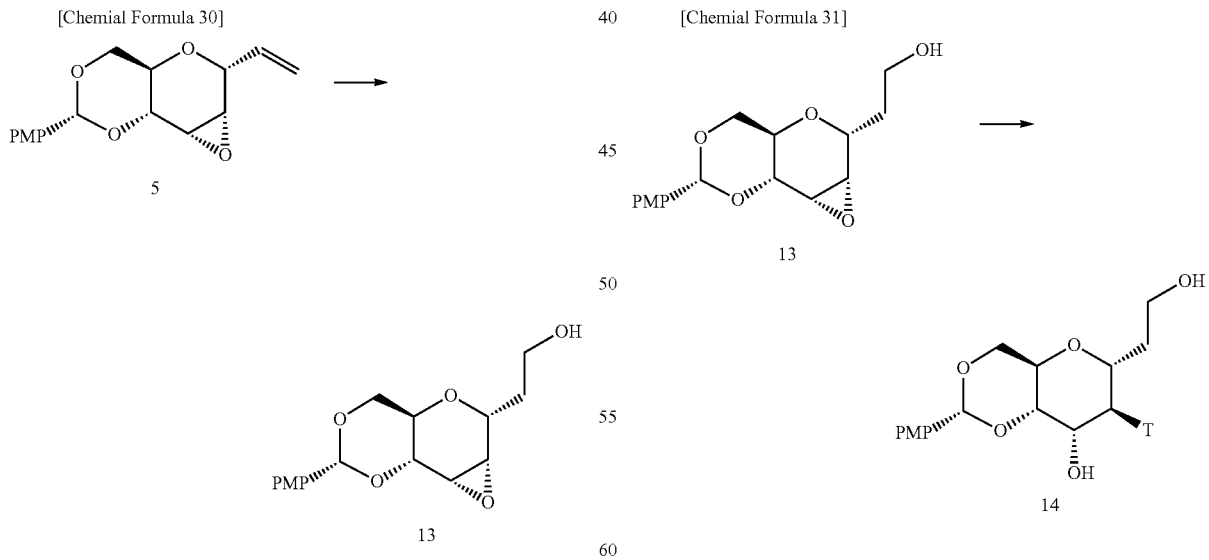

An anhydrous acetonitrile solution (17.8 mL) of the compound 13 obtained above (1.10 g, 3.57 mmol), thymine (900 mg, 7.14 mmol), and diazabicycloundecene (DBU) (2.13 mL, 14.3 mmol) was heated at 100° C. under microwave irradiation for 24 hours. After completion of the reaction, the solvent was distilled away under reduced pressure, dichloromethane and saturated aqueous sodium bicarbonate were added, and extraction was performed. After the organic layer was washed with a saturated saline solution, the resulting organic layer was dried over anhydrous sodium, and the solvent was distilled away under reduced pressure. Thus, a compound 14 was obtained as a crude product. The compound 14 was directly used for the next reaction without purification.

(2-3) Synthesis of Compound 15

[Chemical Formula 32]

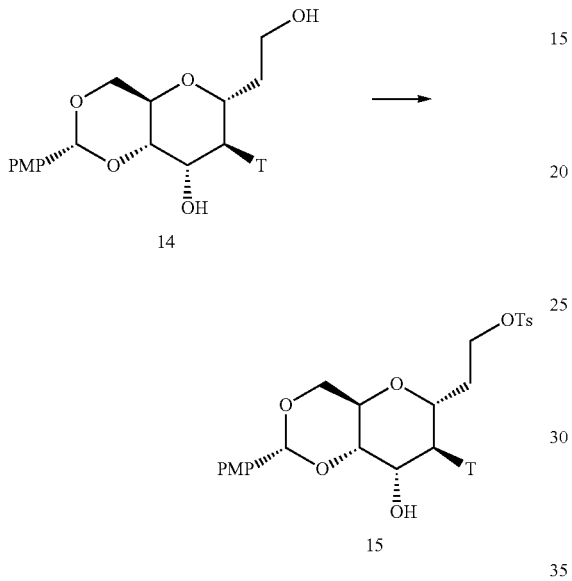

14

15

(2-4) Synthesis of Compound 16

[Chemical Formula 33]

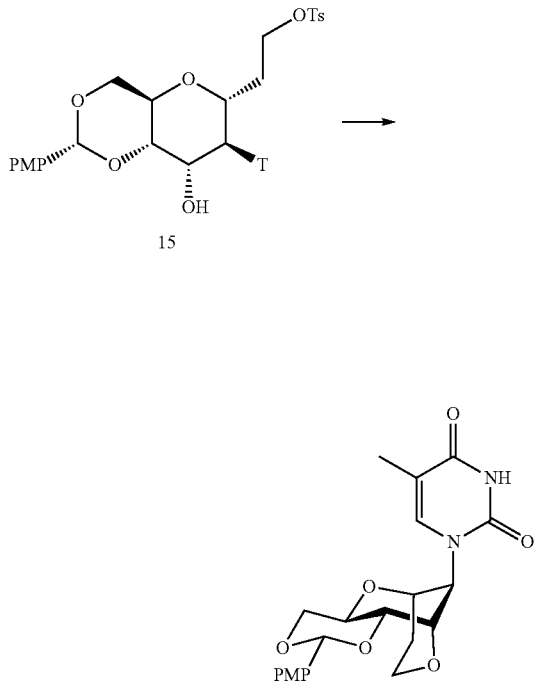

15

16

To an anhydrous dichloromethane solution (36 mL) of the compound 14 obtained above (1.58 g), triethylamine (1.24 mL, 8.92 mmol), and 4,4-dimethylaminopyridine (43.6 mg, 0.357 mmol) was added, under ice-cooling, p-toluenesulfonyl chloride (TsCl) (1.02 g, 5.35 mmol), and the resulting mixture was stirred at room temperature under nitrogen stream for 6 hours. After completion of the reaction, the reaction solution was added to saturated aqueous sodium bicarbonate, and extraction was performed using dichloromethane. After the organic layer was washed with a saturated saline solution, the resulting organic layer was dried over anhydrous sodium sulfate, and the solvent was distilled away under reduced pressure. The obtained residue was purified by silica gel column chromatography (SiO$_2$, ethyl acetate/CHCl$_3$=30% to 80%) to obtain a compound 15 (1.08 g, 51%, two steps from the compound 13) as a white solid.

Table 9 shows data on the properties of the obtained compound 15.

To an anhydrous DMF solution (18 mL) of the compound 15 obtained above (1.08 g, 1.84 mmol) was added 60% oily sodium hydride (183.5 mg, 4.59 mmol), and the resulting mixture was stirred at 90° C. under nitrogen stream for 48 hours. After completion of the reaction, a saturated aqueous ammonium chloride solution and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=60% to 100%) to obtain a compound 16 (480 mg, 63%) as a white solid.

Table 10 shows data on the properties of the obtained compound 16.

TABLE 9

Physical property data of the obtained compound 15

$^1$H-NMR (300 MHz, CDCl$_3$) δ: 1.96 (3H, s), 1.96-2.06 (1H, m), 2.43 (3H, s), 2.81-2.90 (1H, m), 3.58-3.69 (3H, m), 3.69 (3H, s), 4.01-4.25 (6H, m), 4.45 (1H, d, J = 5.2 Hz), 5.54 (1H, s), 6.85-6.90 (2H, d, J = 8.6 Hz), 7.32-7.35 (4H, m), 7.65 (1H, s), 7.77 (1H, d, J = 8.3 Hz), 9.47 (1H, brs); $^{13}$C-NMR (75 MHz, CDCl$_3$) δ: 13.0, 21.8, 30.9, 55.4, 59.6, 66.6, 67.1, 69.3, 70.6, 76.0, 102.4, 111.9, 113.7, 127.6, 128.1, 129.4, 130.0, 132.7, 137.4, 145.2, 151.0, 160.3, 163.9; HRMS (MALDI): Calculated for C$_{28}$H$_{32}$N$_2$O$_{10}$NaS [M + Na]$^+$: 611.1670, Found: 611.1669.

TABLE 10

Physical property data of the obtained compound 16

$^1$H-NMR (300 MHz, CDCl$_3$) δ: 1.96 (3H, d, J = 1.0 Hz), 2.38-2.48 (2H, m), 3.52 (1H, dd, J = 1.34, 10.0 Hz), 3.70 (1H, dd, J = 10.0, 10.3 Hz), 3.76 (3H, s), 3.98-4.07 (1H, m), 4.14 (1H, ddd, J = 4.6, 7.4, 12.2 Hz), 4.32 (1H, dd, J = 4.8, 10.3 Hz), 4.49-4.57 (3H, m), 4.84 (1H, d, J = 5.2 Hz), 5.50 (1H, s), 6.83 (2H, d, J = 8.9 Hz), 7.38 (2H, d, J = 8.9 Hz), 7.91 (1H, d, J = 1.0 Hz), 9.30 (1H, brs); $^{13}$C-NMR (75 MHz, CDCl$_3$) δ: 13.0, 31.9, 53.4, 55.4, 59.2, 64.3, 66.5 67.8, 69.7, 77.7, 102.8, 111.4, 113.6, 127.6, 129.4, 137.9, 151.1, 160.2, 163.7; HRMS (MALDI): Calculated for C$_{21}$H$_{24}$N$_2$O$_7$Na [M + Na]$^+$: 439.1476, Found: 439.1473.

(2-5) Synthesis of Compound 17

[Chemical Formula 34]

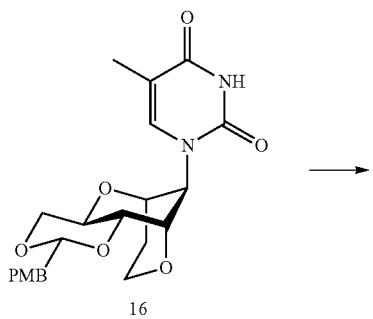

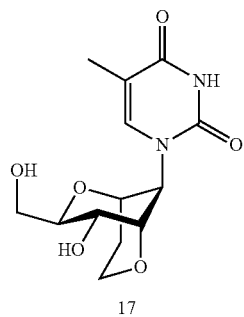

To a methanol solution (1.0 mL) of the compound 16 obtained above (47.1 mg, 0.113 mmol) was added Pd(OH)$_2$/C (11.3 mg), and the resulting mixture was stirred at room temperature under hydrogen stream for 1 hour. After completion of the reaction, the mixture was filtered, and washed with methanol, and then, the filtrate was distilled away under reduced pressure. Thus, a compound 17 was obtained as a crude product. The compound 17 was directly used for the next reaction without purification.

(2-6) Synthesis of Compound 18

[Chemical Formula 35]

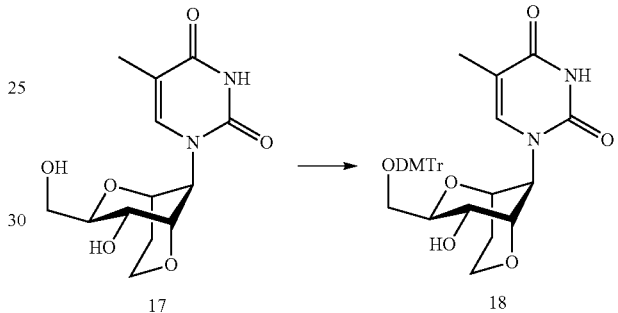

To an anhydrous pyridine solution (1.0 mL) of the compound 17 obtained above was added 4,4'-dimethoxytrityl chloride (57.5 mg, 0.170 mmol), and the resulting mixture was stirred at room temperature under nitrogen stream for 3 hours. After completion of the reaction, methanol was added to the reaction solution, and the solvent was distilled away under reduced pressure. Ethyl acetate and saturated aqueous sodium bicarbonate were added to the obtained residue, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=70% to 100%) to obtain a compound 18 (41.5 mg, 61%, two steps from the compound 16) as a white solid.

Table 11 shows data on the properties of the obtained compound 18.

TABLE 11

Physical property data of the obtained compound 18

$^1$H-NMR (300 MHz, CDCl$_3$) δ: 1.53 (3H, d, J = 0.7 Hz), 2.31-2.37 (2H, m), 2.40 (1H, d, J = 8.3 Hz), 3.34 (1H, dd, J = 3.1, 10.2 Hz), 3.40 (1H, dd, J = 4.1, 10.2 Hz), 3.78 (3H, s), 3.79 (3H, s), 3.83-3.90 (1H, m), 3.97-4.13 (2H, m), 4.16-4.20 (1H, m), 4.24-4.49 (2H, m), 4.73 (1H, d, J = 3.4 Hz), 6.80-6.84 (4H, m), 7.19-7.34 (7H, m), 7.41-7.43 (2H, m), 8.06 (1H, d, J = 1.0 Hz), 8.33 (1H, brs); $^{13}$C-NMR (75 MHz, CDCl$_3$) δ: 12.6, 32.3, 53.8, 55.3, 60.4, 64.2, 64.8, 66.5, 68.5, 74.7, 86.4, 111.1, 113.2, 127.0, 128.0, 128.1, 130.2, 135.8, 138.5, 144.7, 151.5, 158.6, 163.8; HRMS (MALDI): Calculated for C$_{34}$H$_{36}$N$_2$O$_8$Na [M + Na]$^+$ 623.2364, Found: 623.2356.

(2-7) Synthesis of Compound 19

[Chemical Formula 36]

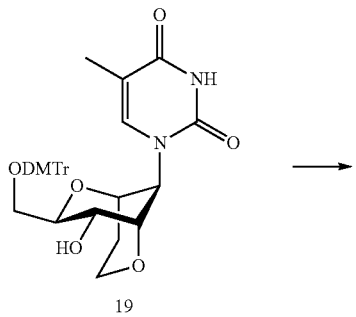

19

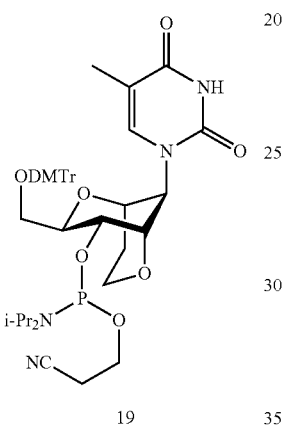

19

To an anhydrous acetonitrile solution (4.7 mL) of the compound 18 obtained above (282.0 mg, 0.469 mmol), N,N-diisopropylethylamine (245.3 µL, 1.41 mmol), and 1-methylimidazole (11.3 µL, 0.141 mmol) was added, under ice-cooling, 2-cyanoethyl-N,N-diisopropyl phosphorochloridate (157.1 µL, 0.704 mmol), and the resulting mixture was stirred at room temperature under nitrogen stream for 1 hour. After completion of the reaction, saturated aqueous sodium bicarbonate and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=65% to 95%) to obtain a compound 19 (317.3 mg, 84%) as a white solid.

Table 12 shows data on the properties of the obtained compound 19.

TABLE 12

| Physical property data of the obtained compound 19 |
| --- |
| $^1$H-NMR (300 MHz, CDCl$_3$) δ: 0.86 (2H, d, J = 6.5 Hz), 1.02-1.31 (15H, m), 2.16-2.39 (13/10H, m), 2.96-3.02 (7/10H, m), 3.14-3.25 (2H, m), 3.42-3.58 (3H, m), 3.72-3.79 (6H, m), 3.92-4.01 (1H, m), 4.09-4.31 (3H, m), 4.39-4.68 (4H, m), 6.77-6.83 (4H, m), 7.19-7.43 (9H, m), 8.10 (3/10H, s), 8.14 (7/10H, s), 8.48 (1H, brs); $^{31}$P-NMR (121 MHz, CDCl$_3$) δ: 149.8, 149.9; HRMS (MALDI): Calculated for C$_{43}$H$_{53}$N$_4$O$_9$NaP [M + Na]$^+$: 823.3442, Found: 823.3426. |

Example 3: Synthesis of Cross-Linked Nucleoside (3)

[Chemical Formula 37]

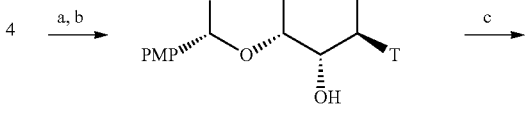

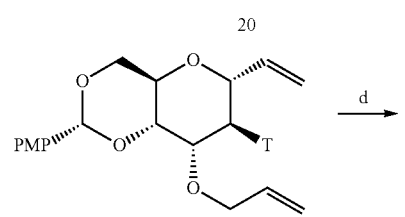

21

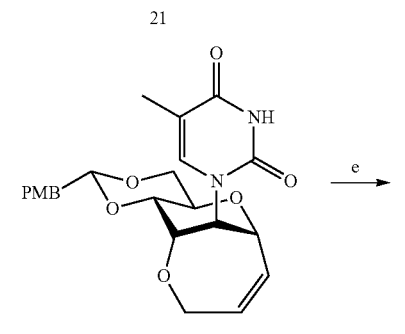

22

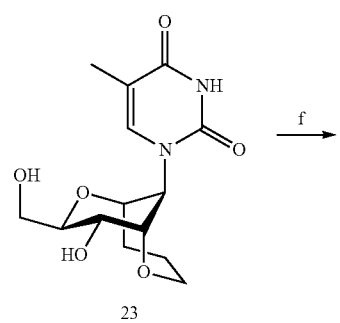

23

-continued

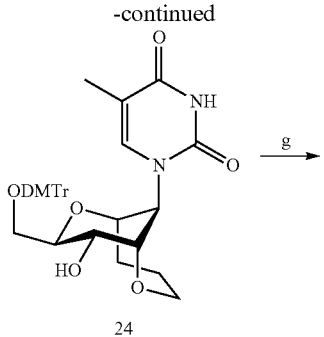

24

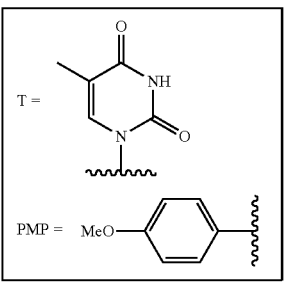

25

Reagents and Conditions for Each Step: (a) Pd/PEI, H₂, MeOH/1,4-dioxane, rt, 3 h; (b) thymine, DBU, MeCN, 100° C. (MW), 24 h; (c) allyl bromide, NaH, THF, rt, 4 days; (d) Grubbs 2$^{nd}$ generation catalyst, toluene, 50° C., 5.5 h, 33% (4 steps); (e) Pd(OH)₂/C, H₂, MeOH, rt, 3 h; (f) DMTrCl, pyridine, rt, 2.5 h, 71% (2 steps); (g) 2-cyanoethyl N,N-diisopropylchlorophosphoramidite, DIPEA, NMI, MeCN, rt, 1 h, 78%.

(3-1) Synthesis of Compound 20

[Chemical Formula 38]

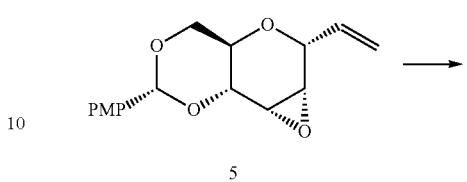

5

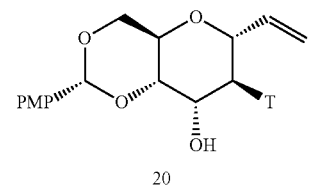

20

First, the compound 5 was obtained from the compound 4 in a manner similar to that of Example 1. Then, an anhydrous acetonitrile solution (18 mL) of the obtained compound 5 (1.15 g), thymine (1.01 g, 8.00 mmol), and diazabicycloundecene (DBU) (2.39 mL, 16.0 mmol) was heated at 100° C. under microwave irradiation for 24 hours. After completion of the reaction, the solvent was distilled away under reduced pressure, dichloromethane and saturated aqueous sodium bicarbonate were added, and extraction was performed. After the organic layer was washed with a saturated saline solution, the resulting organic layer was dried over anhydrous sodium sulfate, and the solvent was distilled away under reduced pressure. The obtained residue was purified by silica gel column chromatography (SiO₂, acetone/CHCl₃=20% to 40%) to obtain a mixture (1.17 g, compound 20:1-ethyl analogue=1:0.26) of a compound 20 and a 1-ethyl analogue (by-product) as a pale yellow solid. Since the separation of the compound 20 and the 1-ethyl analogue was difficult, the mixture was directly used for the next reaction without purification.

Table 13 shows data on the properties of the obtained compound 20. Note that, as for the NMR measurement, the mixture of the by-product (1-ethyl analogue) and the compound 20 was used, and only the signal attribution of the compound 20 obtained is shown.

TABLE 13

Physical property data of the obtained compound 20

$^1$H-NMR (300 MHz, CDCl₃) δ: 1.97 (3H, s), 3.66-3.83 (3H, m), 3.78 (3H, s), 4.25 (1H, d, J = 1.7 Hz), 4.32-4.41 (2H, m), 4.57 (1H, d, J = 6.2 Hz), 4.67 (1H, brs), 5.35 (1H, d, J = 10.3 Hz), 5.38 (1H, d, J = 16.9 Hz), 5.58 (1H, s), 6.41 (1H, ddd, J = 6.2, 10.3, 16.8 Hz), 6.86 (2H, d, J = 8.6 Hz), 7.38 (2H, d, J = 8.9 Hz), 7.77 (1H, s), 9.84 (1H, brs); HRMS (MALDI): Calculated for C₂₁H₂₄N₂O₇Na [M + Na]⁺: 439.1476, Found: 439.1476.

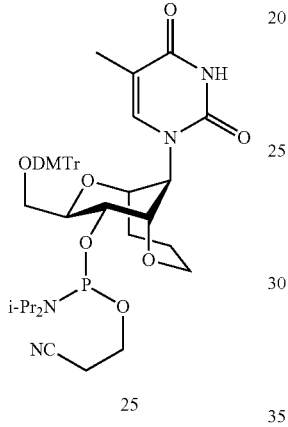

(3-2) Synthesis of Compound 21

[Chemical Formula 39]

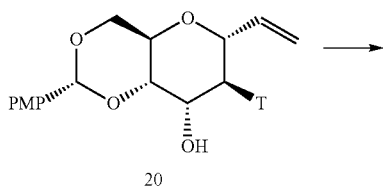

20

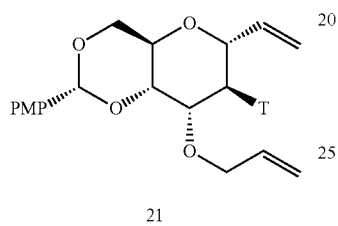

21

To an anhydrous a tetrahydrofuran solution (4.7 mL) of the mixture of the compound 20 and the 1-ethyl analogue obtained above (1.17 g, approximately 2.81 mmol) was added 60% oily sodium hydride (336.8 mg, 8.42 mmol), and the resulting mixture was stirred at room temperature under nitrogen stream for 1 hour. Then, allyl bromide (308.9 µL, 3.65 mmol) was added to the reaction solution, and the resulting mixture was stirred at room temperature under nitrogen stream for 4 days. After completion of the reaction, a saturated aqueous ammonium chloride solution and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography ($SiO_2$, ethyl acetate/hexane=40% to 70%) to obtain a mixture (900 mg, compound 21:1-ethyl analogue=1:0.26) of a compound 21 and a 1-ethyl analogue (by-product) as a yellow solid.

Table 14 shows data on the properties of the obtained compound 21. Note that, as for the NMR measurement, the mixture of the by-product (1-ethyl analogue) and the compound 21 was used, and only the signal attribution of the compound 21 obtained is shown.

(3-3) Synthesis of Compound 22

[Chemical Formula 40]

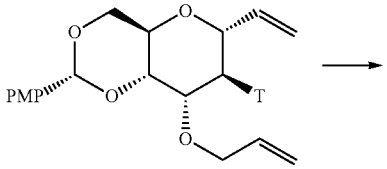

21

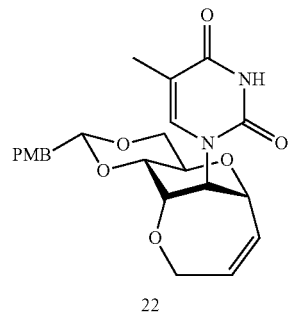

22

To a deoxygenated toluene solution (31 mL) of the mixture of the compound 21 and the 1-ethyl analogue obtained above (900 mg, approximately 1.56 mmol) was added a second-generation Grubbs catalyst (66.3 mg, 0.078 mmol) at room temperature under nitrogen stream, and the resulting mixture was stirred at 50° C. for 5.5 hours. Then, the reaction solution was distilled away under reduced pressure, and the obtained residue was purified by silica gel column chromatography ($SiO_2$, ethyl acetate/hexane=60% to 100%) to obtain a compound 22 (564.1 mg, 33% from the compound 4) as a pale yellow solid.

Table 15 shows data on the properties of the obtained compound 22.

TABLE 14

Physical property data of the obtained compound 21

$^1$H-NMR (300 MHz, $CDCl_3$) δ: 1.92 (3H, s), 3.66-3.76 (3H, m), 3.80 (3H, s), 3.95 (1H, t, J = 2.4 Hz), 4.28-4.42 (4H, m), 4.55 (1H, d, J = 6.5 Hz), 4.69 (1H, d, J = 2.1 Hz), 5.17 (1H, dd, J = 1.6, 10.5 Hz), 5.33-5.38 (3H, m), 5.53 (1H, s), 5.85-5.98 (1H, m), 6.40 (1H, ddd, J = 6.5, 10.5, 17.0 Hz), 6.88 (2H, d, J = 8.6 Hz), 7.38 (2H, d, J = 8.9 Hz), 7.80 (1H, s), 9.11 (1H, brs); HRMS (MALDI): Calculated for $C_2H_{28}N_2O_7Na$ [M + Na]$^+$: 479.1789, Found: 479.1792.

TABLE 15

Physical property data of the obtained compound 22

$^1$H-NMR (300 MHz, CDCl$_3$) δ: 1.92 (3H, d, J = 0.7 Hz), 3.64 (1H, dd, J = 1.7, 9.3 Hz), 3.74-3.83 (1H, m), 3.77 (3H, s), 4.27-4.46 (4H, m), 4.63 (1H, d, J = 16.7 Hz), 4.73 (1H, d, J = 6.2 Hz), 5.12 (1H, d, J = 3.4 Hz), 5.52 (1H, s), 5.83 (1H, ddd, J = 2.1, 6.4, 11.2 Hz), 6.32 (1H, ddd, J = 2.8, 6.7, 11.0 Hz), 6.84 (2H, d, J = 8.9 Hz), 7.38 (2H, d, J = 8.6 Hz), 7.95 (1H, d, J = 1.0 Hz), 9.53 (1H, brs); $^{13}$C-NMR (75 MHz, CDCl$_3$) δ: 13.1, 53.1, 55.4, 61.4, 62.7, 69.2, 70.1, 73.0, 102.5, 111.8, 113.6, 126.1, 127.6, 129.5, 137.2, 137.7, 151.0, 160.1, 163.8; HRMS (MALDI): Calculated for C$_{22}$H$_{24}$N$_2$O$_7$Na [M + Na]$^+$: 451.1476, Found: 451.1480.

(3-4) Synthesis of Compound 23

[Chemical Formula 41]

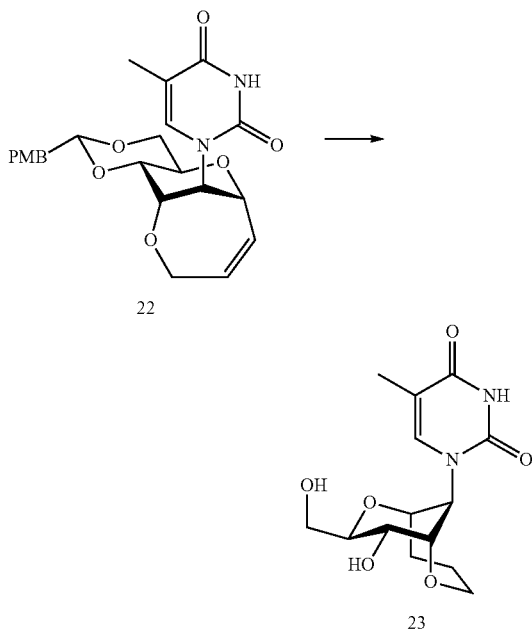

(3-5) Synthesis of Compound 24

[Chemical Formula 42]

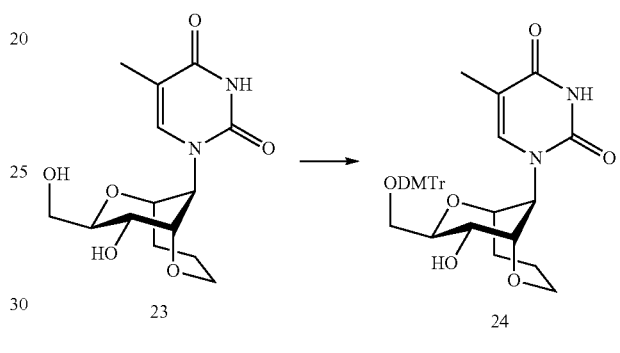

To a methanol solution (12.0 mL) of the compound 22 obtained above (522.9 mg, 1.22 mmol) was added Pd(OH)$_2$/C (122.0 mg), and the resulting mixture was stirred at room temperature under hydrogen stream for 3 hours. After completion of the reaction, the mixture was filtered, and washed with methanol, and the filtrate was distilled away under reduced pressure. Thus, a compound 23 was obtained as a crude product. The compound 23 was directly used for the next reaction without purification.

To an anhydrous pyridine solution (12.0 mL) of the compound 23 obtained above was added 4,4'-dimethoxytrityl chloride (620.3 mg, 1.83 mmol), and the resulting mixture was stirred at room temperature under nitrogen stream for 2.5 hours. After completion of the reaction, methanol was added to the reaction solution, and the solvent was distilled away under reduced pressure. Ethyl acetate and saturated aqueous sodium bicarbonate were added to the obtained residue, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, acetone/chloroform=15% to 40%) to obtain a compound 24 (530.1 mg, 71%, two steps from the compound 22) as a white solid.

Table 16 shows data on the properties of the obtained compound 24.

TABLE 16

Physical property data of the obtained compound 24

$^1$H-NMR (300 MHz, CDCl$_3$) δ: 1.62 (3H, s), 1.71-2.15 (4H, m), 2.39 (1H, d, J = 8.9 Hz), 3.39 (1H, dd, J = 3.6, 10.5 Hz), 3.44 (1H, dd, J = 1.9, 10.5 Hz), 3.77 (3H, s), 3.77 (3H, s), 3.91 (1H, ddd, J = 22, 22, 9.6 Hz), 3.98-4.14 (3H, m), 4.21-4.26 (1H, m), 4.34 (1H, dd, J = 3.8, 3.8 Hz), 5.07 (1H, d, J = 3.4 Hz), 6.79-6.83 (4H, m), 7.14-7.36 (7H, m), 7.44 (2H, d, J = 7.9 Hz), 8.05 (1H, d, J = 1.0 Hz), 9.00 (1H, brs); $^{13}$C-NMR (100 MHz, CDCl$_3$) δ: 12.9, 29.3, 29.7, 31.8, 53.1, 55.3, 63.9, 64.8, 72.1, 72.8, 73.2, 86.3, 111.6, 113.2, 126.9, 127.9, 128.2, 129.2, 130.2, 136.0, 138.2, 145.0, 151.1, 158.6, 163.7; HRMS (MALDI): Calculated for C$_{35}$H$_{38}$N$_2$O$_8$Na [M + Na]$^+$: 637.2520, Found: 637.2549.

(3-6) Synthesis of Compound 25

[Chemical Formula 43]

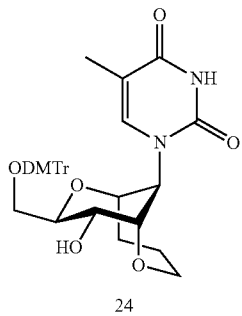

24

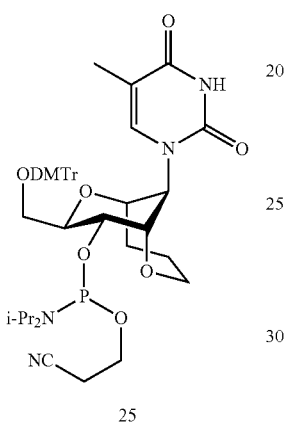

25

To an anhydrous acetonitrile solution (3.7 mL) of the compound 24 obtained above (227.2 mg, 0.370 mmol), N,N-diisopropylethylamine (193.2 μL, 1.12 mmol), and 1-methylimidazole (8.90 μL, 0.111 mmol) was added, under ice-cooling, 2-cyanoethyl-N,N-diisopropyl phosphorochloridate (123.7 μL, 0.554 mmol), and the resulting mixture was stirred at room temperature under nitrogen stream for 1 hour. After completion of the reaction, saturated aqueous sodium bicarbonate and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, ethyl acetate/hexane=40% to 80%) to obtain a compound 25 (235.4 mg, 78%) as a white solid.

Table 17 shows data on the properties of the obtained compound 25.

TABLE 17

| Physical property data of the obtained compound 25 |
|---|
| $^1$H-NMR (300 MHz, CDCl$_3$) δ: 0.85 (2H, d, J = 6.9 Hz), 1.04-1.33 (15H, m), 1.76-2.32 (46/10H, m), 2.48-2.54 (7/10H, m), 2.85-2.95 (7/10H, m), 3.07-3.69 (4H, m), 3.78-3.81 (6H, m), 4.00-4.06 (2H, m), 4.30-4.46 (4H, m), 5.02 (1H, d, J = 3.4 Hz), 6.79-6.86 (4H, m), 7.19-7.48 (9H, m), 8.12 (3/10H, d, J = 0.7 Hz), 8.14 (7/10H, d, J = 1.0 Hz), 8.64 (1H, brs); $^{31}$P-NMR (121 MHz, CDCl$_3$) δ: 148.3, 150.0; HRMS (MALDI): Calculated for C$_{44}$H$_{55}$N$_4$O$_9$NaP [M + Na]$^+$: 837.3599, Found: 837.3600. |

Example 4: Synthesis of Cross-Linked Nucleoside (4)

[Chemical Formula 44]

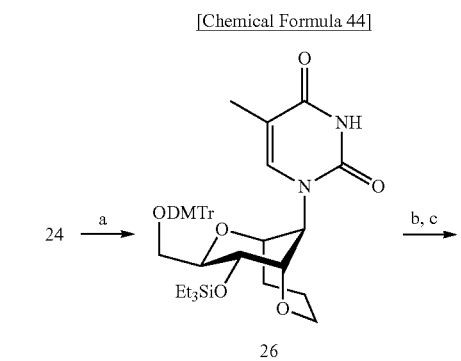

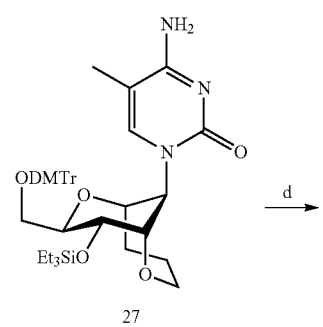

27

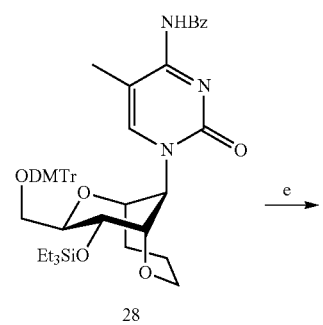

28

(4-1) Synthesis of Compound 26

[Chemical Formula 45]

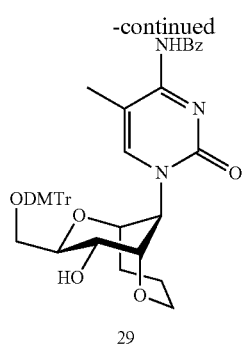

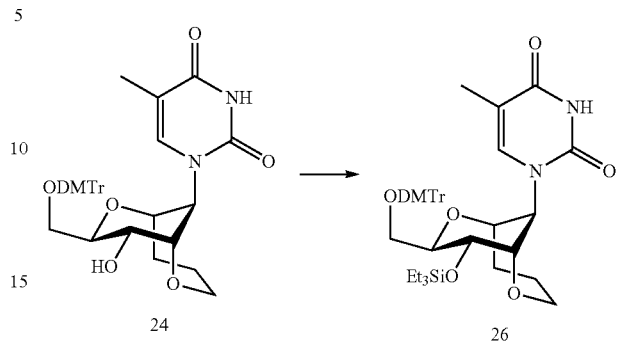

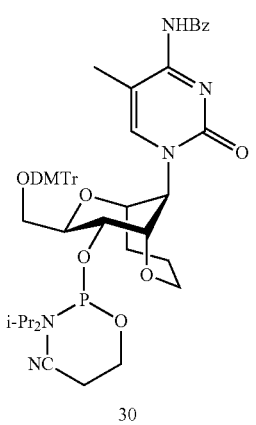

Reagents and Conditions for Each Step:
(a) TESCl, pyridine, rt, 4 h, 96%;
(b) 1,2,4-triazole, triethylamine, phosphoryl chloride, acetonitrile, rt, 45 min;
(c) ammonium hydroxide, 1,4-dioxane, rt, 3 hr, 99% (2 steps);
(d) benzoic anhydride, pyridine, 40° C. 6 hr, 79%;
(e) tetra-n-butylammonium fluoride, THF, rt, 4 hr, 95%;
(f) 2-cyanoethyl-N,N-diisopropyl phosphorochloridate, DIPEA, N-methylimidazole, MeCN, rt, 4 hr, 84%.

To a pyridine solution (8 mL) of the compound 24 obtained above 484.7 mg, 0.79 mmol) was added dropwise chlorotriethylsilane (650 μL, 3.9 mmol), and the resulting mixture was stirred at room temperature under nitrogen stream for 4 hours. After completion of the reaction, saturated aqueous sodium bicarbonate and ethyl acetate were added, and extraction was performed. After the organic layer was washed with water and a saturated saline solution, the resulting organic layer was dried over anhydrous sodium sulfate, and the solvent was distilled away under reduced pressure. The obtained residue was purified by silica gel column chromatography ($SiO_2$, hexane/ethyl acetate=60/40 to 40/60) to obtain a compound 26 (551.2 mg, 96%) as a white solid.

Table 18 shows data on the properties of the obtained compound 26.

TABLE 18

Physical property data of the obtained compound 26

$^1$H-NMR (400 MHz, $CDCl_3$) δ: 0.45-0.50 (6H, m), 0.76 (9H, t, J = 7.8 Hz), 1.60 (3H, s), 1.83-1.92 (2H, m), 2.04-2.12 (2H, m), 3.21 (1H, dd, J = 3.7, 10.1 Hz), 3.49 (1H, dd, J = 1.5, 8.7 Hz), 3.78 (3H, s), 3.79 (3H, s), 4.00-4.05 (3H, m), 4.17 (1H, t, J = 2.8 Hz), 4.27 (1H, ddd, J = 1.6, 4.0, 9.6 Hz), 4.43 (1H, dd, J = 4.8, 4.8 Hz), 5.01 (1H, d, J = 3.7 Hz), 6.78-6.84 (4H, m), 7.19-7.36 (7H, m), 7.45-7.47 (2H, m), 8.18 (1H, brs), 8.34 (1H, s); HRMS (MALDI): Calculated for $C_{41}H_{52}N_2O_8NaSi$ $[M + Na]^+$: 751.3385, Found: 751.3401.

(4-2) Synthesis of Compound 27

[Chemical Formula 46]

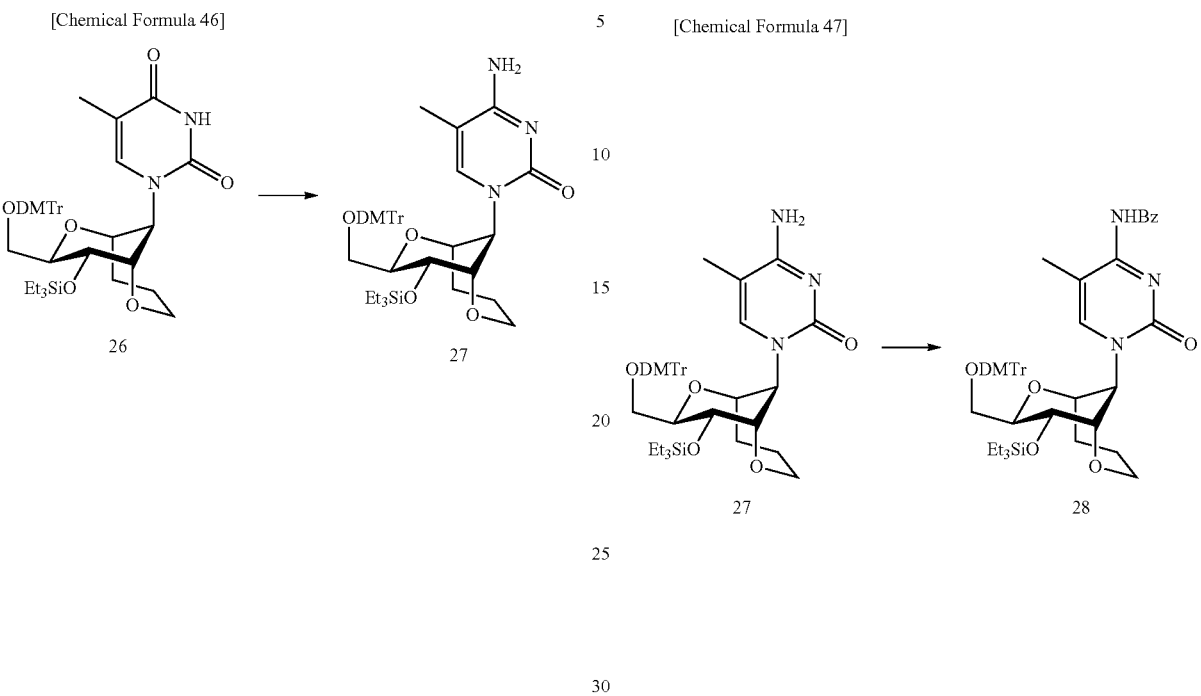

To an anhydrous acetonitrile solution (7 mL) of the compound 26 obtained above (514.3 mg, 0.71 mmol), triethylamine (1.5 mL, 10.8 mmol), and 1,2,4-triazole (714.4 mg, 10.3 mmol) was added dropwise phosphoryl chloride (200 μL, 2.15 mmol), and the resulting mixture was stirred at room temperature under nitrogen stream for 45 minutes. After completion of the reaction, saturated aqueous sodium bicarbonate and ethyl acetate were added, and extraction was performed. After the organic layer was washed with water and a saturated saline solution, the resulting organic layer was dried over anhydrous sodium sulfate, and the solvent was distilled away under reduced pressure. 1,4-Dioxane (7 mL) and 28% aqueous ammonia (1.2 mL, 9.9 mmol) were added, and the resulting mixture was stirred at room temperature for 3 hours. After completion of the reaction, the solvent was distilled away under reduced pressure. The obtained residue was purified by silica gel column chromatography (SiO$_2$, ethyl acetate/methanol=95/5 to 90/10) to obtain a compound 27 (511.9 mg, 99%) as a white solid.

Table 19 shows data on the properties of the obtained compound 27.

(4-3) Synthesis of Compound 28

[Chemical Formula 47]

To a pyridine solution (10 mL) of the compound 27 obtained above (702.8 mg, 0.97 mmol) was added benzoic anhydride (328.4 mg, 1.45 mmol), and the resulting mixture was stirred at 40° C. under nitrogen stream for 6 hours. After completion of the reaction, saturated aqueous sodium bicarbonate and ethyl acetate were added, and extraction was performed. After the organic layer was washed with water and a saturated saline solution, the resulting organic layer was dried over anhydrous sodium sulfate, and the solvent was distilled away under reduced pressure. The obtained residue was purified by silica gel column chromatography (SiO$_2$, chloroform/methanol=99/1 to 97/3) to obtain a compound 28 (634.8 mg, 79%) as a white solid.

Table 20 shows data on the properties of the obtained compound 28.

TABLE 19

Physical property data of the obtained compound 27

$^1$H-NMR (400 MHz, CDCl$_3$) δ: 0.33-0.49 (6H, m), 0.73 (9H, t, J = 7.8 Hz), 1.54 (3H, s), 1.83-1.90 (2H, m), 2.04-2.22 (2H, m), 3.22 (1H, dd, J = 3.7, 10.1 Hz), 3.49 (1H, d, J = 8.7 Hz), 3.79 (3H, s), 3.79 (3H, s), 4.00-4.15 (3H, m), 4.25-4.30 (2H, m), 4.42 (1H, dd, J = 5.0, 5.0 Hz), 5.20 (1H, d, J = 4.1 Hz), 6.78-6.83 (4H, m), 7.19-7.32 (7H, m), 7.45-7.47 (2H, m), 8.20 (2H, brs), 8.28 (1H, s); HRMS (MALDI): Calculated for C$_{41}$H$_{53}$N$_3$O$_7$NaSi [M + Na]$^+$: 750.3545, Found: 750.3545.

TABLE 20

Physical property data of the obtained compound 28

$^1$H-NMR (400 MHz, CDCl$_3$) δ: 0.34-0.49 (6H, m), 0.73 (9H, t, J = 7.9 Hz), 1.77 (3H, s), 1.83-2.30 (4H, m), 3.24 (1H, dd, J = 3.8, 10.0 Hz), 3.51 (1H, d, J = 9.3 Hz), 3.78 (3H, s), 3.79 (3H, s), 4.00-4.10 (3H, m), 4.24-4.30 (2H, m), 4.48 (1H, dd, J = 4.8, 4.8 Hz), 5.08 (1H, d, J = 3.8 Hz), 6.78-6.84 (4H, m), 7.19-7.32 (12H, m), 7.45-7.47 (2H, m), 8.31 (1H, d, J = 1.4 Hz), 8.34 (1H, brs); HRMS (MALDI): Calculated for C$_{48}$H$_{57}$N$_3$O$_8$NaSi [M + Na]$^+$: 854.3871, Found: 854.3838.

(4-4) Synthesis of Compound 29

[Chemical Formula 48]

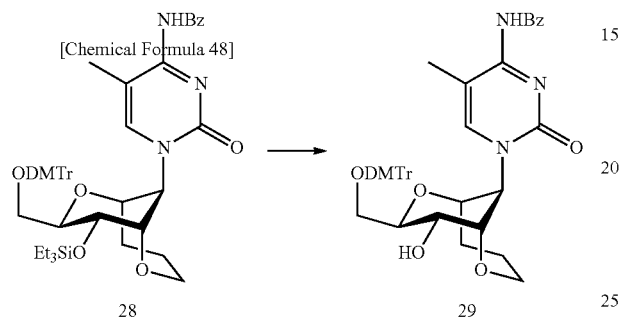

To a tetrahydrofuran (THF) solution (1.0 mL) of the compound 28 obtained above (43.5 mg, 0.05 mmol) was added dropwise tetrabutylammonium fluoride (1 M THF solution, 157 μL, 0.16 mmol), and the resulting mixture was stirred at room temperature for 4 hours. After completion of the reaction, the solvent was distilled away under reduced pressure. The obtained residue was purified by silica gel column chromatography (SiO$_2$, hexane/ethyl acetate=60/40 to 40/60) to obtain a compound 29 (35.6 mg, 95%) as a white solid.

Table 21 shows data on the properties of the obtained compound 29.

TABLE 21

Physical property data of the obtained compound 29

$^1$H-NMR (400 MHz, CDCl$_3$) δ: 1.83 (3H, s), 1.99-2.28 (4H, m), 3.44-3.45 (2H, m), 3.78 (3H, s), 3.79 (3H, s), 3.91-4.14 (4H, m), 4.28 (1H, hrs), 4.41 (1H, hrs), 5.15 (1H, d, J = 3.4 Hz), 6.82-6.86 (4H, m), 7.19-7.52 (13H, m), 8.22 (1H, s), 8.32 (2H, d, J = 7.2 Hz); HRMS (MALDI): Calculated for C$_{42}$H$_{43}$N$_3$O$_8$Na [M + Na]$^+$: 740.2942, Found: 740.2936.

(4-5) Synthesis of Compound 30

[Chemical Formula 49]

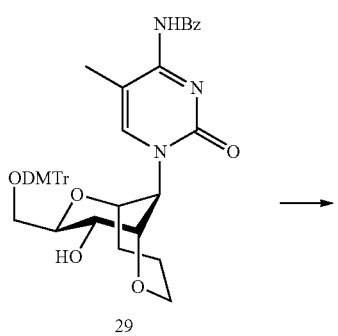

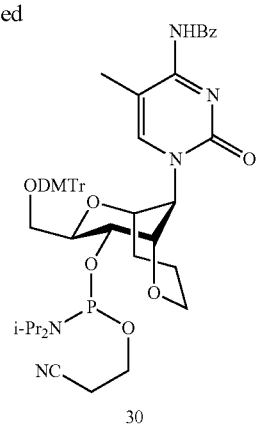

To an anhydrous acetonitrile solution (1 mL) of the compound 29 obtained above (31.0 mg, 0.04 mmol) were added N,N-diisopropylethylamine (23 μL, 0.13 mmol), 1-methylimidazole (1 μL, 0.013 mmol), and 2-cyanoethyl-N,N-diisopropyl phosphorochloridate (15 μL, 0.067 mmol), and the resulting mixture was stirred at room temperature under nitrogen stream for 4 hours. After completion of the reaction, methanol, saturated aqueous sodium bicarbonate, and ethyl acetate were added, and extraction was performed. After the organic layer was washed with water and a saturated saline solution, the resulting organic layer was dried over anhydrous sodium sulfate, and the solvent was distilled away under reduced pressure. The obtained residue was purified by silica gel column chromatography (SiO$_2$, hexane/ethyl acetate=65/35 to 45/55) to obtain a compound 30 (34.3 mg, 84%) as a white solid.

Table 22 shows data on the properties of the obtained compound 30.

TABLE 22

Physical property data of the obtained compound 30

$^{31}$P-NMR (121 MHz, CDCl$_3$) δ: 148.3, 149.0; HRMS (MALDI): Calculated for C$_{51}$H$_{60}$N$_5$O$_9$NaP [M + Na]$^+$: 940.4021, Found: 940.4024.

Example 5: Synthesis of Cross-Linked Nucleoside (5)

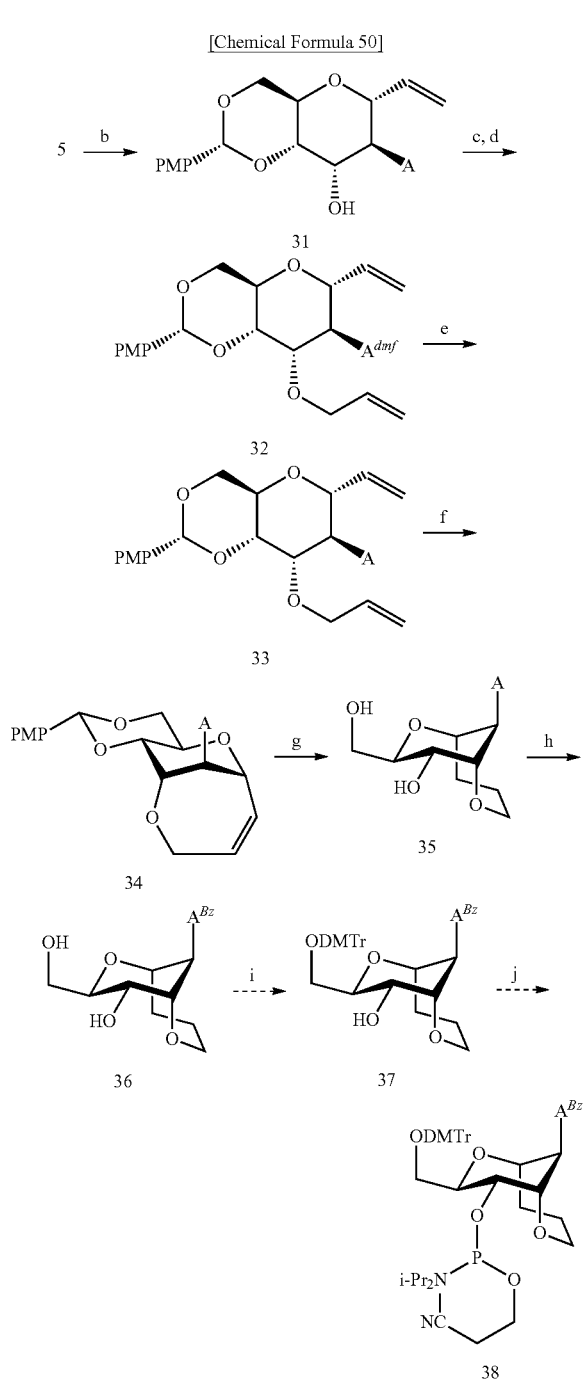

Reagents and Conditions for Each Step:
(b) adenine, DBU, DMF, 150° C. (MW), 2 hr;
(c) N,N-dimethylformamide dimethyl acetal, THF, rt, 16 hr;
(d) allyl bromide, sodium iodide, DMF, -30° C., 3 hr;
(e) aq. NaOH, MeOH, 40° C., 1 hr;
(f) 2$^{nd}$ generation Hoveyda-Grubbs catalyst, 1,4-benzoquinone, toluene, 50° C., 20 hr, 53% (6 steps from Compound 4);
(g) Pd/(OH)$_2$/C, MeOH, THF, 60° C., 7 hr, 70%;
(h) tetramethylsilyl chloride, benzoyl chloride, aqueous ammonia, pyridine, rt, 23 hr, 55%.

(5-1) Synthesis of Compound 31

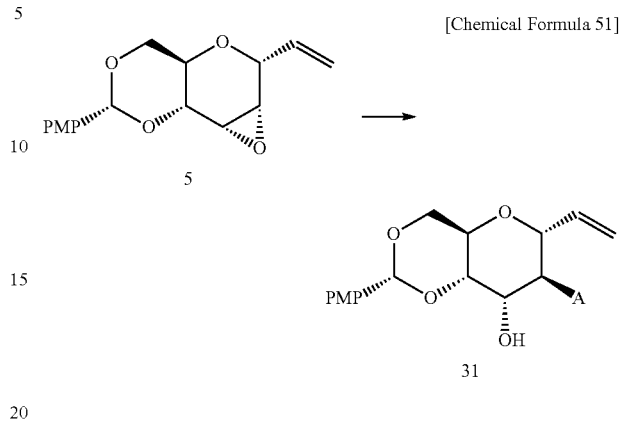

An anhydrous dimethylformamide solution (11.0 mL) of the compound 5 obtained above (1.27 g, 4.36 mmol), adenine (650 mg, 4.81 mmol), and diazabicycloundecene (DBU) (976 μL, 6.54 mmol) was heated at 150° C. under microwave irradiation for 2 hours. After the solution was allowed to cool, ethyl acetate and water were added, and extraction was performed. After the organic layer was washed with a saturated saline solution, the resulting organic layer was dried over anhydrous sodium sulfate, and the solvent was distilled away under reduced pressure. The obtained residue was purified by silica gel column chromatography (SiO$_2$, ethyl acetate/methanol=95/5 to 85/15) to obtain a mixture (1.69 g) of a compound 31 and a 1-ethyl analogue as a pale yellow solid. Since the separation of the compound 31 and the 1-ethyl analogue was difficult, the mixture was directly used for the next reaction without purification.

Table 23 shows data on the properties of the obtained compound 31. Note that, as for the NMR measurement, the mixture of the by-product (1-ethyl analogue) and the compound 31 was used, and only the signal attribution of the compound 31 obtained is shown.

TABLE 23

Physical property data of the obtained compound 31

$^1$H-NMR (300 MHz, CDCl$_3$) δ: 3.68 (1H, dd, J = 2.2, 9.8 Hz), 3.76 (3H, s), 3.78 (1H, d, J = 10.3 Hz), 4.38-4.56 (3H, m), 4.83 (1H, d, J = 5.9 Hz), 5.14 (1H, d, J = 2.8 Hz), 5.40-5.50 (3H, m), 6.31 (1H, brs), 6.39 (2H, brs), 6.48 (1H, ddd, J = 6.2, 10.7, 17.0 Hz), 6.84 (2H, dd, J = 1.8, 8.7 Hz), 7.32 (2H, dd, J = 1.8, 8.7 Hz), 8.15 (1H, s), 8.36 (1H, s); $^{13}$C-NMR (75 MHz, CDCl$_3$) δ: 55.1, 58.2, 60.6, 66.8, 69.2, 76.3, 76.4, 102.1, 113.3, 113.5, 118.5, 118.8, 127.1, 127.4, 134.4, 139.1, 149.2, 153.1, 155.8, 160.0;

HRMS (MALDI): Calculated for C$_{21}$H$_{24}$N$_5$O$_5$ [M + H]$^+$: 426.1772;
Found: 426.1785.

(5-2) Synthesis of Compound 32

[Chemical Formula 52]

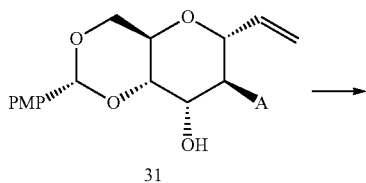

31

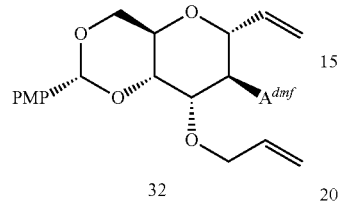

32

To an anhydrous a tetrahydrofuran solution (10 mL) of the mixture of the compound 31 and the 1-ethyl analogue obtained above (423 mg, approximately 0.10 mmol) was added N,N-dimethylformamide dimethyl acetal (400 µL, 2.99 mmol), and the resulting mixture was stirred at room temperature under nitrogen stream for 16 hours. After completion of the reaction, the solvent was distilled away under reduced pressure, anhydrous dimethylformamide (10 mL) and 60% oily sodium hydride (60.1 mg, 1.50 mmol) were added, and the resulting mixture was stirred at −30° C. under nitrogen stream for 1 hour. Then, allyl bromide (100 µL, 1.19 mmol) and sodium iodide (30.1 mg, 0.20 mmol) were added to the reaction solution, and the resulting mixture was stirred at −30° C. under argon stream for 3 hours. After completion of the reaction, methanol (1 mL) was added, and the resulting mixture was stirred at −20° C. for 20 minutes. Then, a saturated aqueous ammonium chloride solution was added, and extraction was performed using ethyl acetate. After the organic layer was washed with saturated aqueous sodium bicarbonate, water, and a saturated saline solution, the resulting organic layer was dried over anhydrous sodium sulfate, and the solvent was distilled away under reduced pressure. The obtained residue was purified by silica gel column chromatography (SiO₂, ethyl acetate/methanol=98/2 to 93/7) to obtain a mixture (426.0 mg) of a compound 32 and a 1-ethyl analogue as a white solid.

Table 24 shows data on the properties of the obtained compound 32. Note that, as for the NMR measurement, the mixture of the by-product (1-ethyl analogue) and the compound 32 was used, and only the signal attribution of the compound 32 obtained is shown.

TABLE 24

Physical property data of the obtained compound 32

¹H-NMR (300 MHz, CDCl₃) δ: 3.24 (3H, s), 3.29 (3H, s), 3.69 (1H, d, J = 2.9, 9.7 Hz), 3.72-3.78 (1H, m), 3.79 (3H, s), 4.15 (1H, dd, J = 2.9, 2.9 Hz), 4.30-4.49 (4H, m), 4.88 (1H, d, J = 6.3 Hz), 5.01 (1H, d, J = 2.9 Hz), 5.20 (1H, dd, J = 1.4, 10.6 Hz), 5.38-5.43 (4H, m), 5.94-6.02 (1H, m), 6.54 (1H, ddd, J = 6.3, 10.3, 16.9 Hz), 6.85 (2H, dd, J = 2.3, 9.2 Hz), 7.33 (2H, d, J = 9.2 Hz), 8.44 (1H, s), 8.57 (1H, s), 9.01 (1H, s); ¹³C-NMR (75 MHz, CDCl₃) δ: 35.1, 41.3, 55.2, 56.6, 61.2, 72.2, 73.6, 76.5, 102.2, 113.5, 116.8, 118.5, 125.4, 127.4, 134.3, 134.1, 140.3, 151.6, 152.9, 158.1, 159.7, 160.0;

TABLE 24-continued

Physical property data of the obtained compound 32

HRMS (MALDI): Calculated for C₂₇H₃₃N₆O₅ [M + H]⁺: 521.2507, Found: 521.2500.

(5-3) Synthesis of Compound 33

[Chemical Formula 53]

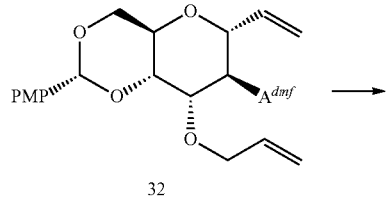

32

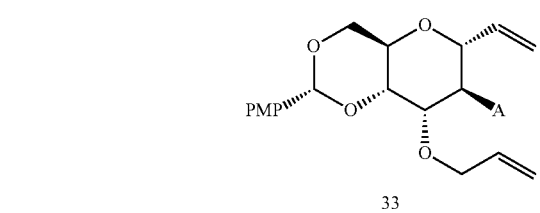

33

To a methanol solution (4.9 mL) of the mixture of the compound 32 and the 1-ethyl analogue obtained above (254.8 mg, approximately 0.49 mmol) was added a 2 N aqueous sodium hydroxide solution (1.46 mL, 2.92 mmol), and the resulting mixture was stirred at 40° C. for 1 hour. After completion of the reaction, the precipitated white solid was collected by filtration. The filtrate was distilled away under reduced pressure, the obtained residue was washed with methanol, and the resulting white solid was again collected by filtration. The collected white solids were combined to obtain a mixture (194.6 mg) of a compound 33 and a 1-ethyl analogue as a white solid.

Table 25 shows data on the properties of the obtained compound 33. Note that, as for the NMR measurement, the mixture of the by-product (1-ethyl analogue) and the compound 33 was used, and only the signal attribution of the compound 33 obtained is shown.

TABLE 25

Physical property data of the obtained compound 33

¹H-NMR (400 MHz, CDCl₃) δ: 3.72 (1H, dd, J = 2.8, 10.1 Hz), 3.75 (1H, d, J = 10.6 Hz), 3.79 (3H, s), 4.14 (1H, dd, J = 2.8, 2.8 Hz), 4.30-4.50 (4H, m), 4.84 (1H, d, J = 6.4 Hz), 4.98 (1H, d, J = 2.8 Hz), 5.20 (1H, dd, J = 1.4, 10.5 Hz), 5.36-5.43 (4H, m), 5.56 (2H, brs), 5.91-6.00 (1H, m), 6.54 (1H, ddd, J = 6.4, 10.5, 16.9 Hz), 6.85 (2H, d, J = 8.7 Hz), 7.33 (2H, d, J = 8.7 Hz), 8.36 (1H, s), 8.38 (1H, s); ¹³C-NMR (100 MHz, CDCl₃) δ: 55.2, 56.6, 61.1, 69.4, 72.3, 73.6, 76.4, 102.2, 113.4, 113.5, 116.9, 118.7, 119.0, 127.3, 127.4, 129.7, 134.2, 134.3, 139.1, 150.0, 153.3, 155.6, 160.0; HRMS (MALDI): Calculated for C₂₄H₂₈N₅O₅ [M + H]⁺: 466.2085, Found: 466.2064.

(5-4) Synthesis of Compound 34

[Chemical Formula 54]

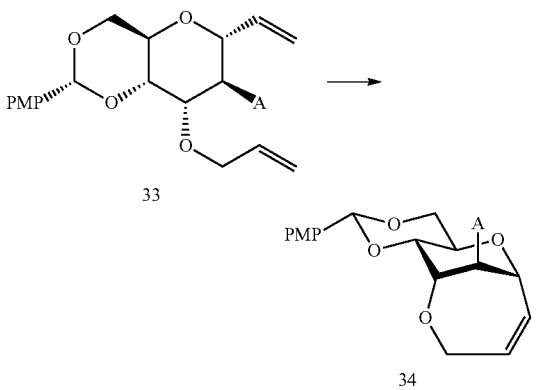

To a deoxygenated toluene solution (4.5 mL) of the mixture of the compound 33 and the 1-ethyl analogue obtained above (23.5 mg, approximately 0.045 mmol) were added a second-generation Hoveyda-Grubbs catalyst (3.2 mg, 0.005 mmol) and p-benzoquinone (0.7 mg, 0.006 mmol) at room temperature under nitrogen stream, and the resulting mixture was stirred at 50° C. for 20 hours. The reaction solution was then distilled away under reduced pressure, and the obtained residue was purified by silica gel column chromatography (SiO$_2$, chloroform/acetone=95/5 to 70/30) to obtain a compound 34 (18.2 mg, 53%, six steps from the compound 4) as a white solid.

Table 26 shows data on the properties of the obtained compound 34.

TABLE 26

Physical property data of the obtained compound 34

$^1$H-NMR (400 MHz, CDCl$_3$) δ: 3.62 (1H, dd, J = 1.8, 9.2 Hz), 3.76 (3H, s), 3.78-3.86 (1H, m), 4.36-4.42 (2H, m), 4.53 (1H, dd, J = 6.9, 17.0 Hz), 4.61 (1H, brs), 4.82 (1H, d, J = 17.0 Hz), 4.98 (1H, d, J = 6.4 Hz), 5.38 (1H, d, J = 4.1 Hz), 5.12 (1H, s), 5.65 (2H, brs), 5.91 (1H, ddd, J = 2.3, 6.4, 8.7 Hz), 6.39 (1H, ddd, J = 2.8, 6.6, 8.8 Hz), 6.81 (2H, d, J = 8.7 Hz), 7.35 (2H, d, J = 8.7 Hz), 8.34 (1H, s), 8.45 (1H, s); HRMS (MALDI): Calculated for C$_{22}$H$_{24}$N$_5$O$_5$ [M + H]$^+$: 538.1772, Found: 438.1173.

(5-5) Synthesis of Compound 35

[Chemical Formula 55]

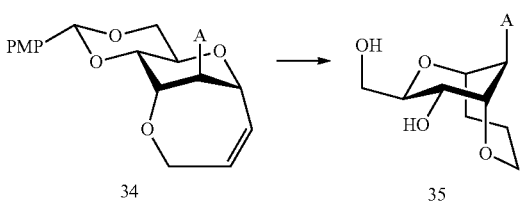

To a methanol/THF mixed solvent (3.9 mL, methano/THF=2/1) of the compound 34 obtained above (57.8 mg, 0.13 mmol) was added acetic acid (116 μL), and after palladium hydroxide/carbon (wetted with approximately 50% water, 48.1 mg) was added thereto, the resulting mixture was stirred at 60° C. under hydrogen stream for 7 hours. After completion of the reaction, the mixture was filtered, and washed with ethyl acetate, and then, the filtrate was distilled away under reduced pressure to obtain a compound 35 (29.5 mg, 70%) as a white solid.

Table 27 shows data on the properties of the obtained compound 35.

TABLE 27

Physical property data of the obtained compound 35

$^1$H-NMR (400 MHz, CDCl$_3$) δ: 1.94-2.12 (2H, m), 2.34 (1H, brs), 2.37 (1H, brs), 3.71 (1H, dd, J = 2.3, 9.6 Hz), 3.71-3.79 (1H, m), 3.74 (3H, s), 3.98 (1H, t, J = 10.3 Hz), 4.22-4.31 (2H, m), 4.43 (1H, dd, J = 4.9 ,10.3 Hz), 4.52-4.63 (2H, m), 4.68 (1H, brs), 5.44 (1H, d, J = 4.1 Hz), 5.49 (1H, d, J = 4.1 Hz), 6.78-6.82 (2H, m), 7.32-7.45 (2H, m), 8.62 (1H, s), 9.00 (1H, s), 9.95 (1H, s), 9.98 (1H, s); HRMS (MALDI): Calculated for C$_{14}$H$_{20}$N$_5$O$_4$ [M + H]$^+$: 322.1510, Found: 322.1505.

(5-6) Synthesis of Compound 36

[Chemical Formula 56]

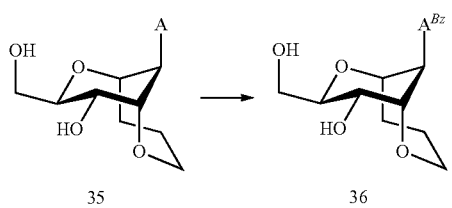

To a pyridine solution (1 mL) of the compound 35 obtained above (25.2 mg, 0.078 mmol) was added tetramethylsilyl chloride (40 μL, 0.32 mmol), and the resulting mixture was stirred at room temperature under nitrogen stream for 2 hours. Then, benzoyl chloride (35 μL, 0.30 mmol) was added dropwise, and the resulting mixture was stirred at room temperature under nitrogen stream for 18 hours. After completion of the reaction, aqueous ammonia (680 μL) was added, and after 5 hours, the reaction liquid was concentrated. To the residue were added pyridine (1 mL) and aqueous ammonia, and, after stirring at room temperature for 3 hours, the reaction liquid was concentrated. The obtained residue was purified by silica gel column chromatography (SiO$_2$, ethyl acetate/methanol=100/0 to 93/7) to obtain a compound 36 (18.2 mg, 55%) as a white solid.

Table 28 shows data on the properties of the obtained compound 36.

TABLE 28

Physical property data of the obtained compound 36

$^1$H-NMR (300 MHz, CDCl3) δ: 1.86-2.26 (4H, m), 3.56 (1H, brs),
3.73 (1H, d, J = 9.6 Hz), 3.91 (2H, s), 4.09-4.23 (3H, m), 4.37 (1H,
dd, J = 3.3, 3.3 Hz), 4.58 (1H, brs), 5.37 (1H, d, J = 3.6 Hz), 7.45-
7.61 (3H, m), 8.02 (2H, d, J = 7.2 Hz), 8.78 (2H, s), 9.68 (1H, brs);

TABLE 28-continued

Physical property data of the obtained compound 36

HRMS (MALDI): Calculated for $C_{21}H_{24}N_5O_5$ [M + H]$^+$: 426.1772,
Found: 426.1778.

(5-7) Synthesis of Compound 37

To an anhydrous pyridine solution of the compound 36 obtained above is added 4,4'-dimethoxytrityl chloride, and the resulting mixture is stirred under nitrogen stream. After completion of the reaction, methanol is added to the reaction solution, and the solvent is distilled away under reduced pressure. Ethyl acetate and saturated aqueous sodium bicarbonate are added to the obtained residue, and extraction is performed. After the organic layer is washed with saturated aqueous sodium bicarbonate and a saturated saline solution, the resulting organic layer is dried over anhydrous sodium sulfate, and the solvent is distilled away under reduced pressure. The obtained residue is purified by silica gel column chromatography to obtain a compound 37.

(5-8) Synthesis of Compound 38

To an anhydrous acetonitrile solution of the compound 37 obtained above, N,N-diisopropylethylamine, and 1-methylimidazole is added, under ice-cooling, 2-cyanoethyl-N,N-diisopropyl phosphorochloridate, and the resulting mixture is stirred under nitrogen stream. After completion of the reaction, saturated aqueous sodium bicarbonate and ethyl acetate are added, and extraction is performed. After the organic layer is washed with saturated aqueous sodium bicarbonate and a saturated saline solution, the resulting organic layer is dried over anhydrous sodium sulfate, and the solvent is distilled away under reduced pressure. The obtained residue is purified by silica gel column chromatography to obtain a compound 38.

Example 6: Synthesis of Cross-Linked Nucleoside (6)

[Chemical Formula 57]

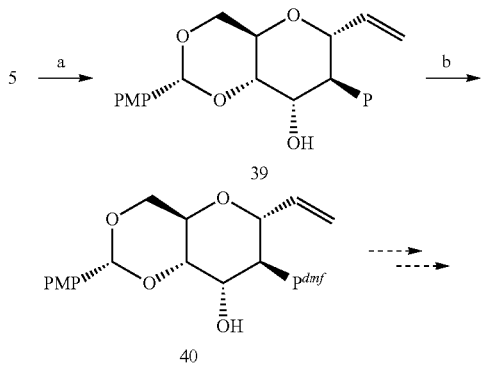

-continued

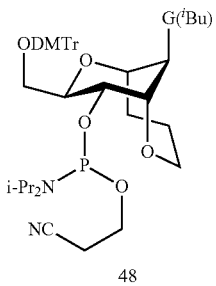

Reagents and Conditions for Each Step: (a) 2-amino-6-chloroprine, potassium carbonate, 18-crown-6, HMPA, rt 14 hr; (b) N,N-dimethylformamide dimethyl acetal, DMF, 50° C., 19 hr.

(6-1) Synthesis of Compound 39

[Chemical Formula 58]

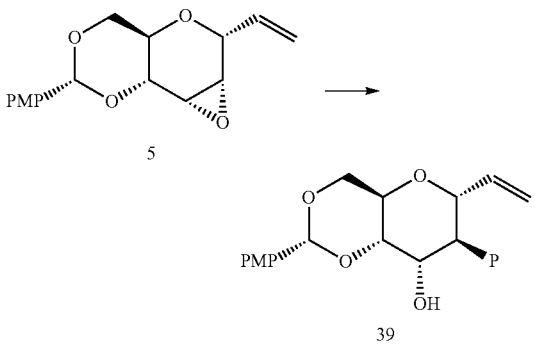

A solution of the compound 5 obtained above (170.6 mg, 0.59 mmol), 2-amino-6-chloropurine (199.3 mg, 1.18 mmol), potassium carbonate (448.0 mg, 3.24 mmol), and 18-crown-6 (387.7 mg, 1.47 mmol) in HMPA (2 mL) was stirred at room temperature under nitrogen stream for 14 hours. After completion of the reaction, the reaction liquid was poured into ice water, followed by stirring for 1 hour. The precipitated white solid was collected by filtration, and washed with ice water and diethyl ether. The obtained residue was purified by silica gel column chromatography (SiO$_2$, chloroform/methanol=100/0 to 95/5) to obtain a mixture (75.4 mg) of a compound 39 and a 1-ethyl analogue as a white solid.

Table 29 shows data on the properties of the obtained compound 39. Note that, as for the NMR measurement, the mixture of the by-product (1-ethyl analogue) and the compound 39 was used, and only the signal attribution of the compound 39 obtained is shown.

TABLE 29

Physical property data of the obtained compound 39

$^1$H-NMR (300 MHz, CDCl$_3$) δ: 3.69 (1H, dd, J = 2.3, 9.5 Hz), 3.72-
3.79 (1H, m), 3.83 (3H, s), 4.41-4.46 (2H, m), 4.56 (1H, ddd, J =
5.2, 10.0, 14.8 Hz), 4.85 (1H, d, J = 6.2 Hz), 5.03 (1H, brs),
5.29

TABLE 29-continued

| Physical property data of the obtained compound 39 |
|---|
| (1H, d, J = 3.1 Hz), 5.38-5.52 (m, 3H), 6.60 (1H, ddd, J = 6.2, 10.7, 17.0 Hz), 6.86-6.90 (4H, m), 7.32-7.35 (2H, m), 8.37 (1H, s); HRMS (MALDI): Calculated for $C_{21}H_{22}ClN_5O_5$ [M + H]$^+$: 460.1382, Found: 460.1402. |

(6-2) Synthesis of Compound 40

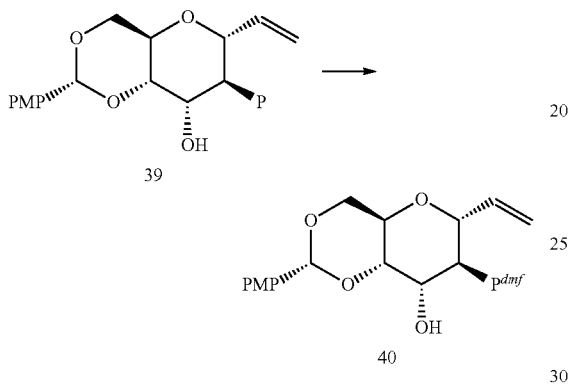

To a solution of the mixture of the compound 39 and the 1-ethyl analogue obtained above (72.0 mg, approximately 0.16 mmol) in anhydrous dimethylformamide (16 mL) was added N,N-dimethylformamide dimethyl acetal (199.3 mg, 1.18 mmol), and the resulting mixture was stirred at 50° C. under nitrogen stream for 19 hours. After completion of the reaction, the reaction liquid was concentrated. The obtained residue was purified by silica gel column chromatography (SiO$_2$, ethyl acetate) to obtain a mixture (50.1 mg) of a compound 40 and a 1-ethyl analogue as a white solid.

Table 30 shows data on the properties of the obtained compound 40. Note that, as for the NMR measurement, the mixture of the by-product (1-ethyl analogue) and the compound 40 was used, and only the signal attribution of the compound 40 obtained is shown.

TABLE 30

| Physical property data of the obtained compound 40 |
|---|
| $^1$H-NMR (300 MHz, CDCl$_3$) δ: 3,12 (6H, s), 3.70-3.80 (2H, m), 3.78 (3H, s), 3.82 (1H, s), 4.37-4.45 (3H, m), 4.75 (1H, d, J = 6.0 Hz), 5.12 (1H, d, J = 2.8 Hz), 5.39-5.52 (m, 3H), 6.50, (1H, ddd, J = 6.4, 10.5, 17.0 Hz), 6.82-6.85 (2H, m), 7.29-7.31 (2H, m), 8.43 (1H, s), 8.73 (1H, s); $^{13}$C-NMR (100 MHz, CDCl$_3$) δ: ; HRMS (MALDI): Calculated for $C_{24}H_{28}ClN_6O_5$ [M + H]$^+$: 515.1804, Found: 515.1794. |

(6-8) Synthesis of Compound 48

With the use of the compound 40 obtained above, a compound 48 was synthesized from the compound 40 using methods similar to those of Example 5 (the synthesis methods for the compounds 31 to 38).

Example 7: Synthesis of Cross-Linked Nucleoside (7)

[Chemical Formula 60]

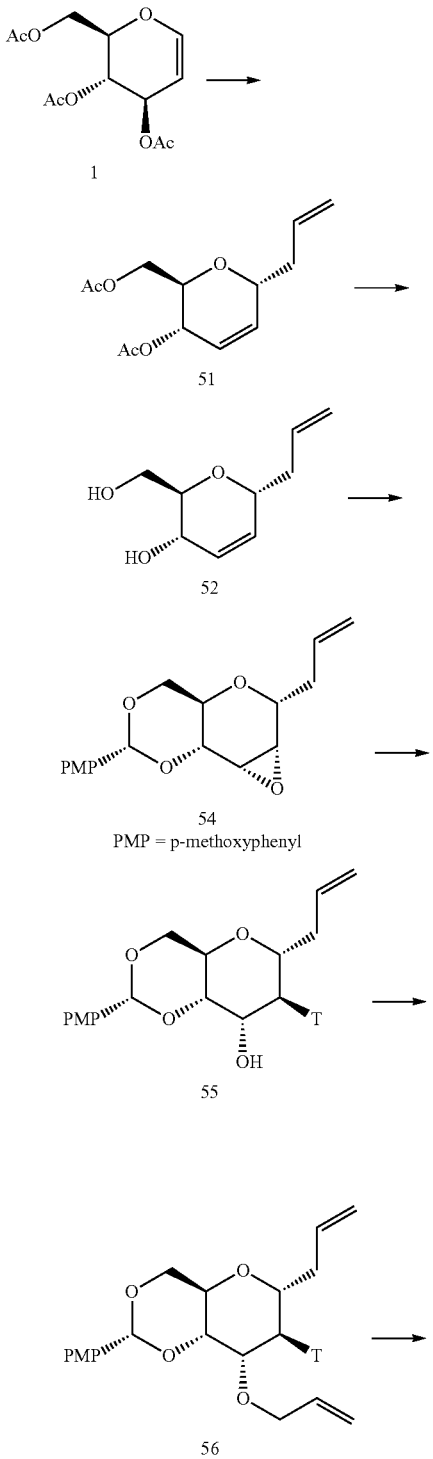

PMP = p-methoxyphenyl

67 -continued

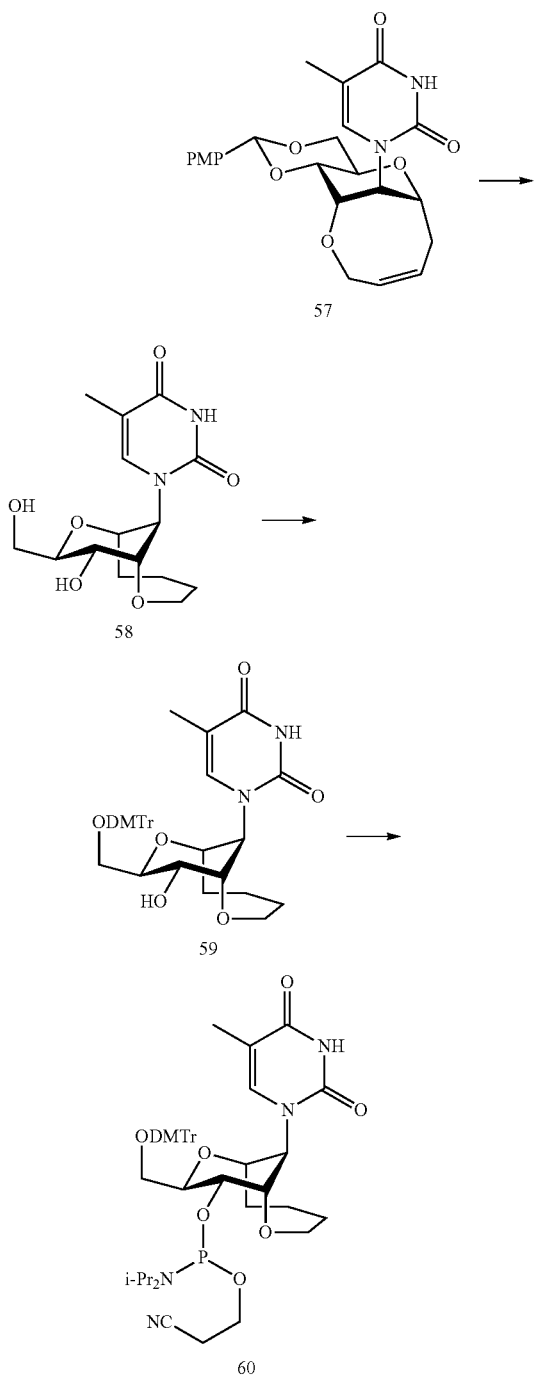

Reagents and Conditions for Each Step:
(a) allyltrimethylsilane, TMSOTf, MeCN, 0 ° C, 1 hr;
(b) NaOMe, MeOH, rt, 1 hr, 87% (2 steps);
(c) mCPBA, toluene, 0 ° C, 1 hr;
(d) p-anisaldehyde dimethylacetal, CSA, MeCN, 50 ° C, 7.5 hr, 63%;
(g) 2$^{nd}$ generation Hoveyda-Grubbs catalyst, toluene, 70 ° C, 2.5 hr;
(h) Pd(OH)$_2$/C, H$_2$, MeOH, rt, 10 min
(i) 4,4'-dimethoxytrityl chloride, pyridine, rt, 1.5 hr, 38% (3 steps);
(j) 2-cyanoethyl-N-diisopropyl phosphorochloridate, diisopropylethylamine, 1-methylimidazole, MeCN, rt, 1 hr, 84%.

68

(7-1) Synthesis of Compound 51

[Chemical Formula 61]

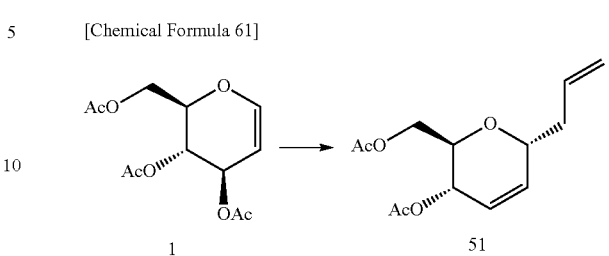

To a solution of the compound 1 (1.03 g, 3.77 mmol) in anhydrous acetonitrile (14.7 mL) was added, under ice-cooling, allyltrimethylsilane (0.705 ml, 4.44 mmol). Then, trimethylsilyl triflate (0.71 ml, 3.93 mmol) was added dropwise thereto, and the resulting mixture was stirred at room temperature under nitrogen stream for 1 hour. After completion of the reaction, saturated aqueous sodium bicarbonate was added to the reaction solution, and the resulting mixture was stirred. Then, the mixture was extracted using ethyl acetate. The extraction fraction was washed with water and a saturated saline solution and then dried over anhydrous sodium sulfate, and the solvent was distilled away under reduced pressure. The thus obtained crude product was directly used for the next reaction without further purification.

(7-2) Synthesis of Compound 52

[Chemical Formula 62]

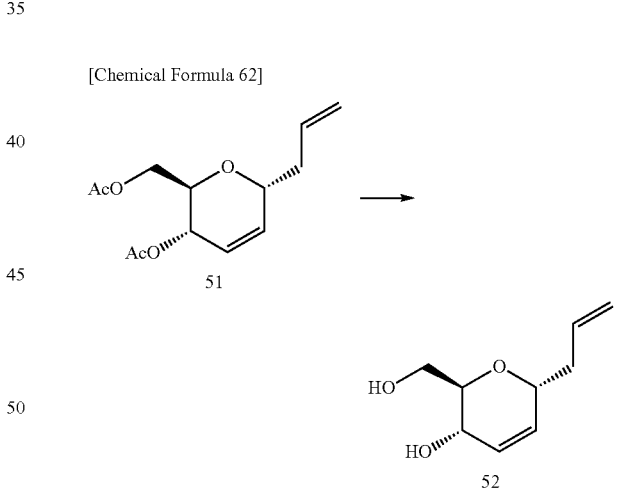

To a solution of the compound 51 obtained above in methanol (14.4 mL) was added, under ice-cooling, 5 M NaOMe (methanol solution, 0.75mL, 3.75 mmol), and the resulting mixture was stirred at room temperature under nitrogen stream for 1 hour. After completion of the reaction, DOWEX 50×8 200 Mesh was added to the reaction solution, and the resulting mixture was stirred for neutralization. Then, the mixture was filtered, and the filtrate was concentrated to obtain a compound 52 (0.56 g, 87%, two steps from the compound 1) as a yellowish brown oily substance. Note that this compound 52 is described in Mallikharjuna R. Lambu et al., J. Med. Chem., 2013, 56, 6122-6135.

(7-3) Synthesis of Compound 54

[Chemical Formula 63]

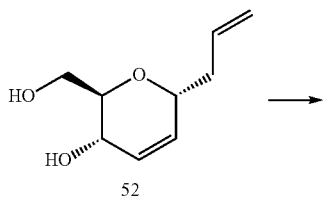

52

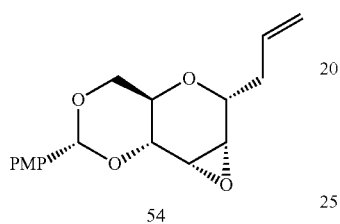

54

To a solution of the compound 52 obtained above (201.1 mg, 1.18 mmol) in toluene (4.70 mL) was added, under ice-cooling, mCPBA (purity: 70%, 866 mg, 3.51 mmol), and the resulting mixture was stirred at 0° C. for 1 hour. After completion of the reaction, cyclohexene was added to the reaction solution, and the resulting mixture was stirred. Then, the mixture was filtered, and the filtrate was concentrated. Subsequently, after the obtained epoxydiol was azeotroped with toluene, anhydrous acetonitrile (5.0 mL), p-anisaldehyde dimethyl acetal (0.40 mL, 2.35 mmol), and (±)-camphorsulfonic acid (27.3 mg, 0.118 mmol) were added thereto, and the resulting mixture was stirred at 50° C. under nitrogen stream for 16 hours. After completion of the reaction, the reaction solution was neutralized with triethylamine (0.25 mL) under ice-cooling. The resulting mixed solution was purified by silica gel column chromatography (SiO$_2$, hexane/ethyl acetate=80/20 to 20/80) to obtain a compound 54 (92.1 mg, 26%, two steps from the compound 52) as a yellow solid.

Table 31 shows data on the properties of the obtained compound 54.

TABLE 31

Physical property data of the obtained compound 54

$^1$H-NMR (300 MHz, CDCl$_3$) δ: 2.53 (2H, dt, J = 0.9, 7.0 Hz), 3.40 (1H, dd, J = 3.3, 4.6 Hz), 3.57 (1H, d, J = 7.8 Hz), 3.62 (1H, dd, J = 10.1, 10.1 Hz), 3.80 (3H, s), 3.84 (1H, ddd, J = 4.9, 9.6, 14.1 Hz), 3.98 (1H, dd, J = 1.4, 8.9 Hz), 4.09 (1H, dt, J = 3.2, 7.3

Hz), 4.16 (1H, dd, J = 4.8, 10.3 Hz), 5.13 (1H, dt, J = 10.1, 0.9

Hz), 5.20 (1H, ddd, J = 16.8, 1.7, 1.4 Hz), 5.52 (1H, s), 5.79-5.93

TABLE 31-continued

Physical property data of the obtained compound 54

(1H, m), 6.87-6.92 (2H, m), 7.41-7.46 (2H, m); $^{13}$C-NMR (75 MHz, Acetone-d$_6$) δ: 35.4, 52.6, 55.7, 56.0, 69.7, 71.5, 79.0, 103.1, 114.2, 117.9, 128.6, 131.6, 135.5, 161.1; HRMS (MALDI): Calculated for C$_{17}$H$_{21}$O$_5$ [M + H]$^+$: 305.1384, Found: 305.1384.

(7-4) Synthesis of Compound 55

[Chemical Formula 64]

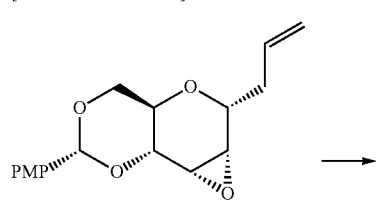

54

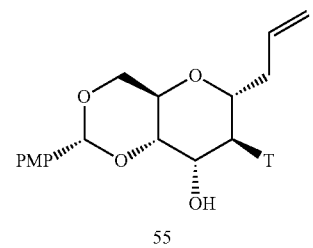

55

A solution of the compound 54 obtained above (574.8 mg, 1.89 mmol), thymine (480 mg, 3.81 mmol), and diazabicycloundecene (DBU) (1.13 mL, 7.57 mmol) in anhydrous acetonitrile (9.4 mL) was heated at 100° C. under microwave irradiation for 24.5 hours. Thymine (477.2 mg, 3.78 mmol) and DBU (1.13 mL, 7.57 mmol) were further added to the reaction solution, and the resulting mixture was reacted at 100° C. for 17 hours. After completion of the reaction, the resulting mixed solution was purified by silica gel column chromatography (SiO$_2$, hexane/ethyl acetate=40/60). The obtained compound was dissolved in dichloromethane, followed by washing with saturated aqueous sodium bicarbonate and a saturated saline solution. Then, the organic layer was dried over anhydrous sodium sulfate, and the solvent was distilled away under reduced pressure. Thus, a white solid 55 (732.7 mg, 90%) was obtained.

Table 32 shows data on the properties of the obtained compound 55.

TABLE 32

Physical property data of the obtained compound 55

$^1$H-NMR (300 MHz, CDCl$_3$) δ: 1.95 (3H, d, J = 0.8 Hz), 2.67-2.77 (1H, m), 3.05-3.16 (1H, m), 3.66 (1H, dd, J = 2.8, 9.3 Hz), 3.73 (1H, dd, J = 9.6, 9.6 Hz), 3.79 (4H, s), 4.08 (1H, dd, J = 7.7, 7.7 Hz), 4.21 (1H, d, J = 2.1 Hz), 4.24-4.37 (2H, m), 4.62 (1H, s), 5.15 (1H, dd, J = 1.4, 1.7 Hz), 5.21 (1H, dd, J = 1.4, 1.7 Hz), 5.58 (1H, s), 5.71-5.85 (1H, m), 6.84-6.89 (2H, m), 7.38-7.41 (2H, m), 7.76 (1H, s), 9.72 (1H, s); $^{13}$C-NMR (75 MHz, CDCl$_3$) δ: 13.2, 36.7, 55.6, 59.9, 67.7, 69.8, 74.9, 76.5, 77.6, 102.6, 112.0, 114.0, 119.1, 127.9, 129.8, 134.0, 137.9, 151.3, 160.6, 164.2; HRMS (MALDI): Calculated for C$_{22}$H$_{26}$N$_2$O$_7$Na [M + Na]$^+$: 453.1632, Found: 453.1632.

(7-5) Synthesis of Compound 56

TABLE 32

Physical property data of the obtained compound 55

$^1$H-NMR (300 MHz, CDCl$_3$) δ: 1.95 (3H, d, J = 0.8 Hz), 2.67-2.77 (1H, m), 3.05-3.16 (1H, m), 3.66 (1H, dd, J = 2.8, 9.3 Hz), 3.73 (1H, dd, J = 9.6, 9.6 Hz), 3.79 (4H, s), 4.08 (1H, dd, J = 7.7, 7.7 Hz), 4.21 (1H, d, J = 2.1 Hz), 4.24-4.37 (2H, m), 4.62 (1H, s), 5.15 (1H, dd, J = 1.4, 1.7 Hz), 5.21 (1H, dd, J = 1.4, 1.7 Hz), 5.58 (1H, s), 5.71-5.85 (1H, m), 6.84-6.89 (2H, m), 7.38-7.41 (2H, m), 7.76 (1H, s), 9.72 (1H, s); $^{13}$C-NMR (75 MHz, CDCl$_3$) δ: 13.2, 36.7, 55.6, 59.9, 67.7, 69.8, 74.9, 76.5, 77.6, 102.6, 112.0, 114.0, 119.1, 127.9, 129.8, 134.0, 137.9, 151.3, 160.6, 164.2; HRMS (MALDI): Calculated for C$_{22}$H$_{26}$N$_2$O$_7$Na [M + Na]$^+$: 453.1632, Found: 453.1632.

To a solution of the compound 55 obtained above (254.4 mg, 0.59 mmol) in anhydrous THF (6.0 mL) was added, under ice-cooling, sodium hydride (60% in oil, 61.8 mg, 1.55 mmol), and the resulting mixture was stirred at room temperature under nitrogen stream for 1 hour. Then, allyl bromide (60 µL, 0.71 mmol) was added dropwise to the solution, sodium iodide (27.1 mg, 0.18 mmol) was further added thereto, and the resulting mixture was stirred at 50° C. for 9 hours. After completion of the reaction, saturated aqueous ammonium chloride was added, and extraction was performed using ethyl acetate. The organic layer was washed with saturated aqueous sodium bicarbonate and a saturated saline solution, the resulting organic layer was dried over anhydrous sodium sulfate, and the solvent was distilled away under reduced pressure. The resulting residue was purified by silica gel column chromatography (SiO$_2$, chloroform/methanol=7/1) to obtain a compound 56 (55.5 mg, 63%) as a white solid.

Table 33 shows data on the properties of the obtained compound 56.

TABLE 33

Physical property data of the obtained compound 56

$^1$H-NMR (300 MHz, CDCl$_3$) δ: 1.97 (3H, d, J = 1.0 Hz), 2.64-2.77 (1H, m), 2.99-3.09 (1H, m), 3.65 (1H, dd, J = 2.9, 9.5 Hz), 3.72 (1H, dd, J = 9.6, 9.6 Hz), 3.80 (3H, s), 3.91 (1H, s), 4.09 (1H, ddd, J = 3.2, 7.3, 7.3 Hz), 4.23-4.37 (4H, m), 4.64 (1H, d, J = 2.8 Hz), 5.16-5.24 (3H, m), 5.37 (1H, dt, J = 17.2, 1.7 Hz), 5.53 (1H, s), 5.71-5.85 (1H, m), 5.88-6.00 (1H, m), 6.86-6.91

TABLE 33-continued

Physical property data of the obtained compound 56

(2H, m), 7.36-7.41 (2H, m), 7.77 (1H, d, J = 1.0 Hz), 9.62 (1H, s); $^{13}$C-NMR (75 MHz, CDCl$_3$) δ: 13.7, 38.3, 56.6, 57.5, 62.2, 71.2, 73.8, 76.2, 76.3, 78.3, 80.3, 104.2, 112.6, 115.2, 117.9, 119.4, 129.5, 132.3, 136.5, 136.8, 140.4, 153.5, 162.4, 167,2; HRMS (MALDI): Calculated for C$_{25}$H$_{30}$N$_2$O$_7$Na [M + Na]$^+$: 493.1945, Found: 493.1945.

(7-6) Synthesis of Compound 57

[Chemical Formula 66]

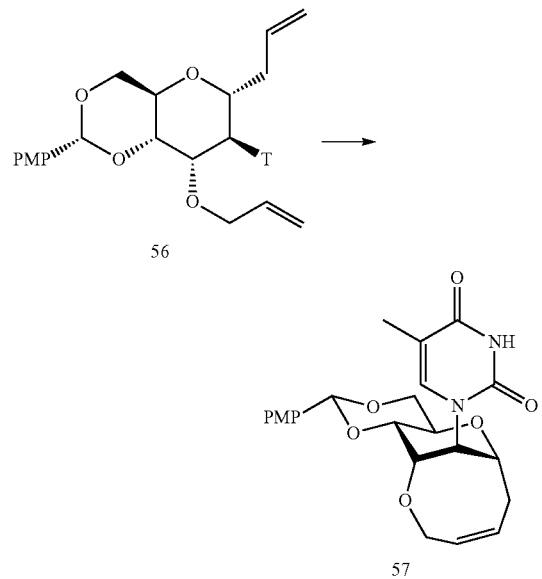

To a deoxygenated dichloroethane solution (50 mL) of the compound 56 obtained above (234.7 mg, 0.50 mmol) were added 1,4-benzoquinone (5.2 mg, 0.048 mmol) and a second-generation Hoveyda-Grubbs catalyst (17.0 mg, 0.027 mmol) at room temperature under nitrogen stream, and the resulting mixture was stirred at 70° C. for 1.5 hours. Then, the reaction solution was distilled away under reduced pressure, and the obtained residue was purified by silica gel column chromatography (SiO$_2$, hexane/ethyl acetate=33/67). The thus obtained crude product was directly used for the next reaction without further purification.

(7-7) Synthesis of Compound 58

[Chemical Formula 67]

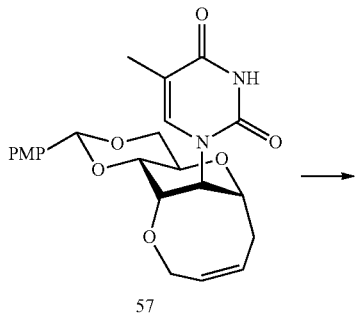

To a methanol solution (2.9 mL) of the crude product of a compound 57 obtained above (128.5 mg, approximately 0.291 mmol) was added Pd(OH)$_2$/C (31.1 mg, wetted with approximately 50% water), and the resulting mixture was stirred at room temperature under hydrogen stream for 10 minutes. After completion of the reaction, the mixture was filtered and washed with methanol, and then, the filtrate was distilled away under reduced pressure. The thus obtained crude product 58 was directly used for the next reaction without further purification.

(7-8) Synthesis of Compound 59

[Chemical Formula 68]

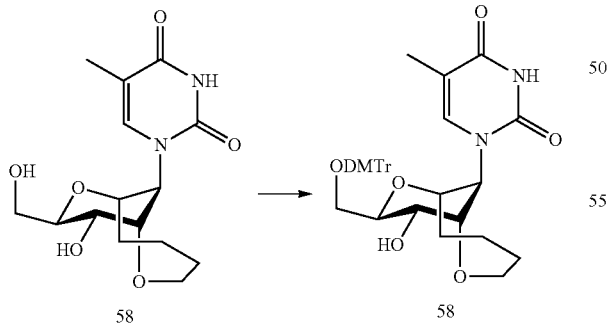

To an anhydrous pyridine solution (3.0 mL) of the compound 58 obtained above was added 4,4'-dimethoxytrityl chloride (142.7 mg, 0.42 mmol), and the resulting mixture was stirred at room temperature under nitrogen stream for 1.5 hours. After completion of the reaction, aqueous sodium bicarbonate and ethyl acetate were added to the reaction solution, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography (SiO$_2$, hexane/ethyl acetate=25/75) to obtain a compound 59 (118.2 mg, 38%, three steps from the compound 56) as a white solid.

Table 34 shows data on the properties of the obtained compound 59.

TABLE 34

| Physical property data of the obtained compound 59 |
|---|
| $^1$H-NMR (500 MHz, CDCl$_3$) δ: 1.23-1.26 (1H, m), 1.40 (1H, d, J = 11.5 Hz), 1.68 (3H, s), 1.75 (1H, dd, J = 13.2, 13.2 Hz), 1.84-1.89 (1H, m), 2.08-2.13 (1H, m), 2.18-2.24 (2H, m), 3.38-3.43 (2H, m), 3.79 (6H, s), 3.91-3.96 (4H, m), 4.13 (1H, dd, J = 2.9, 12.6 Hz), 4.25 (1H, dd, J = 9.5, 9.5 Hz), 6.8-6.84 (4H, m), 7.19-7.22 (1H, m), 7.26-7.29 (5H, m), 7.33-7.36 (4H, m), 7.45 (2H, d, J = 7.5 Hz), 8.11 (1H, s), 8.25 (1H, s); HRMS (MALDI): Calculated for C$_{36}$H$_{40}$N$_2$O$_8$Na [M + Na]$^+$: 651.2677, Found: 651.2680. |

(7-9) Synthesis of Compound 60

[Chemical Formula 69]

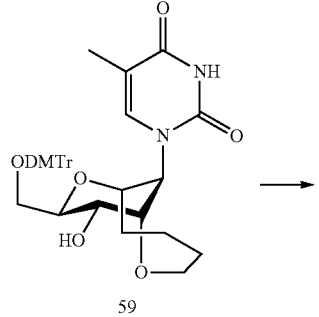

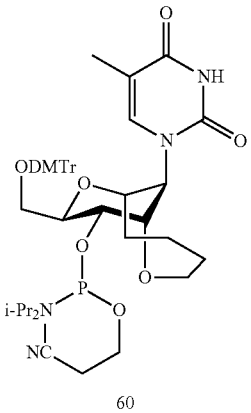

To an anhydrous acetonitrile solution (1.0 mL) of the compound 59 obtained above (34.6 mg, 0.055 mmol) and N,N-diisopropylethylamine (30 μL, 0.176 mmol) was added 10% 1-methylimidazole (anhydrous acetonitrile solution, 13.0 μL, 0.0163 mmol). Then, 2-cyanoethyl-N,N-diisopropyl phosphorochloridate (20.0 μL, 0.0897 mmol) was added under ice-cooling, and the resulting mixture was stirred at room temperature under argon stream for 1 hour. After completion of the reaction, saturated aqueous sodium bicarbonate and ethyl acetate were added, and extraction was performed. After the organic layer was washed with saturated aqueous sodium bicarbonate and a saturated saline solution, the resulting organic layer was dried over anhydrous sodium sulfate, and the solvent was distilled away under reduced pressure. The obtained residue was purified by silica gel column chromatography ($SiO_2$, hexane/ethyl acetate=33/67) to obtain a compound 60 (38.3 mg, 84%) as a white solid.

Table 35 shows data on the properties of the obtained compound 60.

TABLE 35

Physical property data of the obtained compound 60

$^1$H-NMR (500 MHz, $CDCl_3$) δ: 0.85 (2H, d, J = 6.9 Hz), 1.05-1.41 (9H, m), 1.62-1.66 (3H, m), 1.82-1.87 (2H, m), 2.14 (7/10H, ddd, J = 5.3, 5.3, 17.2 Hz), 2.22-2.28 (3H, m), 2.49 (7/10H, dd, J = 6.3, 12.0 Hz), 2.81-2.84 (7/10H, m), 3.10 (6/10H, dd, J = 4.6, 10.3 Hz), 3.21 (3/10H, dd, J = 4.6, 10.3 Hz), 3.38 (2H, dd, J = 2.9, 9.8 Hz), 3.49-3.70 (3H, m), 3.80 (6H, dd, J = 4.0, 12.0 Hz), 3.93 (1H, dd, J = 13.1, 13.1 Hz), 4.06 (1H, d, J = 9.8 Hz), 4.11-4.17 (1H, m), 4.26-4.33 (13/10H, m), 4.41 (7/10H, ddd, J = 2.7, 10.0, 10.0 Hz), 5.03 (7/10H, d, J = 3.7 Hz), 5.06 (3/10H, d, J = 3.5 Hz) 6.79-6.84 (4H, m), 7.19-7.47 (9H, m), 8.27 (7/10H, brs), 8.29 (7/10, s), 8.32 (3/10H, d, J = 1.2 Hz), 8.37 (3/10H, brs); $^{31}$P-NMR (122 MHz, $CDCl_3$) δ: 147.9, 150.2; HRMS (MALDI): Calculated for $C_{45}H_{57}N_4O_9NaP$ $[M + Na]^+$: 851.3755, Found: 851.3757.

Example 8: Synthesis and Purification of Oligonucleotide

Oligonucleotides were synthesized in the following manner using the compounds 12, 19, and 25 produced in Examples 1 to 3 as amidite blocks. Compounds other than the compounds 12, 19, and 25 constituting the oligonucleotides were purchased from Proligo unless otherwise stated.

0.1 M anhydrous acetonitrile solutions were prepared respectively using the compounds 12, 19, and 25 produced in Examples 1 to 3, and were fed into an nS-8 Oligonucleotides Synthesizer manufactured by GeneDesign, Inc. In each case, synthesis was performed trityl-off. Activator-42 (registered trademark) (manufactured by Proligo) was used as an activator, and the condensation time for the compounds 12, 19, and 25 was extended to 120 seconds×5. Regarding other operations, the synthesis was performed according to an ordinary phosphoramidite method.

After completion of the synthesis, the product was treated with a 28% aqueous solution of ammonia at room temperature for 1.5 hours, thus cleaved from the column support, and subsequently allowed to stand at 55° C. for 15 hours to thereby deprotect the base moiety and the phosphate moiety. The obtained crude oligonucleotide was then purified by reverse-phase HPLC.

The HPLC conditions were as follows:
Eluent
  Solution A: 0.1 M Triethylammonium acetate buffer (pH 7.0)
  Solution B: Acetonitrile
Gradient
  Concentration of solution B: 6 to 12% (in 20 minutes)
Column
  Waters, XBridge™ OST C18 2.5 μm (10×50 mm) (preparative)
  Waters, XBridge™ OST C18 2.5 μm (4.6×50 mm) (analytical)

Flow Rate
  4.0 mL/min (preparative)
  1.0 mL/min (analytical)
Column Temperature
  50° C.
Detection
  UV (260 nm)

The composition of the purified oligonucleotide was determined by MALDI-TOF-MS. For this measurement, first, a matrix (1 μL) obtained by mixing an aqueous solution of 3-hydroxypicolinic acid (10 mg/mL) and an aqueous solution of diammonium citrate (1 mg/mL) in a volume ratio of 1:1 was dried on an AnchorChip. An aqueous solution of oligonucleotide (50 μM, 1 μL) was placed on the AnchorChip and then dried again. After that, MALDI-TOF-MS was performed. The molecular weight was measured in a negative mode, and oligothymidylic acids (7-mer, 15-mer, and 23-mer) were used as external standards. Also, the synthesized oligonucleotide was quantified by measuring ultraviolet absorption at 260 nm using an absorbance measurement apparatus (SHIMADZU UV-1800 manufactured by Shimadzu Corporation).

Example 9: Assessment of Double-Strand Forming Ability

Oligonucleotides having respective sequences shown in a table below were synthesized and purified in a manner similar to that described in Example 8.

(1)
    (SEQ ID No. 1)
5'-d(GCGTTTTTTGCT)-3'

(2)
    (SEQ ID No. 2)
5'-d(GCGTTHTTTGCT)-3'

(3)
    (SEQ ID No. 3)
5'-d(GCGTT1TTTGCT)-3'

(4)
    (SEQ ID No. 4)
5'-d(GCGTT2TTTGCT)-3'

(5)
    (SEQ ID No. 5)
5'-d(GCGTT3TTTGCT)-3'

(6)
    (SEQ ID No. 6)
5'-d(GCGHTHTHTGCT)-3'

(7)
    (SEQ ID No. 7)
5'-d(GCG1T1T1TGCT)-3'

(8)
    (SEQ ID No. 8)
5'-d(GCG2T2T2TGCT)-3'

(9)
    (SEQ ID No. 9)
5'-d(GCG3T3T3TGCT)-3'

(10)
    (SEQ ID No. 10)
5'-d(GCGTTHHHTGCT)-3'

-continued

(11)
                                   (SEQ ID No. 11)
5'-d(GCGTT111TGCT)-3'

(12)
                                   (SEQ ID No. 12)
5'-d(GCGTT222TGCT)-3'

(13)
                                   (SEQ ID No. 13)
5'-d(GCGTT333TGCT)-3'

(14)
                                   (SEQ ID No. 14)
5'-d(GCGHHHHHHGCT)-3'

(15)
                                   (SEQ ID No. 15)
5'-d(GCG111111GCT)-3'

(16)
                                   (SEQ ID No. 16)
5'-d(GCG222222GCT)-3'

(17)
                                   (SEQ ID No. 17)
5'-d(GCG333333GCT)-3'

In the above sequences, H, 1, 2, and 3 represent the followings:

H=HNA-T (compound described in Non-Patent Document 4),

1=Compound 12 (BANA-T1),

2=Compound 19 (BANA-T2), and

3=Compound 25 (BANA-T3).

A single-stranded oligo RNA 5'-r(AGCAAAAAACGC)-3' (SEQ ID No. 18) and a single-stranded oligo DNA 5'-d(AGCAAAAAACGC)-3' (SEQ ID No. 19) were used as target strands, and the double-strand forming ability (binding affinity) was examined in the following manner.

The double-strand forming ability of the oligonucleotides was examined by subjecting the different types of oligonucleotides and the target strands to an annealing treatment to form double strands, and then measuring their $T_m$ values. More specifically, a mixed liquid of each oligonucleotide (final concentration: 4 μM) and a phosphate buffer (10 mM, pH 7.2, 130 μL) containing sodium chloride (final concentration: 100 mM) was bathed in boiling water and then slowly cooled to room temperature. After that, the mixed liquid was cooled to 5° C. under nitrogen stream before starting the measurement. The temperature was raised to 90° C. at a rate of 0.5° C./min while absorbance at 260 nm was plotted at intervals of 0.5° C. The $T_m$ value was calculated using a median method or differentiation (SEQ ID No. 17), and a mean value of three independent measurements was adopted.

Table 36 (sequences (1) to (9)) and Table 37 (sequences (1) and (10) to (17)) show the results of assessment of the double-strand forming ability. In Tables 36 and 37, the results with respect to the single-stranded oligo-RNA are indicated by "ssRNA", the results with respect to the single-stranded oligo-DNA are indicated by "ssDNA", and the $T_m$ and the $T_m$ temperature change ("$\Delta T_m$/mod.") per artificially modified nucleic acid base of each oligonucleotide are shown.

TABLE 36

| Sequence | ssDNA $T_m$ (° C.) | ssDNA $\Delta T_m$/mod. (° C.) | ssRNA $T_m$ (° C.) | ssRNA $\Delta T_m$/mod. (° C.) |
|---|---|---|---|---|
| 5'-GCGTTTTTTGCT-3' | 51 | — | 48 | — |
| 5'-GCGTTHTTTGCT-3' | 47 | −4 | 49 | +1 |
| 5'-GCGTT1TTTGCT-3' | 41 | −10 | 44 | −4 |
| 5'-GCGTT2TTTGCT-3' | 42 | −9 | 48 | ±0 |
| 5'-GCGTT3TTTGCT-3 | 43 | −8 | 43 | +1 |
| 5'-GCGHTHTHTGCT-3' | 36 | −5.0 | 50 | +0.7 |
| 5'-GCG1T1T1TGCT-3' | 27 | −8.0 | 46 | −0.7 |
| 5'-GCG2T2T2TGCT-3' | 35 | −5.3 | 56 | +2.7 |
| 5'-GCG3T3T3TGCT-3' | 35 | −5.3 | 59 | +3.7 |

TABLE 37

| Sequence | ssDNA $T_m$ (° C.) | ssDNA $\Delta T_m$/mod. (° C.) | ssRNA $T_m$ (° C.) | ssRNA $\Delta T_m$/mod. (° C.) |
|---|---|---|---|---|
| 5'-GCGTTTTTTGCT-3' | 51 | — | 48 | — |
| 5'-GCGTTHHHTGCT-3' | 38 | −4.3 | 50 | +0.7 |
| 5'-GCGTT111TGCT-3' | 37 | −4.7 | 53 | +1.7 |
| 5'-GCGTT222TGCT-3' | 39 | −4.0 | 58 | +3.3 |
| 5'-GCGTTS33TGCT-3' | 40 | −3.7 | 60 | +4.0 |
| 5'-GCGHHHHHHGCT-3' | 32 | −3.2 | 57 | +1.5 |
| 5'-GCG111111GCT-3' | 40 | −1.8 | 68 | +3.3 |
| 5'-GCG222222GCT-3' | 47 | −0.7 | 75 | +4.5 |
| 5'-GCG333333GCT-3' | 40 | −1.8 | 79 | +5.2 |

With respect to ssRNA, BANA-T3 (compound 25) exhibited the highest $T_m$ value, followed by BANA-T2 (compound 19) and BANA-T1(compound 12), in that order. For each of BANA-T1, BANA-T2 (compound 19), and BANA-T3 (compound 25), multiple introduction into the oligonucleotides tended to increase the $T_m$ value with respect to ssRNA and improve the double-strand forming ability for RNA. In addition, for each of BANA-T1, BANA-T2 (compound 19), and BANA-T3 (compound 25), consecutive introduction improved the double-strand forming ability for RNA even more and showed higher double-strand forming ability than in the cases of HNA-T.

Example 10: Assessment of Base Selectivity

For the above sequences (1) to (5), the double-strand forming ability (binding affinity) was examined in a similar manner using a single-stranded oligo RNA 5'-r(AGCAAAYAACGC)-3' and a single-stranded oligo DNA 5'-d(AGCAAAYAACGC)-3' as target strands.

For the single-stranded oligo RNA, Y was one of rA (SEQ ID No. 18), rU (SEQ ID No. 20), rG (SEQ ID No. 21), and rC (SEQ ID No. 22). For the single-stranded oligo DNA, Y was one of dA (SEQ ID No. 19), dT (SEQ ID No. 23), dG (SEQ ID No. 24), and dC (SEQ ID No. 25).

Table 38 below shows the results. In the table, $\Delta T_m$ was calculated by subtracting the $T_m$ value of the match (dA or rA) from the $T_m$ value of the mismatch.

TABLE 38

| | ssDNA: $T_m(\Delta_m)$ (° C.) | | | | ssRNA: $T_m(\Delta T_m)$ (° C.) | | | |
|---|---|---|---|---|---|---|---|---|
| | Y= dA | dT | dG | dC | Y = rA | rU | rG | rC |
| dT | 51 | 39 (−12) | 40 (−11) | 38 (−13) | 48 | 35 (−13) | 43 (−5) | 32 (−16) |
| HNA | 47 | 40 (−7) | 36 (−11) | 35 (−12) | 49 | 41 (−8) | 40 (−8) | 35 (−14) |
| BANA-T1 | 41 | 35 (−6) | 30 (−11) | 29 (−12) | 44 | 36 (−8) | 36 (−8) | 30 (−14) |
| BANA-T2 | 42 | 38 (−4) | 31 (−11) | 32 (−10) | 48 | 40 (−8) | 39 (−9) | 34 (−14) |
| BANA-T3 | 43 | 38 (−5) | 31 (−12) | 31 (−12) | 49 | 40 (−9) | 37 (−12) | 34 (−15) |

$\Delta T_m = T_m$(mismatch) − $T_m$(match)

For each of BANA-T1 (compound 12), BANA-T2 (compound 19), and BANA-T3 (compound 25), the introduction into the oligonucleotides suppressed base pairing with G, compared with the case where native DNA (dT) (SEQ ID No. 1) was used.

Example 11: Assessment of Nuclease Resistance

Oligonucleotides having the following 10-mer sequences were synthesized and purified in a manner similar to that described in Example 8, and used as test oligonucleotides:
5'-d(TTTTTTTX)-3'.
X was one of the followings:
X=thymidine (dT),
X=5'-phosphorothioate thymidine (PS),
X=LNA-T (LNA),
X=HNA-T (HNA),
X=Compound 12 (BANA-T1),
X=Compound 19 (BANA-T2), and
X=Compound 25 (BANA-T3).
To a 50 mM tris-hydrochloric acid buffer (pH 8.0) containing 7.5 µM test oligonucleotide and 10 mM magnesium chloride was added 3'-exonuclease (*Crotalus adamanteus* venom phosphodiesterase, CAVP) with a concentration of 1.0 µg/mL, and the mixture was incubated at 37° C. At the start of the incubation (0 minutes) and 5, 10, 20, and 40 minutes after the start of the incubation, a 20-µL aliquot was taken from the specimen and combined with 90 µL of MilliQ to make 110 µL, of which 100 µL was analyzed by reverse-phase HPLC to calculate the percentage of uncleaved oligonucleotides. The assessment was derived from three independent measurements.

FIG. 1 shows the results. As is clear from FIG. 1, in the cases where X was LNA-T (LNA) or HNA-T (HNA), the oligonucleotides were degraded by nuclease, as in the case of native DNA (dT). In the case of the phosphorothioated (PS) oligo (X=5'-phosphorothioate thymidine (PS)) as well, the residual ratio of uncleaved oligonucleotides at 40 minutes after the nuclease treatment was approximately 20%. In contrast, in the cases where the compound 12 (BANA-T1), the compound 19 (BANA-T2), or the compound 25 (BANA-T3) was used as X, the oligonucleotides were not readily degraded, with approximately 60% remaining uncleaved even at 40 minutes after the nuclease treatment.

Example 12: Assessment of Nuclease Resistance

Oligonucleotides having the following 10-mer sequences were synthesized and purified in a manner similar to that described in Example 8, and used as test oligonucleotides:
5'-d(TTTTTTTTXT)-3'.
X was one of the followings:
X=3'-phosphorothioate thymidine (PS),
X=LNA-T (LNA),
X=HNA-T (HNA),
X=Compound 12 (BANA-T1),
X=Compound 19 (BANA-T2), and
X=Compound 25 (BANA-T3).
To a 50 mM tris-hydrochloric acid buffer (pH 8.0) containing 7.5 µM test oligonucleotide and 10 mM magnesium chloride was added 3'-exonuclease (*Crotalus adamanteus* venom phosphodiesterase, CAVP) with a concentration of 1.0 µg/mL, and the mixture was incubated at 37° C. Twenty minutes after the start of the incubation, a 20-µL aliquot was taken from the specimen and combined with 90 µL of MilliQ to make 110 µL, of which 100 µL was analyzed by reverse-phase HPLC to calculate the percentage of uncleaved oligonucleotides.

FIG. 2 shows the results. As is clear from FIG. 2, in the cases where X was LNA-T (LNA) or HNA-T (HNA), the oligonucleotides were completely degraded by nuclease. In the case of the phosphorothioated (PS) oligo (X=3'-phosphorothioate thymidine (PS)), the residual ratio of uncleaved oligonucleotides at 20 minutes after the nuclease treatment was approximately 50%. In the cases where the compound 12 (BANA-T1) or the compound 19 (BANA-T2) was used as X, the residual ratio at 20 minutes after the nuclease treatment was 2% or 33%, respectively, whereas in the case where the compound 25 (BANA-T3) was used as X, the residual ratio was 95%, indicating that the oligonucleotide was overwhelmingly resistant to degradation compared with the other modifications.

Example 13: Synthesis and Purification of Oligonucleotide as Well as Assessment of Double-Strand Forming Ability Oligonucleotides having the following sequences were synthesized and purified in a manner similar to that described in Example 8:

(18)
(SEQ ID No. 26)
5'-d(GCGTTLLLTGCT)-3',

(19)
(SEQ ID No. 27)
5'-d(GCGTTL33TGCT)-3',

(20)
(SEQ ID No. 28)
5'-d(GCGTT3L3TGCT)-3',
and

-continued (21)

(SEQ ID No. 29)
5'-d(GCGTT33LTGCT)-3'.

In the above sequences, L and 3 represent the followings:
L=LNA-T (LNA), and
3=Compound 25 (BANA-T3).

Table 39 shows the yield and the results of MALDI-TOF MS, of each oligonucleotide.

TABLE 39

|  | Yield (%) | MS [M − H]⁻ | |
|---|---|---|---|
|  |  | Calculated | Found |
| (18) | 5.9 | 3714.59 | 3713.21 |
| (19) | 7.8 | 3798.68 | 3798.57 |
| (20) | 12.9 | 3798.68 | 3798.54 |
| (21) | 18.9 | 3798.68 | 3798.70 |

Furthermore, the double-strand forming ability for RNA, of each oligonucleotide was assessed in a manner similar to that described in Example 9. A single-stranded oligo RNA 5'-r(AGCAAAAAACGC)-3' (SEQ ID No. 18) was used as a target strand. Table 38 shows the results. Table 38 shows the melting temperature $T_m$ of each oligonucleotide during double-strand formation, and the difference ("$\Delta T_m$") from the $T_m$ of the sequence (18). As shown in Table 40, it was found that an oligonucleotide containing the compound 25 (BANA-T3) has high double-strand forming ability comparable to that of an oligonucleotide containing LNA.

TABLE 40

|  | RNA Complement | |
|---|---|---|
|  | $T_m$(° C.) | $\Delta T_m$(° C.) |
| (18) | 63 | — |
| (19) | 64 | +1 |
| (20) | 60 | −3 |
| (21) | 61 | −2 |

Example 14: Synthesis and Purification of Oligonucleotide as Well as Assessment of Double-Strand Forming Ability With the use of the compound 25 (BANA-T3) and the compound 30 (BANA-$^m$C3), oligonucleotides having sequences (22) to (25) shown in Table 41 were synthesized and purified in a manner similar to that described in Example 8 (the oligonucleotides are also represented by SEQ ID Nos. 30 to 33, respectively). The oligonucleotides shown in Table 41 are antisense oligonucleotides against mMALAT1.

Phosphorothioate (PS) modification was performed using 0.05 M ((dimethylamino-methylidene)amino)-3H-1,2,4-dithiazoline-3-thione (DDTT) (pyridine/acetonitrile (3:2) solution, GLEN RESEARCH) according to the method recommended by the manufacturer of this reagent.

Table 41 also shows the yield and the results of MALDI-TOF MS of these oligonucleotides.

TABLE 41

| Sequence | Yield (%) | MS [M-H]– Calculated | Found |
|---|---|---|---|
| (22) 5'-d(5^T^$^L$A^g^t^t^c^a^c^t^g^a^a^T^$^L$G^5)-3' | 15.5 | 5458.56 | 5458.77 |
| (23) 5'-d(5T^$^L$A^g^t^t^c^a^c^t^g^a^a^T^$^L$G^5)-3' | 23.2 | 5426.43 | 5426.95 |
| (24) 5'-d(5^T^$^L$A^g^t^t^c^a^c^t^g^a^a^T^$^L$G^5)-3' | 21.4 | 5410.36 | 5411.04 |
| (25) 5'-d(5T^$^L$A^g^t^t^c^a^c^t^g^a^a^T^$^L$G^5)-3' | 16.0 | 5378.23 | 5378.16 |

5: BANA-$^m$C3,
T: BANA-T3,
$^L$A: LNA-A,
$^L$G: LNA-G,
$^L$C: LNA-$^m$C3,
$^L$T: LNA-T,
^: PS

Furthermore, the double-strand forming ability for RNA, of each oligonucleotide was assessed in a manner similar to that of Example 9. Two sequences shown in Table 42 below were used as controls (also represented by SEQ ID Nos. 34 and 35, respectively).

TABLE 42

| Sequence |
|---|
| (26) 5'-d($^L$C^$^L$T^$^L$A^g^t^t^c^a^c^t^g^a^a^$^L$T^$^L$G^$^L$C)-3' |
| (27) 5'-d(c^t^a^g^t^t^c^a^c^t^g^a^a^t^g^c)-3' |

$^L$A: LNA-A,
$^L$G: LNA-G,
$^L$C: LNA-$^m$C,
$^L$T: LNA-T,
^: PS

A single-stranded oligo RNA 5'-r(GCAUUCAGUGAAC-UAG)-3' (SEQ ID No. 36) was used as a target strand. Table 43 shows the results. Table 43 shows the melting temperature $T_m$ of each oligonucleotide during double-strand formation, and the difference ("$\Delta T_m$") from the $T_m$ of the sequence (26). As shown in Table 41, it was found that an oligonucleotide containing the compound 30 (BANA-$^m$C3)

and the compound 25 (3ANA-T3) has high double-strand forming ability comparable to that of an oligonucleotide containing LNA.

TABLE 43

| Sequence | RNA Complement | |
|---|---|---|
| | $T_m$(° C.) | $\Delta T_m$(° C.) |
| (26) | 62.1 | — |
| (27) | 44.2 | −17.9 |
| (22) | 60.3 | −1.8 |
| (23) | 61.0 | −1.1 |
| (24) | 61.7 | −0.4 |
| (25) | 63.4 | +1.3 |

Example 15: Synthesis and Purification of Oligonucleotide as Well as Assessment of Toxicity Reducing Effect Oligonucleotides having a sequence (28) shown in Table 44 was synthesized and purified in a manner similar to that described in Example 8 (SEQ ID No. 37). Phosphorothioate (PS) modification was performed in a manner similar to that of Example 14. Table 44 also shows the yield and the results of MALDI-TOF MS of this oligonucleotide.

TABLE 44

| Sequence | Yield (%) | MS[M-H]− Calculated | Found |
|---|---|---|---|
| (28) 5'-d($^L$G^T̲^T̲^a^t^g^c^c^a^c^c^$^L$C^T̲^$^L$A)-3' | 38 | 4714.92 | 4715.37 |

T̲: BANA-T3,
$^L$A: LNA-A,
$^L$G: LNA-G,
$^L$C: LNA-$^m$C,
$^L$T: LNA-T,
^: PS

The test oligonucleotides (20 mg/kg) shown in Table 45 were administered intraperitoneally to six-week-old mice (C57BL/6J, male) (5 mice/group). After 96 hours, blood was collected under inhalation anesthesia (isoflurane), and the mice were exsanguinated. Then, the activities of aspartate transaminase (AST) and alanine transaminase (ALT) in serum were measured using an automated analyzer (FUJI DRI-CHEM 4000V manufactured by FUJIFILM).

TABLE 45

Testoligonucleotide:

| | Sequence |
|---|---|
| (28) | 5'-d($^L$G^T̲^T̲^a^t^g^c^c^a^c^c^$^L$C^T̲^$^L$A)-3' (SEQ ID No. 37) |
| (29) | 5'-d($^L$G^$^L$T^$^L$T^t^g^c^c^a^c^c^$^L$C^$^L$T^$^L$A)-3' (SEQ ID No. 38) |

T̲: BANA-T3,
$^L$A: LNA-A,
$^L$G: LNA-G,
$^L$C: LNA-$^m$C,
$^L$T: LNA-T,
^: PS

Table 46 shows the activities of aspartate transaminase (AST) and alanine transaminase (ALT) in blood in the cases where the test oligonucleotide was administered and in the case where a saline solution was administered. In the group with administration of the sequence (29), which is known to exhibit hepatotoxicity, all of the five mice died. On the other hand, the oligonucleotide having the sequence (28) in which a part of the sequence of the oligonucleotide having the sequence (29) was substituted by BANA showed almost no increase in ALT and AST, and thus the toxicity reducing effect was confirmed.

TABLE 46

| ID | ALT (IU/L) | AST (IU/L) | Remarks |
|---|---|---|---|
| Saline | 22.8 ± 1.6 | 73.8 ± 37.5 | — |
| (29) | — | — | All 5 died. |
| (28) | 36.8 ± 9.5 | 223.2 ± 102.6 | — |

ALT/AST Value: Means ± SD.

Example 16: Assessment of Expression Suppressing Effect of Antisense Oligonucleotide in Mouse Body Oligonucleotides having the sequences (22) to (25) and (30) shown in Table 47 were synthesized and purified in a manner similar to that described in Example 8 (the oligonucleotides are also represented by SEQ ID Nos. 30 to 33 and 39, respectively). Phosphorothioate (PS) modification was performed in a manner similar to that of Example 14. The oligonucleotides shown in Table 47 are antisense oligonucleotides against mMALAT1.

TABLE 47

Sequence

(30) 5'-d($^L$C^$^L$T^$^L$A^g^t^t^c^a^c^t^g^a^a^$^L$T^$^L$G$^L$C)-3'
    (SEQ ID No. 39)

(22) 5'-d(5^$\underline{T}$^$^L$A^g^t^t^c^a^c^t^g^a^a^$\underline{T}$^$^L$G^$\underline{5}$)-3' (SEQ ID No. 30)

(23) 5'-d($\underline{5T^L}$A^g^t^t^c^a^c^t^g^a^a^$\underline{T}$^$^L$G^$\underline{5}$)-3' (SEQ ID No. 31)

(24) 5'-d($\underline{5}$^$\underline{T^L}$A^g^t^t^c^a^c^t^g^a^a$\underline{T^L G5}$)-3' (SEQ ID No. 32)

(25) 5'-d($\underline{5TA}$^g^t^t^c^a^c^t^g^a^a$\underline{TG5}$)-3' (SEQ ID No. 33)

$\underline{5}$: BANA-$^m$C3,
$\underline{T}$: BANA-T3,
$^T$A: LNA-A,
$^L$G: LNA-G,
$^L$C: LNA-$^m$C,
$^L$T: LNA-T,
^: PS The test oligonucleotides (20 nmol: 200 μL of 100 μM saline solution) were administered to the tail vein of six-week-old mice (BALB/cAnNCrlCrlj, female) (5 mice/group). After 72 hours, blood was collected under inhalation anesthesia (isoflurane), and the mice were exsanguinated. Then, the tissues were collected, and RNA extraction (kit used: RNeasy) was performed. The mRNA expression levels of MALAT1 in the tissues were measured by real-time PCR (kit used: One Step TB Green (registered trademark) PrimeScript™ RT-PCR Kit (Perfect Real Time), manufactured by Takara Bio Inc.). In the real-time PCR, the following primers were used:

```
MALAT1 forward:
                (SEQ ID No. 40)
acattccttgaggtcggcaa,

MALAT1 reverse:
                (SEQ ID No. 41)
cacccgcaaaggcctacata,

GAPDH forward:
                (SEQ ID No. 42)
tcaccaccatggagaaggc,
and

GAPDH reverse:
                (SEQ ID No. 43)
gctaagcagttggtggtgca.
```

FIGS. 3 and 4 show the results. FIGS. 3 and 4 show relative MALAT1 expression levels in various tissues of mice in administration of various oligonucleotides (FIG. 3: liver, heart, kidney, pancreas, skeletal muscle, lung, and stomach; and FIG. 4: spleen, skin, large intestine, brain, breast gland, eyeball, and cartilage). The "relative MALAT1 expression levels" are shown as relative values, with the expression level obtained by administration of only the saline solution (no oligonucleotides) being taken as 1. In FIGS. 3 and 4, the oligonucleotides having the sequences (22) to (25) are shown as ON22 to ON25, respectively. In FIGS. 3 and 4, the patterns of the bars representing the results are changed according to the following groups: the oligonucleotides ("ON22" to "ON25") having the sequences (22) to (25), which are oligonucleotides containing the compound 25 (BANA-T3) and the compound 30 (BANA-$^m$C3); the oligonucleotide ("ON30") having the sequence (30), which is an oligonucleotide containing LNA instead of the compounds 25 and 30; and the control (to which only the saline solution was administered) ("Saline solution").

In many tissues, the oligonucleotides having the sequences (22) to (25) containing BANA such as the compounds 25 and 30 exhibited a target gene inhibitory effect that is equal to or better than that of the oligonucleotide having the sequence (30) containing LNA instead of BANA.

Example 17: Synthesis and Purification of Oligonucleotide

With the use of the compound 60 (BANA-T4), an oligonucleotide having a sequence (31) shown below was synthesized and purified in a manner similar to that described in Example 8:

(31)

(SEQ ID No. 44)

5'-d(GCGTT4TTTGCT)-3', where 4=Compound 60 (BANA-T4).

The composition of the purified oligonucleotide was determined by MALDI-TOF-MS in a manner similar to that described in Example 8. The synthesized oligonucleotide was quantified using an absorbance measurement apparatus.

TABLE 48

| Sequence | Yield (%) | MS [M-H]– Calculated | Found |
|---|---|---|---|
| (31) 5'-d(GCGTT4TTTGCT)-3' | 7.3 | 3716.48 | 43716.57 |

4: BANA-T4

INDUSTRIAL APPLICABILITY

According to the present invention, provided are a novel cross-linked nucleoside that is usable as a substitute for a phosphorothioate-modified nucleic acid, and a nucleotide using the cross-linked nucleoside. An oligonucleotide obtained using the cross-linked nucleoside of the present invention is useful as, for example, materials for oligonucleotide therapeutics.

The invention claimed is:

1. A compound represented by a formula (I) below or a salt thereof:

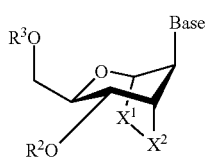

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or $—P(R^4)R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or $—Y^1—(CH_2)_n—$, $—(CH_2)_n—Y^1—$ or $—(CH_2)_l—Y^1—(CH_2)_m—$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $—NH—$, or a methylene group.

2. The compound or salt thereof according to claim 1, wherein the formula (I) is represented by any one of formulae (I-1) to (I-3) below:

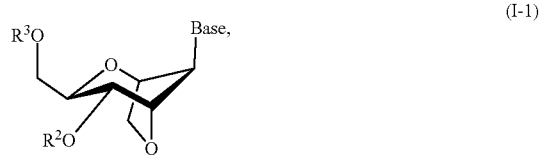

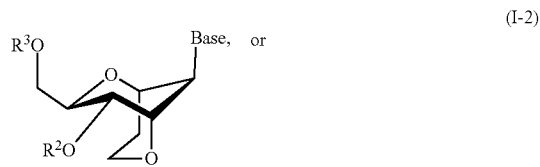

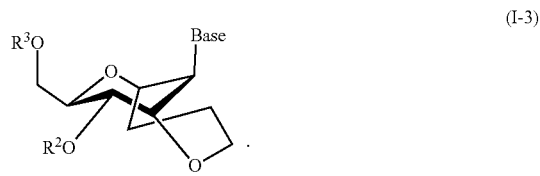

3. The compound or salt thereof according to claim 2, wherein the Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl- 1,2-dihydropyrimidin-1-yl group, or a 4-amino-5-methyl-2-oxo-1,2-dihydropyrimidin-1-yl group.

4. The compound or salt thereof according to claim 2, wherein the Base is a group represented by a formula below:

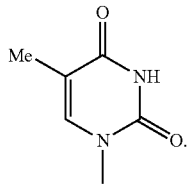

5. The compound or salt thereof according to claim 1, wherein the Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, or a 4-amino-5-methyl-2-oxo-1,2-dihydropyrimidin-1-yl group.

6. The compound or salt thereof according to claim 1, wherein the Base is a group represented by a formula below:

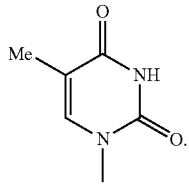

7. The compound or salt thereof according to claim 1, wherein, in the formula (I), $X^1$ is an alkylene group having 1 to 4 carbon atoms, and $X^2$ is an oxygen atom, a sulfur atom, —NH—, or a methylene group.

8. An oligonucleotide containing at least one nucleoside structure represented by a formula (II) below or a pharmacologically acceptable salt thereof:

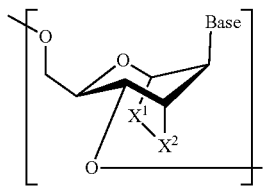

(II)

where Base represents a purin-9-yl group that may have any one or more substituents selected from an a group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$X^1$ is an alkylene group having 1 to 5 carbon atoms, an alkenylene group having 2 to 5 carbon atoms, or —$Y^1$—$(CH_2)_n$—, —$(CH_2)_n$—$Y^1$— or —$(CH_2)_l$—$Y^1$—$(CH_2)_m$—, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, —NH—, or a methylene group.

9. The oligonucleotide or pharmacologically acceptable salt thereof according to claim 8, wherein the formula (II) is represented by any one of formulae (II-1) to (II-3) below:

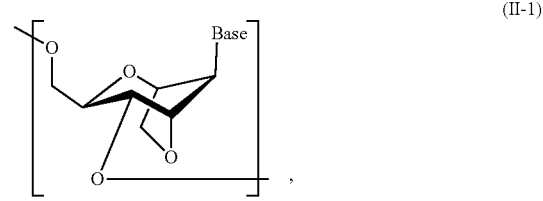

(II-1)

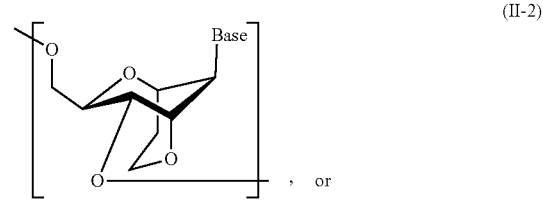

(II-2)

, or

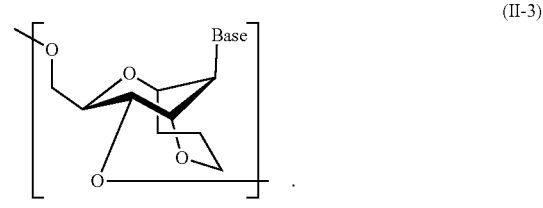

(II-3)

.

10. The oligonucleotide or pharmacologically acceptable salt thereof according to claim 8, wherein the Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, or a 4-amino-5-methyl-2-oxo-1,2-dihydropyrimidin-1-yl group.

11. The oligonucleotide or pharmacologically acceptable salt thereof according to claim 8, wherein the Base is a group represented by a formula below:

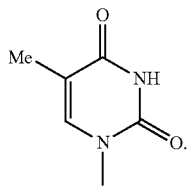

12. The oligonucleotide or pharmacologically acceptable salt thereof according to claim 8, wherein, in the formula (II), $X^1$ is an alkylene group having 1 to 4 carbon atoms, and $X^2$ is an oxygen atom, a sulfur atom, —NH—, or a methylene group.

13. The oligonucleotide or pharmacologically acceptable salt thereof according to claim 9, wherein the Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4-hydroxy-5-methyl-1,2-dihydropyrimidin-1-yl group, or a 4-amino-5-methyl-2-oxo-1,2-dihydropyrimidin-1-yl group.

14. The oligonucleotide or pharmacologically acceptable salt thereof according to claim 6, wherein the Base is a group represented by a formula below:

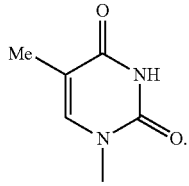

15. A method for producing the oligonucleotide or pharmacologically acceptable salt thereof according to claim 8, the method comprising the step of:
synthesizing an oligonucleotide using a compound represented by a formula (I) below or a pharmacologically acceptable salt thereof:

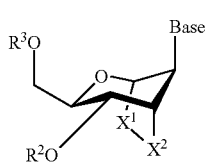

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or —P($R^4$)$R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or —$Y^1$—$(CH_2)_n$—, —$(CH_2)_n$—$Y^1$— or —$(CH_2)_l$—$Y^1$—$(CH_2)_m$—, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, —NH—, or a methylene group.

16. The method according to claim 15, wherein, in the formula (I), $X^1$ is an alkylene group having 1 to 4 carbon atoms, and $X^2$ is an oxygen atom, a sulfur atom, —NH—, or a methylene group.

17. A method for producing the oligonucleotide or pharmacologically acceptable salt thereof according to claim 9, the method comprising the step of:
synthesizing an oligonucleotide using a compound represented by any one of formulae (I-1) to (I-3) below or a pharmacologically acceptable salt thereof:

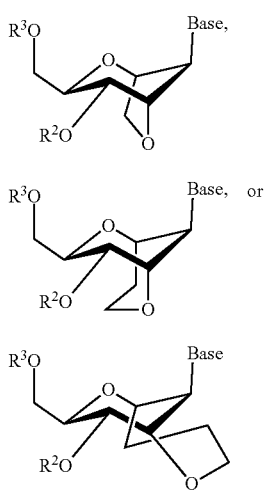

(I-1)

(I-2)

(I-3)

where Base represents a purin-9-yl group that may have any one or more substituents selected from an α group, or a 2-oxo-1,2-dihydropyrimidin-1-yl group that may have any one or more substituents selected from the α group, the α group consisting of a hydroxy group, a hydroxy group protected by a protecting group for nucleic acid synthesis, linear alkyl groups having 1 to 6 carbon atoms, linear alkoxy groups having 1 to 6 carbon atoms, a mercapto group, a mercapto group protected by a protecting group for nucleic acid synthesis, linear alkylthio groups having 1 to 6 carbon atoms, an amino group, linear alkylamino groups having 1 to 6 carbon atoms, an amino group protected by a protecting group for nucleic acid synthesis, and halogen atoms;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or —P($R^4$)$R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms.

18. A method for producing the oligonucleotide or pharmacologically acceptable salt thereof according to claim 10, the method comprising the step of:

synthesizing an oligonucleotide using a compound represented by a formula (I) below or a pharmacologically acceptable salt thereof:

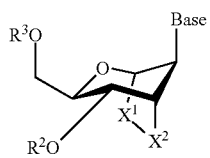

(I)

where Base is a 6-aminopurin-9-yl group, a 2,6-diaminopurin-9-yl group, a 2-amino-6-chloropurin-9-yl group, a 2-amino-6-fluoropurin-9-yl group, a 2-amino-6-bromopurin-9-yl group, a 2-amino-6-hydroxypurin-9-yl group, a 6-amino-2-methoxypurin-9-yl group, a 6-amino-2-chloropurin-9-yl group, a 6-amino-2-fluoropurin-9-yl group, a 2,6-dimethoxypurin-9-yl group, a 2,6-dichloropurin-9-yl group, a 6-mercaptopurin-9-yl group, a 2-oxo-4-amino-1,2-dihydropyrimidin-1-yl group, a 4-amino-2-oxo-5-fluoro-1,2-dihydropyrimidin-1-yl group, a 4-amino-2-oxo-5-chloro-1,2-dihydropyrimidin-1-yl group, a 2-oxo-4-methoxy-1,2-dihydropyrimidin-1-yl group, a 2-oxo-4-mercapto-1,2-dihydropyrimidin-1-yl group, a 2-oxo-4-hydroxy-1,2-dihydropyrimidin-1-yl group, a 2-oxo-4- hydroxy-5-methyl-1,2-dihydropyrimidin-1-yl group, or a 4-amino-5-methyl-2-oxo-1,2-dihydropyrimidin-1-yl group;

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or —P($R^4$)$R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or —$Y^1$—$(CH_2)_n$—, —$(CH_2)_n$—$Y^1$— or —$(CH_2)_l$—$Y^1$—$(CH_2)_m$—, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, —NH—, or a methylene group.

19. A method for producing the oligonucleotide or pharmacologically acceptable salt thereof according to claim 11, the method comprising the step of:

synthesizing an oligonucleotide using a compound represented by a formula (I) below or a pharmacologically acceptable salt thereof:

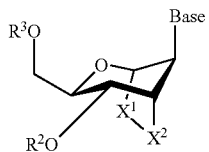

(I)

where Base is a group represented by a formula below:

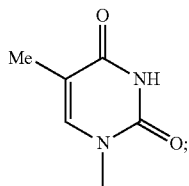

$R^2$ and $R^3$ each independently represent a hydrogen atom, a hydroxy group protecting group for nucleic acid synthesis, an alkyl group having 1 to 7 carbon atoms that may form a branch or a ring, an alkenyl group having 2 to 7 carbon atoms that may form a branch or a ring, an aryl group having 3 to 10 carbon atoms that may have any one or more substituents selected from the α group and may have a heteroatom, an aralkyl group with an aryl moiety having 3 to 12 carbon atoms that may have any one or more substituents selected from the α group and may have a heteroatom, an acyl group that may have any one or more substituents selected from the α group, a silyl group that may have any one or more substituents selected from the α group, a phosphate group that may have any one or more substituents selected from the α group, a phosphate group protected by a protecting group for nucleic acid synthesis, or $-P(R^4)R^5$, where $R^4$ and $R^5$ each independently represent a hydroxy group, a hydroxy group protected by a protecting group for nucleic acid synthesis, a mercapto group, a mercapto group protected by a protecting group for nucleic acid synthesis, an amino group, an alkoxy group having 1 to 6 carbon atoms, an alkylthio group having 1 to 6 carbon atoms, a cyanoalkoxy group having 1 to 6 carbon atoms, or a dialkylamino group that has an alkyl group having 1 to 6 carbon atoms;

$X^1$ is an alkylene group having 1 to 5 carbon atoms, an alkenylene group having 2 to 5 carbon atoms, or $-Y^1-(CH_2)_n-$, $-(CH_2)_n-Y^1-$ or $-(CH_2)_l-Y^1-(CH_2)_m-$, where $Y^1$ is a sulfonyl group, a sulfonamide group, an amide group, an ester group, or a carbonyl group, n is an integer of 1 to 5, l and m are positive integers, and the sum of l and m is 2 to 5; and $X^2$ is an oxygen atom, a sulfur atom, $-NH-$, or a methylene group.

\* \* \* \* \*

SEQUENCE LISTING

<160> NUMBER OF SEQ ID NOS: 44

<210> SEQ ID NO 1
<211> LENGTH: 12
<212> TYPE: DNA
<213> ORGANISM: Artificial Sequence
<220> FEATURE:
<223> OTHER INFORMATION: synthesized oligonucleotide

<400> SEQUENCE: 1
gcgttttttg ct                                                         12

<210> SEQ ID NO 2
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = HNA-t

<400> SEQUENCE: 2
gcgttttttg ct                                                         12

<210> SEQ ID NO 3
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = BANA-t1

<400> SEQUENCE: 3
gcgttttttg ct                                                         12

<210> SEQ ID NO 4
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = BANA-t2

```
<400> SEQUENCE: 4
gcgttctttg ct                                                    12

<210> SEQ ID NO 5
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = BANA-t3

<400> SEQUENCE: 5
gcgttatttg ct                                                    12

<210> SEQ ID NO 6
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(4)
<223> OTHER INFORMATION: t = HNA-t
<220> FEATURE:
<221> NAME/KEY: modified_base
<222> LOCATION: (6)..(6)
<223> OTHER INFORMATION: t = HNA-t
<220> FEATURE:
<221> NAME/KEY: modified_base
<222> LOCATION: (8)..(8)
<223> OTHER INFORMATION: t = HNA-t

<400> SEQUENCE: 6
gcgttatttg ct                                                    12

<210> SEQ ID NO 7
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(4)
<223> OTHER INFORMATION: t = BANA-t1
<220> FEATURE:
<221> NAME/KEY: modified_base
<222> LOCATION: (6)..(6)
<223> OTHER INFORMATION: t = BANA-t1
<220> FEATURE:
<221> NAME/KEY: modified_base
<222> LOCATION: (8)..(8)
<223> OTHER INFORMATION: t = BANA-t1

<400> SEQUENCE: 7
gcgttgtttg ct                                                    12

<210> SEQ ID NO 8
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(4)
```

```
<223> OTHER INFORMATION: t = BANA-t2
<220> FEATURE:
<221> NAME/KEY: modified_base
<222> LOCATION: (6)..(6)
<223> OTHER INFORMATION: t = BANA-t2
<220> FEATURE:
<221> NAME/KEY: modified_base
<222> LOCATION: (8)..(8)
<223> OTHER INFORMATION: t = BANA-t2

<400> SEQUENCE: 8
gcgttgtttg ct                                                           12

<210> SEQ ID NO 9
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(4)
<223> OTHER INFORMATION: t = BANA-t3
<220> FEATURE:
<221> NAME/KEY: modified_base
<222> LOCATION: (6)..(6)
<223> OTHER INFORMATION: t = BANA-t3
<220> FEATURE:
<221> NAME/KEY: modified_base
<222> LOCATION: (8)..(8)
<223> OTHER INFORMATION: t = BANA-t3
<220> FEATURE:
<221> NAME/KEY: modified_base
<222> LOCATION: (8)..(8)
<223> OTHER INFORMATION: t = BANA-t3

<400> SEQUENCE: 9
gcgttgtttg ct                                                           12

<210> SEQ ID NO 10
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(8)
<223> OTHER INFORMATION: t = HNA-t

<400> SEQUENCE: 10
gcgttgtttg ct                                                           12

<210> SEQ ID NO 11
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(8)
<223> OTHER INFORMATION: t = BANA-t1

<400> SEQUENCE: 11
gcgttgtttg ct                                                           12

<210> SEQ ID NO 12
<211> LENGTH: 12
<212> TYPE: DNA
<213> ORGANISM: Artificial Sequence
```

```
<220> FEATURE:
<223> OTHER INFORMATION: synthesized oligonucleotide
<220> FEATURE:
<221> NAME/KEY: modified_base
<222> LOCATION: (6)..(8)
<223> OTHER INFORMATION: t = BANA-t2

<400> SEQUENCE: 12
gcgttctttg ct                                                              12

<210> SEQ ID NO 13
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(8)
<223> OTHER INFORMATION: t = BANA-t3

<400> SEQUENCE: 13
gcgttctttg ct                                                              12

<210> SEQ ID NO 14
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(9)
<223> OTHER INFORMATION: t = HNA-t

<400> SEQUENCE: 14
gcgttctttg ct                                                              12

<210> SEQ ID NO 15
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(9)
<223> OTHER INFORMATION: ANA-t1

<400> SEQUENCE: 15
gcgttttttg ct                                                              12

<210> SEQ ID NO 16
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(9)
<223> OTHER INFORMATION: t = BANA-t2

<400> SEQUENCE: 16
gcgttttttg ct                                                              12

<210> SEQ ID NO 17
<211> LENGTH: 12
<212> TYPE: DNA
```

```
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (4)..(9)
<223> OTHER INFORMATION: t = BANA-t3

<400> SEQUENCE: 17
gcgttctttg ct                                                              12

<210> SEQ ID NO 18
<211> LENGTH: 12
<212> TYPE: RNA
<213> ORGANISM: Artificial Sequence
<220> FEATURE:
<223> OTHER INFORMATION: Target a oligoRNA

<400> SEQUENCE: 18
agcaaaaaac gc                                                              12

<210> SEQ ID NO 19
<211> LENGTH: 12
<212> TYPE: DNA
<213> ORGANISM: Artificial Sequence
<220> FEATURE:
<223> OTHER INFORMATION: Target a oligoDNA

<400> SEQUENCE: 19
agcaaaaaac gc                                                              12

<210> SEQ ID NO 20
<211> LENGTH: 12
<212> TYPE: RNA
<213> ORGANISM: Artificial Sequence
<220> FEATURE:
<223> OTHER INFORMATION: Target u oligoRNA

<400> SEQUENCE: 20
agcaaauaac gc                                                              12

<210> SEQ ID NO 21
<211> LENGTH: 12
<212> TYPE: RNA
<213> ORGANISM: Artificial Sequence
<220> FEATURE:
<223> OTHER INFORMATION: Target g oligoRNA

<400> SEQUENCE: 21
agcaaagaac gc                                                              12

<210> SEQ ID NO 22
<211> LENGTH: 12
<212> TYPE: RNA
<213> ORGANISM: Artificial Sequence
<220> FEATURE:
<223> OTHER INFORMATION: Target c oligoRNA

<400> SEQUENCE: 22
agcaaacaac gc                                                              12

<210> SEQ ID NO 23
<211> LENGTH: 12
<212> TYPE: DNA
<213> ORGANISM: Artificial Sequence
<220> FEATURE:
<223> OTHER INFORMATION: Target t oligoDNA
```

```
<400> SEQUENCE: 23
agcaaataac gc                                                    12

<210> SEQ ID NO 24
<211> LENGTH: 12
<212> TYPE: DNA
<213> ORGANISM: Artificial Sequence
<220> FEATURE:
<223> OTHER INFORMATION: Target g oligoDNA

<400> SEQUENCE: 24
agcaaagaac gc                                                    12

<210> SEQ ID NO 25
<211> LENGTH: 12
<212> TYPE: DNA
<213> ORGANISM: Artificial Sequence
<220> FEATURE:
<223> OTHER INFORMATION: Target c oligoDNA

<400> SEQUENCE: 25
agcaaacaac gc                                                    12

<210> SEQ ID NO 26
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(8)
<223> OTHER INFORMATION: t = LNA-t

<400> SEQUENCE: 26
gcgttttttg ct                                                    12

<210> SEQ ID NO 27
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = LNA-t
<220> FEATURE:
<221> NAME/KEY: modified_base
<222> LOCATION: (7)..(8)
<223> OTHER INFORMATION: t = BANA-t3

<400> SEQUENCE: 27
gcgttttttg ct                                                    12

<210> SEQ ID NO 28
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = BANA-t3
<220> FEATURE:
<221> NAME/KEY: modified_base
<222> LOCATION: (7)..(7)
```

<223> OTHER INFORMATION: t = LNA-t
<220> FEATURE:
<221> NAME/KEY: modified_base
<222> LOCATION: (8)..(8)
<223> OTHER INFORMATION: t = BANA-t3

<400> SEQUENCE: 28 gcgtttttg ct                                                              12

<210> SEQ ID NO 29
<211> LENGTH: 12
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(7)
<223> OTHER INFORMATION: t = BANA-t3
<220> FEATURE:
<221> NAME/KEY: modified_base
<222> LOCATION: (8)..(8)
<223> OTHER INFORMATION: t =LNA-t

<400> SEQUENCE: 29 gcgtttttg ct                                                              12

<210> SEQ ID NO 30
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(1)
<223> OTHER INFORMATION: c = BANA-mC3
<220> FEATURE:
<221> NAME/KEY: modified_base
<222> LOCATION: (2)..(2)
<223> OTHER INFORMATION: t = BANA-T3
<220> FEATURE:
<221> NAME/KEY: modified_base
<222> LOCATION: (2)..(16)
<223> OTHER INFORMATION: phosphorothioated
<220> FEATURE:
<221> NAME/KEY: modified_base
<222> LOCATION: (3)..(3)
<223> OTHER INFORMATION: a = LNA-a
<220> FEATURE:
<221> NAME/KEY: modified_base
<222> LOCATION: (14)..(14)
<223> OTHER INFORMATION: t = BANA-T3
<220> FEATURE:
<221> NAME/KEY: modified_base
<222> LOCATION: (15)..(15)
<223> OTHER INFORMATION: g = LNA-g
<220> FEATURE:
<221> NAME/KEY: modified_base
<222> LOCATION: (16)..(16)
<223> OTHER INFORMATION: c = BANA-mC3

<400> SEQUENCE: 30
ctagttcact gaatgc                                                         16

<210> SEQ ID NO 31
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base

```
<222> LOCATION: (1)..(1)
<223> OTHER INFORMATION: c = SANA-mC3
<220> FEATURE:
<221> NAME/KEY: modified_base
<222> LOCATION: (2)..(2)
<223> OTHER INFORMATION: t = SANA-t3
<220> FEATURE:
<221> NAME/KEY: modified_base
<222> LOCATION: (3)..(3)
<223> OTHER INFORMATION: a = LNA-a
<220> FEATURE:
<221> NAME/KEY: modified_base
<222> LOCATION: (4)..(16)
<223> OTHER INFORMATION: phosphorothioated
<220> FEATURE:
<221> NAME/KEY: modified_base
<222> LOCATION: (14)..(14)
<223> OTHER INFORMATION: t = SANA-t3
<220> FEATURE:
<221> NAME/KEY: modified_base
<222> LOCATION: (15)..(15)
<223> OTHER INFORMATION: g = LNA-g
<220> FEATURE:
<221> NAME/KEY: modified_base
<222> LOCATION: (16)..(16)
<223> OTHER INFORMATION: c = SANA-mC3

<400> SEQUENCE: 31
ctagttcact gaatgc                                                 16

<210> SEQ ID NO 32
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(1)
<223> OTHER INFORMATION: c = SANA-mC3
<220> FEATURE:
<221> NAME/KEY: modified_base
<222> LOCATION: (2)..(2)
<223> OTHER INFORMATION: t = SANA-t3
<220> FEATURE:
<221> NAME/KEY: modified_base
<222> LOCATION: (2)..(13)
<223> OTHER INFORMATION: phosphorothioated
<220> FEATURE:
<221> NAME/KEY: modified_base
<222> LOCATION: (3)..(3)
<223> OTHER INFORMATION: a = LNA-a
<220> FEATURE:
<221> NAME/KEY: modified_base
<222> LOCATION: (14)..(14)
<223> OTHER INFORMATION: t = SANA-t3
<220> FEATURE:
<221> NAME/KEY: modified_base
<222> LOCATION: (15)..(15)
<223> OTHER INFORMATION: g = LNA-g
<220> FEATURE:
<221> NAME/KEY: modified_base
<222> LOCATION: (16)..(16)
<223> OTHER INFORMATION: c = SANA-mC3

<400> SEQUENCE: 32
ctagttcact gaatgc                                                 16

<210> SEQ ID NO 33
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
```

```
<221> NAME/KEY: modified_base
<222> LOCATION: (1)..(1)
<223> OTHER INFORMATION: c = BANA-mC3
<220> FEATURE:
<221> NAME/KEY: modified_base
<222> LOCATION: (2)..(2)
<223> OTHER INFORMATION: t = BANA-t3
<220> FEATURE:
<221> NAME/KEY: modified_base
<222> LOCATION: (3)..(3)
<223> OTHER INFORMATION: a = LNA-a
<220> FEATURE:
<221> NAME/KEY: modified_base
<222> LOCATION: (3)..(13)
<223> OTHER INFORMATION: phosphorothioated
<220> FEATURE:
<221> NAME/KEY: modified_base
<222> LOCATION: (14)..(14)
<223> OTHER INFORMATION: t = BANA-t3
<220> FEATURE:
<221> NAME/KEY: modified_base
<222> LOCATION: (15)..(15)
<223> OTHER INFORMATION: g = LNA-g
<220> FEATURE:
<221> NAME/KEY: modified_base
<222> LOCATION: (16)..(16)
<223> OTHER INFORMATION: c = BANA-mC3

<400> SEQUENCE: 33
ctagttcact gaatgc                                              16

<210> SEQ ID NO 34
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(3)
<223> OTHER INFORMATION: c, t, or a = LNA-c, -t or -a
<220> FEATURE:
<221> NAME/KEY: modified_base
<222> LOCATION: (2)..(16)
<223> OTHER INFORMATION: phosphorothioated
<220> FEATURE:
<221> NAME/KEY: modified_base
<222> LOCATION: (14)..(16)
<223> OTHER INFORMATION: c, t, or g = LNA-c, -t or -g

<400> SEQUENCE: 34
ctagttcact gaatgc                                              16

<210> SEQ ID NO 35
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (2)..(16)
<223> OTHER INFORMATION: phosphorylated
<220> FEATURE:
<221> NAME/KEY: modified_base
<222> LOCATION: (2)..(16)
<223> OTHER INFORMATION: phosphorothioated

<400> SEQUENCE: 35
ctagttcact gaatgc                                              16

<210> SEQ ID NO 36
<211> LENGTH: 16
```

```
<212> TYPE: RNA
<213> ORGANISM: Artificial Sequence
<220> FEATURE:
<223> OTHER INFORMATION: synthesized single-stranded oligo RNA

<400> SEQUENCE: 36
gcauucagug aacuag                                                      16

<210> SEQ ID NO 37
<211> LENGTH: 14
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(1)
<223> OTHER INFORMATION: g = LNA-g
<220> FEATURE:
<221> NAME/KEY: modified_base
<222> LOCATION: (2)..(14)
<223> OTHER INFORMATION: phosphorothioated
<220> FEATURE:
<221> NAME/KEY: modified_base
<222> LOCATION: (2)..(3)
<223> OTHER INFORMATION: t = BANA-t3
<220> FEATURE:
<221> NAME/KEY: modified_base
<222> LOCATION: (12)..(12)
<223> OTHER INFORMATION: c = LNA-c
<220> FEATURE:
<221> NAME/KEY: modified_base
<222> LOCATION: (13)..(13)
<223> OTHER INFORMATION: t = BANA-t3
<220> FEATURE:
<221> NAME/KEY: modified_base
<222> LOCATION: (14)..(14)
<223> OTHER INFORMATION: a = LNA-a

<400> SEQUENCE: 37
gttatgccac ccta                                                        14

<210> SEQ ID NO 38
<211> LENGTH: 14
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(3)
<223> OTHER INFORMATION: g or t = LNA-g or -t
<220> FEATURE:
<221> NAME/KEY: modified_base
<222> LOCATION: (2)..(14)
<223> OTHER INFORMATION: phosphorothioated
<220> FEATURE:
<221> NAME/KEY: modified_base
<222> LOCATION: (12)..(14)
<223> OTHER INFORMATION: c, t or a  = LNA-c, -t or -a

<400> SEQUENCE: 38
gttatgccac ccta                                                        14

<210> SEQ ID NO 39
<211> LENGTH: 16
<212> TYPE: DNA
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (1)..(3)
```

```
<223> OTHER INFORMATION: c, t or a = LNA-c, -t or -a
<220> FEATURE:
<221> NAME/KEY: modified_base
<222> LOCATION: (2)..(13)
<223> OTHER INFORMATION: phosphorothioated
<220> FEATURE:
<221> NAME/KEY: modified_base
<222> LOCATION: (14)..(16)
<223> OTHER INFORMATION: c, t or g = LNA-c, -t or -g
<220> FEATURE:
<221> NAME/KEY: modified_base
<222> LOCATION: (15)..(16)
<223> OTHER INFORMATION: phosphorothioated

<400> SEQUENCE: 39
ctagttcact gaatgc                                                   16

<210> SEQ ID NO 40
<211> LENGTH: 20
<212> TYPE: DNA
<213> ORGANISM: Artificial Sequence
<220> FEATURE:
<223> OTHER INFORMATION: MALAT1 forward

<400> SEQUENCE: 40
acattccttg aggtcggcaa                                               20

<210> SEQ ID NO 41
<211> LENGTH: 20
<212> TYPE: DNA
<213> ORGANISM: Artificial Sequence
<220> FEATURE:
<223> OTHER INFORMATION: MALAT1 reverse

<400> SEQUENCE: 41
cacccgcaaa ggcctacata                                               20

<210> SEQ ID NO 42
<211> LENGTH: 19
<212> TYPE: DNA
<213> ORGANISM: Artificial Sequence
<220> FEATURE:
<223> OTHER INFORMATION: GAPDH forward

<400> SEQUENCE: 42
tcaccaccat ggagaaggc                                                19

<210> SEQ ID NO 43
<211> LENGTH: 20
<212> TYPE: DNA
<213> ORGANISM: Artificial Sequence
<220> FEATURE:
<223> OTHER INFORMATION: GAPDH reverse

<400> SEQUENCE: 43
gctaagcagt tggtggtgca                                               20

<210> SEQ ID NO 44
<211> LENGTH: 12
<212> TYPE: DNA
```

```
<213> ORGANISM: Artificial Sequence
<220> FEATURE:
<223> OTHER INFORMATION: synthesized oligonucleotide
<220> FEATURE:
<221> NAME/KEY: modified_base
<222> LOCATION: (6)..(6)
<223> OTHER INFORMATION: t = BANA-t4

<400> SEQUENCE: 44 gcgtttttg ct                                                    12
```